United States Patent Office 3,535,016
Patented Oct. 20, 1970

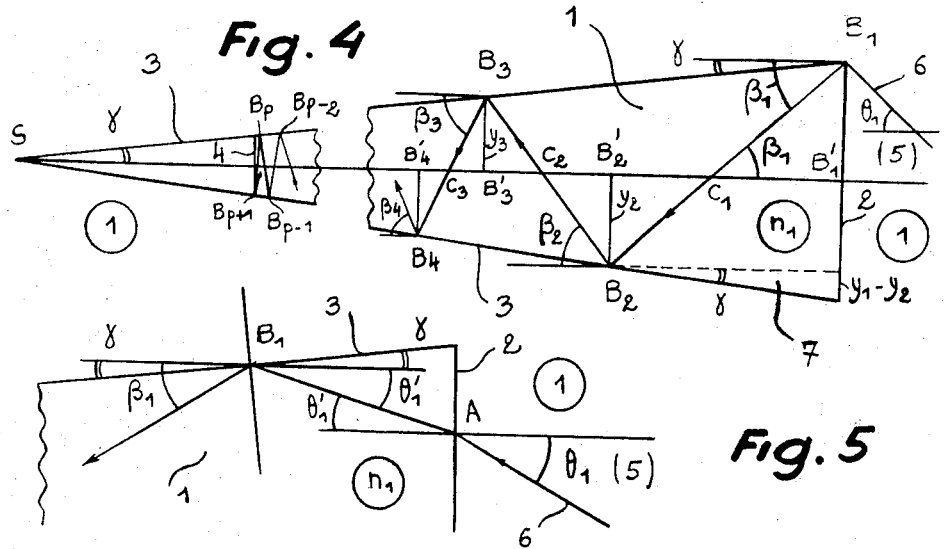
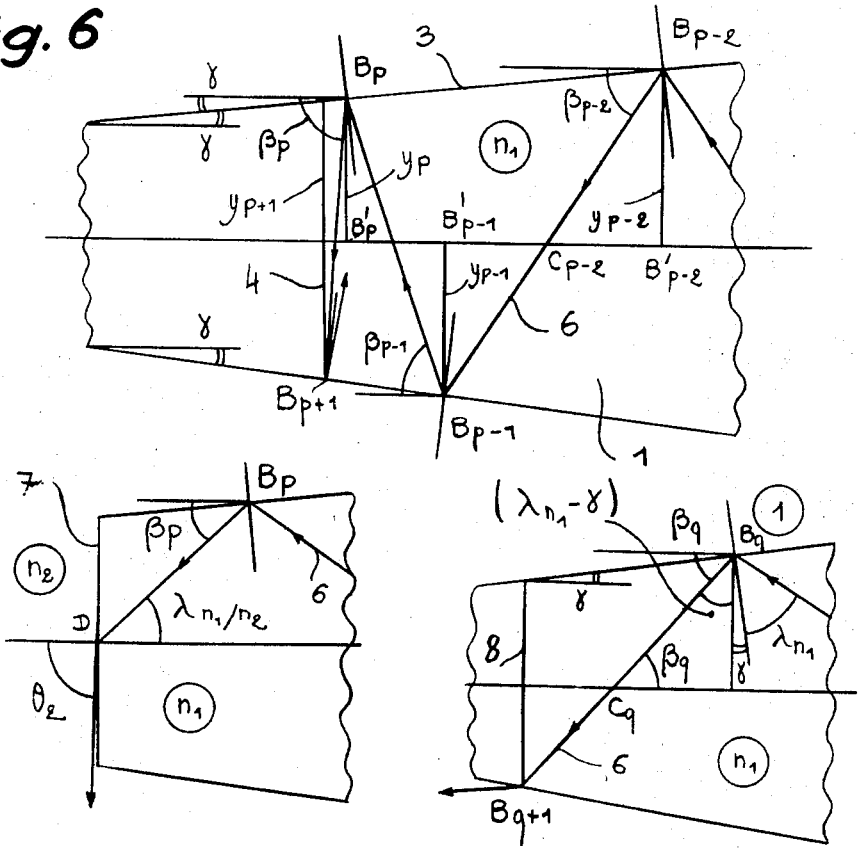

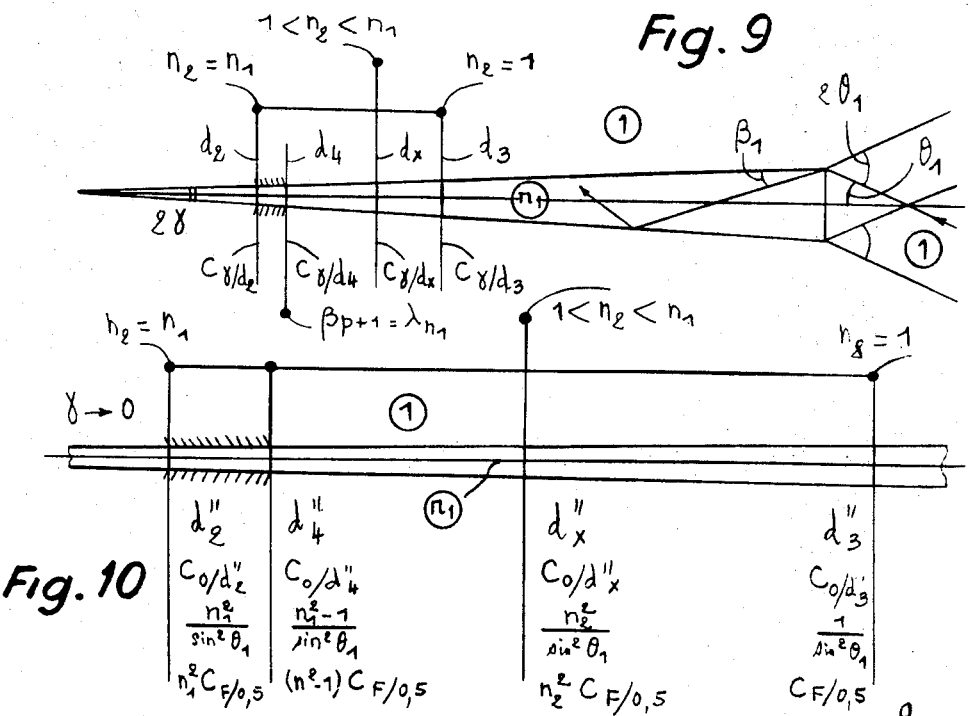
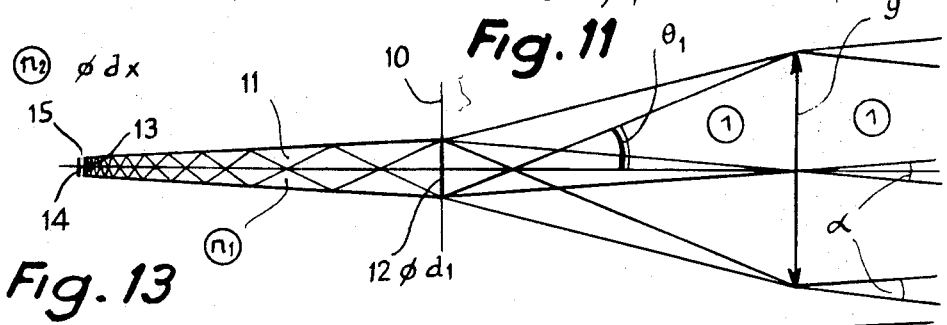
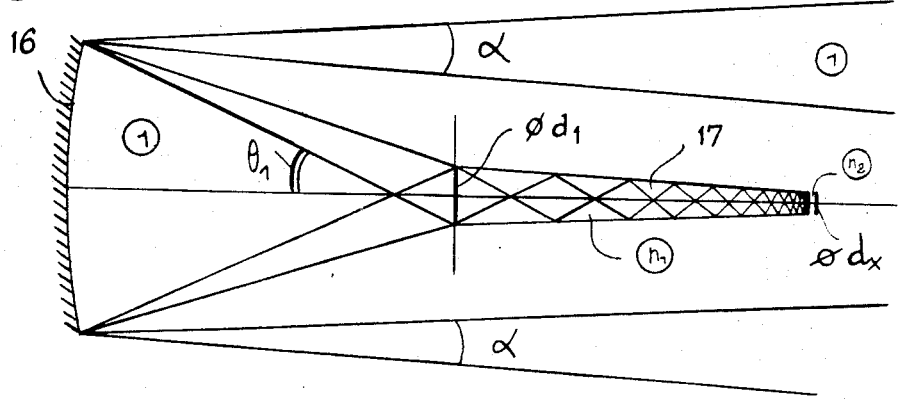

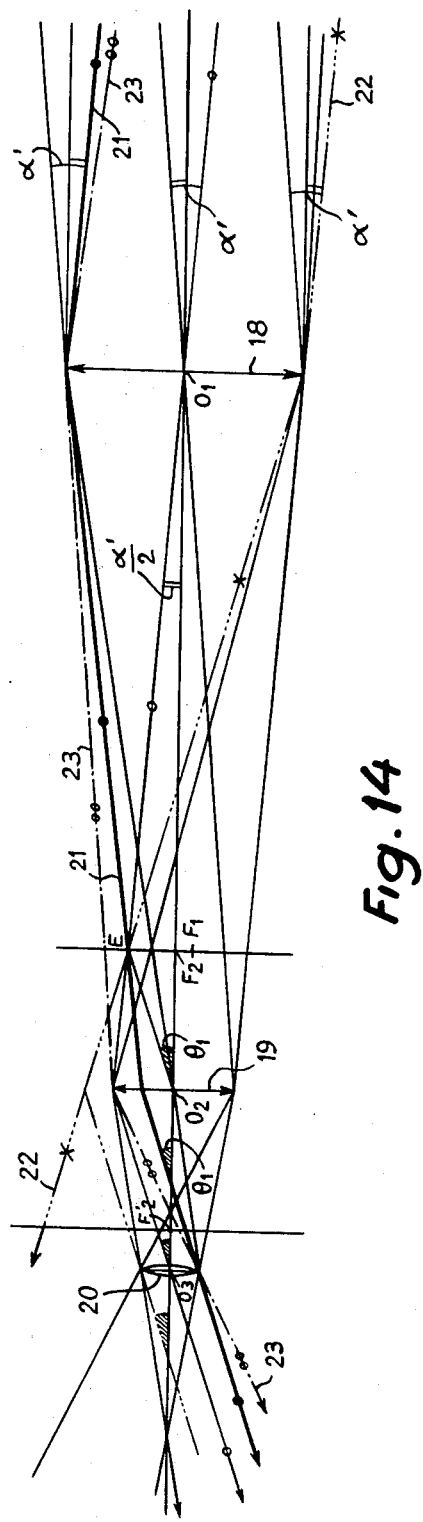
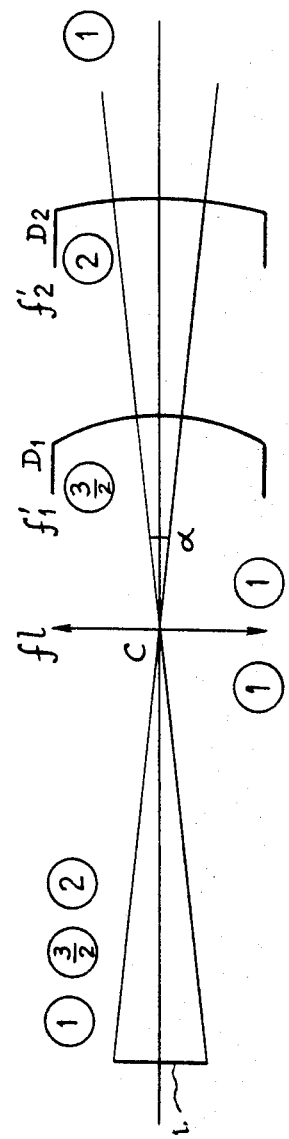

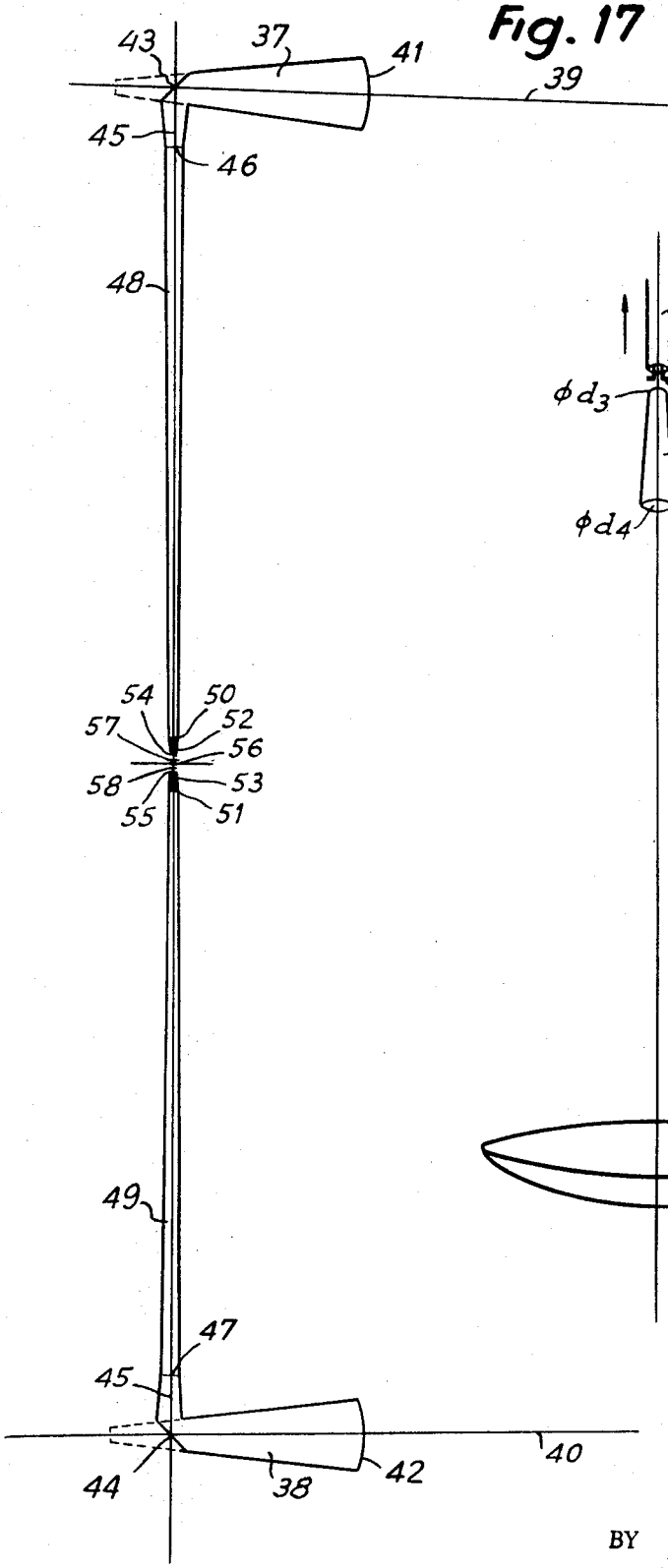

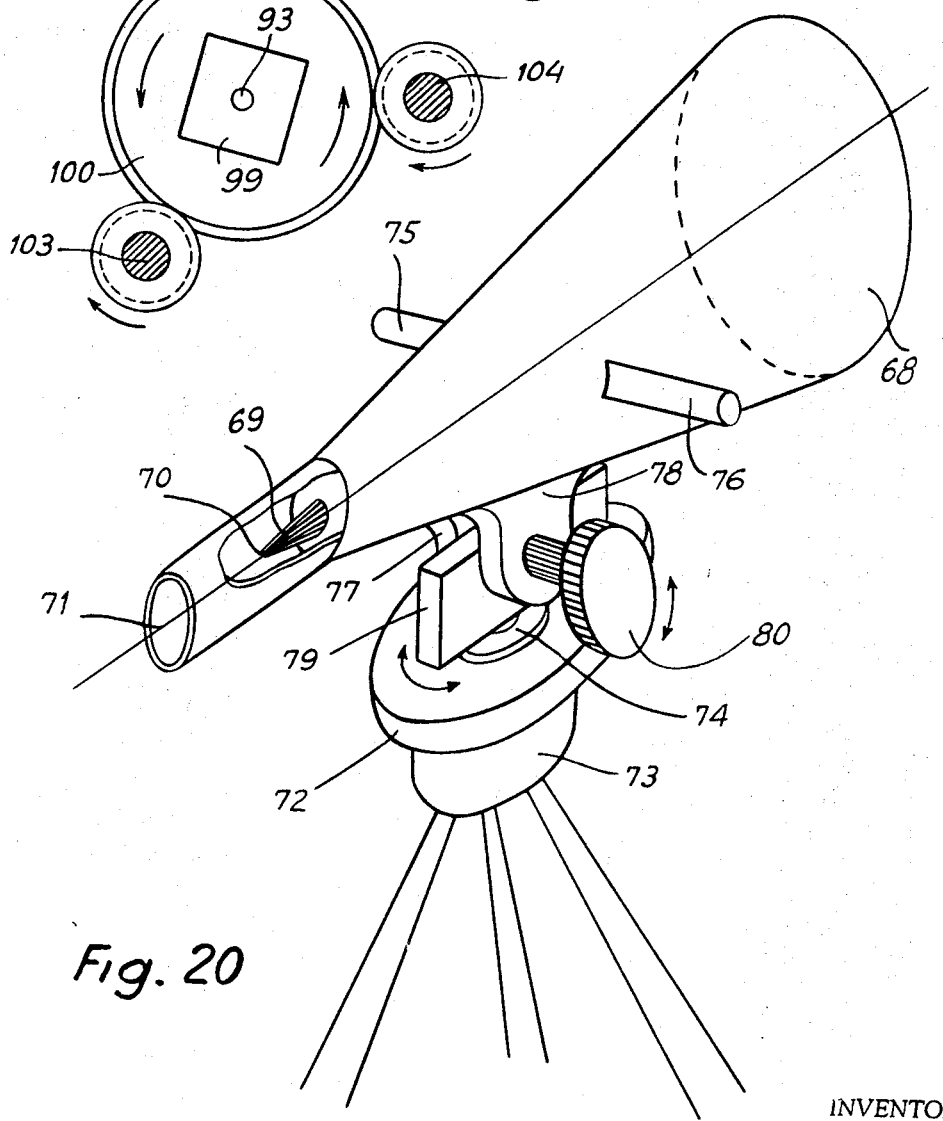

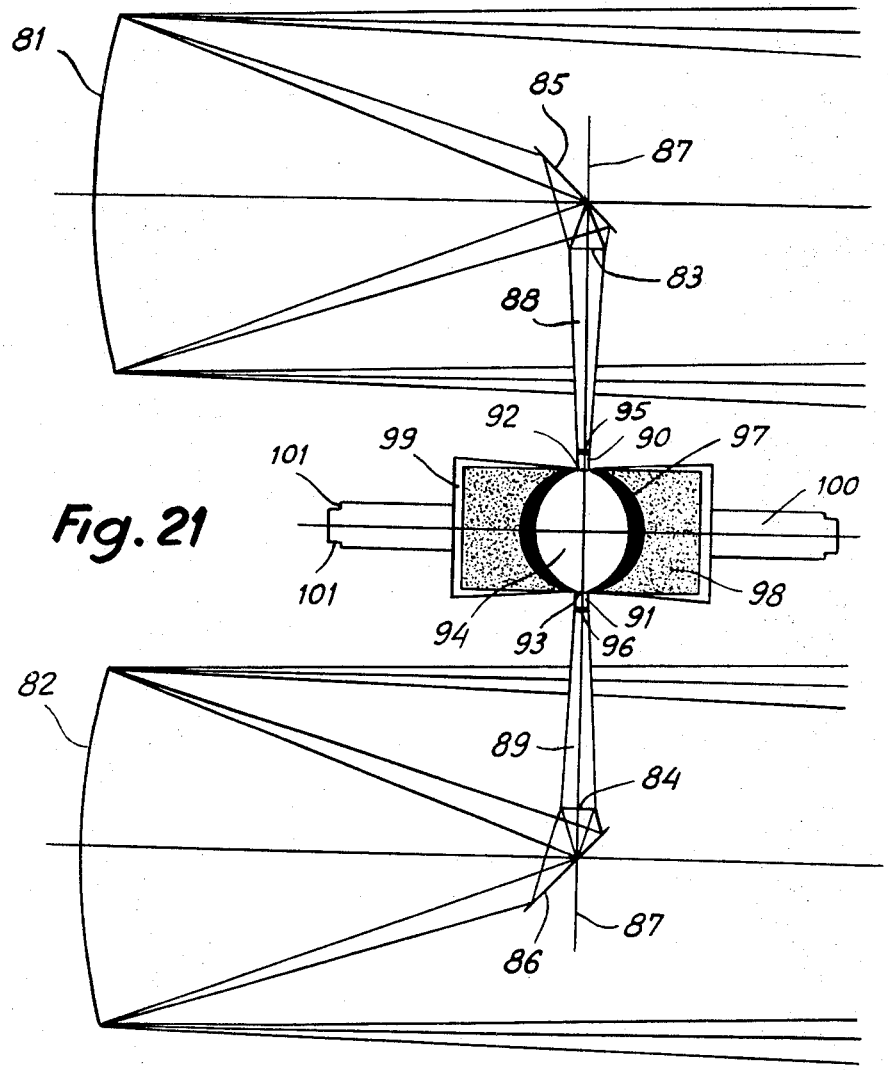

3,535,016
ELECTROMAGNETIC RADIATION CONCENTRATING APPARATUS EMBODYING FRUSTOCONICAL MIRROR ELEMENTS
Pierre Malifaud, Paris, France, assignor to Research Corporation, New York, N.Y., a corporation of New York
Filed Apr. 28, 1965, Ser. No. 451,509
Claims priority, application France, May 6, 1964, 973,468
Int. Cl. G02b 5/14
U.S. Cl. 350—96                                   3 Claims

ABSTRACT OF THE DISCLOSURE

Apparatus for the concentration of electromagnetic energy of all kinds with maximum efficiency comprises one or more frustoconical internally reflecting elements, arranged serially if there are more than one, associated with a frontal optical concentrating device or system delivering radiation at the maximum cross section of the frustoconical element or elements and with a radiation sensing element positioned at the minimum cross section of the frustoconical element or elements. The optical half-angle of the frustoconical element is of the order of $\frac{1}{10}$ radian as a maximum. It concentrates radiation entering its larger face from the frontal element by internal reflection to a maximum concentration at its smaller face where the radiation is passed to the sensing element. A preferred form of the frustoconical elements for concentrating light waves are bundles of conical fibers over the range of the spectrum for which material transparent to the wave-lengths concerned and formable into conical fibers is available. The frustoconical element may consist of a plurality of frustoconical members serially arranged with the minimum diameter face of the first coincident with the maximum diameter face of the next in series. The frustoconical members may be cut at suitable angles and sections folded back on each other at the cut faces to conserve space.

The invention comprises apparatus for the maximum concentration of electromagnetic radiation of all kinds including visible, ultraviolet and infrared light, radio and microwave radiation, X-rays and nuclear or cosmic radiation.

It may be used in bolometers, thermoelectric piles, pneumatic detectors, photoconductive cell detectors, scintillation counters, radar and maser detectors, television cameras, medical X-ray apparatus, astromonical apparatus, metascopes, image transformer tubes, sniperscopes, photographic cameras, spectrographic apparatus and solar furnaces.

Although researches directed at perfecting the radiation sensitive elements of such instruments and the associated devices, which may be of an electronic nature, have been pushed very far, on the contrary it appears that, apart from photographic devices and solar furnaces, insufficient attention has heretofore been paid to the frontal optical elements used in receivers. One sees even now, for example, otherwise highly perfected radiation detectors in which the front receiver is a simple "window" transparent to the radiation being detected, such as a plate with parallel or lightly curved faces without well defined optical characteristics. Thus the problem of the maximum optical concentration of a flux of radiant energy under the given conditions has not been solved or even posed.

Nevertheless it is clear that what is of primary importance for the efficiency of a receiver is the quantity of radiation utilized per unit of sensing surface, that is, the concentration of energy provided at the transducing element by the frontal radiation interceptor. The quotient of radiation energy flux at the sensing surface is the energy ilumination thereof and it must be emphasized that in general it is this value which is essential and not the total quantity of radiation intercepted. For example, a small photographic apparatus having a front lens 3 cm. in diameter and an aperture of F/2 intercepts less light than a large apparatus having a front lens of 5 cm. diameter and F/4 aperture. Nevertheless, the small camera would be four times as efficient, the illumination of the photographic plate at each element of the image being four times as large for an aperture of F/2 as for one of F/4, as is well-known.

Further, the interest in obtaining the greatest possible concentration of radiated energy per unit of sensitive surface of the receiver increases as the intensity of radiation available decreases. This is the case, for example, in the detection of natural infrared radiation emitted by objects and by human beings at a distance by day as well as by night or in the detection of a distant engine by a scanning head, or again for vision or photography in twilight or nocturnal conditions. It is particularly the case in the military field in the use of image transduction tubes or vidicons at night. In these areas electronic means for multiplying as greatly as possible the intensity of residual nocturnal radiation are used. In a moonless night under a covered sky, objects present a luminance of very low energy, of the order of $10^{-5}$ NIT (candles per square meter) of visible light, on the average, which is not detectable by the eye or by a presently available detector. If this luminance could be multiplied anly 100 times, an intensity of $10^{-3}$ NIT would be obtained which is that of the same objects in full moonlight. If multiplied by 100,000 a level of luminance of the order of a NIT would be obtained which is that of objects at twilight or of a properly illuminated television screen. This involves the solution of a problem of great civil and military importance: "to see without being seen." Examples could be multiplied in all fields of pure science and in their applications of all kinds (notably in the field of utilization of solar energy) where the necessity of obtaining the maximum concentration of energy by means of the frontal interceptor of energy is clear and imperative.

The term "bidiopter" is used hereinafter to designate generically reflective optical elements as distinguished from refractive elements and particularly to designate internally reflective frustoconical mirrors and frustoconical fiber optical elements.

The principle of the present invention by means of which this problem is solved and representative embodiments of those principles will be more particularly described with reference to the accompanying drawings in which:

FIG. 4 is a diagrammatic longitudinal section of a frustoconical bidiopter;

FIGS. 5 through 10 are fragmentary details illustrating aspects of the frustoconical bidiopter of FIG. 4;

FIGS. 11 through 13 are diagrammatic illustrations of the combination of a frontal convergent system with the bidiopter of FIG. 4;

FIG. 14 is a diagram of an afocal system;

FIG. 15 is a diagram of the combination of an afocal frontal system with a frustoconical bidiopter;

FIG. 16 is a diagram of a folded bidiopter embodying the principles of the invention;

FIG. 17 is a diagram of a thermistor bolometer embodying the principles of the invention;

FIG. 18 is a diagram of a concentrator coupled with a centimeter wave detector;

FIG. 19 is a diagram of a detector including means for sweep scanning of the field;

FIG. 20 is a diagram of a metascope embodying the principles of the invention;

FIG. 21 is a diagram of a solar furnace embodying the principles of the invention; and FIG. 22 is a diagram of a rotator for the solar furnace of FIG. 21.

Figure 1:
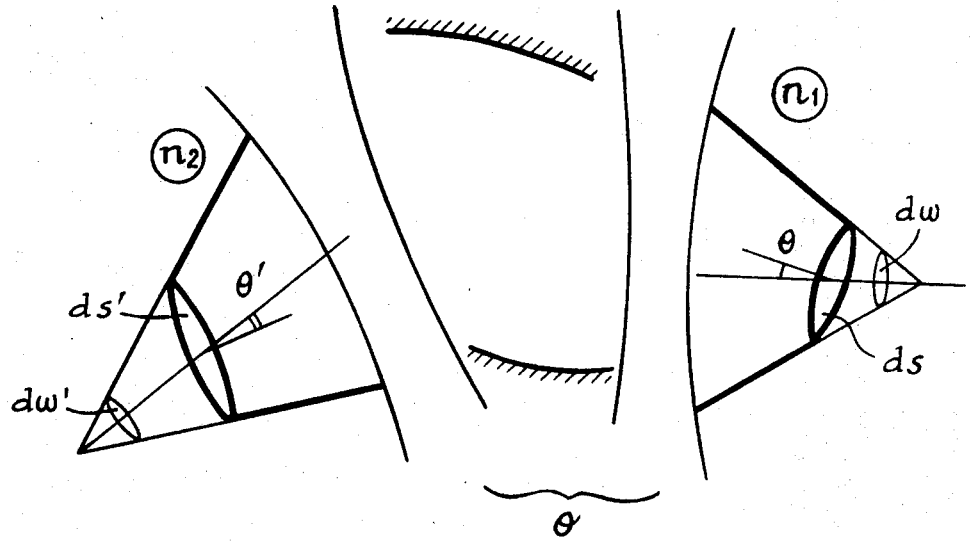
FIGS. 1 and 2 are diagrams illustrating the general description of the principles of the invention.

A convergent lens system forming an objective is characterized by relative aperture $1/N$ defined as the ratio of the diameter $2R$ of the front pupil to the focal distance F:

$$1/N = 2R/F$$

The objective is said to have an aperture $F/N$.

For a distant object of luminance B, such an objective forms in its focal plane a real image, the illumination E of which is $$E = T \frac{\pi B}{4N^2} \qquad (1)$$

where T is the coefficient of transmission of the objective and has a value always less than 1.

The luminance or brilliance B of a source or emitting object is the quotient of the luminous intensity I by the surface S of the source:

$$B \text{ (in NITS)} = \frac{I \text{(in candelas or new candles)}}{S \text{(in square meters)}}$$

If an object radiates uniformly in a demi-space a flux $\Phi$ (in lumens), the radiance R of the object (in lumens per m.²) is the quotient of the flux by the emitting surface S, that is, the surface density of the emitted flux.

The luminance B is related to the radiance by the formula $$B = R/\pi \qquad (2)$$

From Formulas 1 and 2 the relation between the radiance R of an object uniformly radiating in a demi-space and the illumination E of its image formed by a photographic objective is seen to be:

$$E = T \frac{R}{4N^2}$$

As it is known that the theortical limit of the aperture of a photographic objective has the maximum value 0.5, it results that for an object of given radiance R the illumination of its real image provided by a lenticular objective has a maximum value $$\lim E_{F/0.5} = T \frac{R}{4(\frac{1}{2})^2} = TR$$

or, given the transparence T of the objective at maximum value 1

$$\lim E_{F/0.5} = R \qquad (3)$$

Thus, the maximum concentration of a luminous flux by means of an objective lens system is attained when the illumination of the image has the same value as the radiance of the object, that is to say, when the quantity of flux received per unit surface of the image is equal to the quantity of flux emitted per unit surface of the object.

It is well known that this limit is not accessible in practice. Exceptional objective len systems of apertre F/0.59 have been realized but it is not simple to exceed F/1. A good current aperture is F/3 which corresponds to that of the human eye at night and to the objectives currently used in image intensifier tubes. At the aperture F/3 the concentration of radiant flux is 36 times smaller than the theoretical maximum concentration.

Referring to FIG. 1, if one considers a pencil of solid angle $d\omega$ formed of rays impinging on an element of a source of radiant energy of surface $ds$ in a medium of optical index $n_1$, the normal to which makes an angle $\theta$ with the mean axis of the pencil and a pencil of solid angle $d\omega'$ emerging from a medium of index $n_2$ after having undergone any number of refractions or reflections in an intermediate optical system schematically represented at $\theta$ and supposed to be nonabsorbent (neither diffusing or diffracting) one has, designating as $ds'$ the elementary surface of the minimum section of the pencil the normal of which makes an angle $\theta'$ with the mean axis of the pencil, the Clausius relation:

$$n_1^2 ds \cos \theta d\omega = n_2^2 ds' \cos \theta' d\omega' \qquad (4)$$

The application of this relation is not limited to the optics of light. It applies to all electromagnetic radiation and the photometric interpretation must be made with the use of energy values (energetic luminance, energetic illumination, etc.).

The photometric significance of this relation may be found by writing $$\frac{ds d\omega \cos \theta}{ds' d\omega' \cos \theta'} = \frac{n_2^2}{n_1^2}$$

Since the energetic luminance $B^e$ of a source element of surface $ds$ is:

$$B^e = \frac{\delta P}{ds d\omega \cos \theta}$$

(the letter P representing the transformed flux) and the energetic luminance $B^{e'}$ of an element of image or of irradiated surface of surface $ds'$ is $$B^{e'} = \frac{\delta P}{ds' d\omega' \cos \theta'}$$

therefore $$\frac{B^{e'}}{B^e} = \frac{ds d\omega \cos \theta}{ds' d\omega' \cos \theta'}$$

or $$\frac{B^{e'}}{B^e} = \frac{n_2^2}{n_1^2} \qquad (5)$$

Thus, the energetic luminance is conserved by approximately the factor $$\frac{n_2^2}{n_1^2}$$

in traversing the system. Since the radiance of a source and the illumination of an image are values of the same dimension relative to the luminance it follows that the energetic illumination E of any image or of a spot of radiation received on a screen in a section of surface $ds'$ is less than or at most equal to the energetic radiance $R^e$ of the source or emitting object of surface $ds$:

$$E^e \leq \frac{n_2^2}{n_1^2} R^e$$

The interest of the Clausius relation resides in the fact that it is of the most general application in physics. Not only is it valid for all possible optical systems but it arose from thermodynamic studies as a corollary of the principle of Carnot and presents a bar against all attempts to increase without limit the illumination of the image. But, although reasearch in that direction is thus definitely limited it has been found possible to define two possibilities which are far from being negligible: the first relates to the factor $$n_2^2/n_1^2$$

includede in the invariance relation; the second results from thermodynamic consideration related to the principle of Carnot and to optical exchanges between black bodies.

The first possibility is the expedient of immersion. In a medium of index a given flux is radiated in a solid angle $n^2$ times smaller than in air. But according to another law of thermodynamics, also due to Clausius, "the emissive power of a black body increases in direct proportion to the square of the index of refraction." The last optical medium in contact with the sensing element must then have an index as high as possible for the mean wave length of the radiation to be concentrated. Furthermore, the optical system used should be capable of obtaining in addition to all else the benefit of the $n^2$ factor, that is, of obtaining a concentration $n^2$ times as great as by means of a system of theoretical aperture F/0.5.

The second possibility makes possible an increase up to double the energetic illumination calculated in conformity with the conservation of luminance:

Traditional optical systems only transmit or concentrate radiation within $2\pi$ steradians, that is, in a demi-space. However, a black body can receive radiant energy over $4\pi$ steradians. Consequently, the traditional optical systems loose at least half of the radiant energy which it is possible to concentrate on a black body in the given conditions.

Optical concentrators operating over $4\pi$ steradians instead of $2\pi$ steradians are described in applicant's application Ser. No. 424,341 filed Jan. 8, 1965, now abandoned.

By combining this possibility with that of the $n^2$ factor previously defined, it can be concluded that the maximum power which can be concentrated on a given element, immersed in a medium of index $n$, is $2n^2$ times as great as the power which would be concentrated on the same element by a convergent optical system of aperture F/0.5.

If $R^e$ is the energetic radiance of an object emitting radiation in air and $\Sigma E^e$ the sum of energetic illuminations produced by all concentrations of flux from that object on a sensitive point element immersed in a medium of index $n$ $$\Sigma E^e = \leq 2n^2 R^e \qquad (7)$$

To indicate what that possible absolute concentration represents in relation to usual optic combinations some figures will be given. In comparison to the concentration obtained with a convergent system of aperture F/3 the absolute maximum concentration is 72 $n^2$ times as great. With a concentrator of ordinary glass ($n=1.5$) it would thus be 162 times as great. With an infrared concentrator of germanium ($n=4$) it would be 1,152 times as great. In comparison with the minimum concentration obtained by exposing the sensing element directly to radiation (or through a plate with parallel faces having anti-reflective coatings), the proportion can be established as follows:

Consider a source element of apparent diameter $\delta\alpha$, of luminance B, illuminating one face only of a sensing surface in air, the normal to the surface making an angle $\theta$ with the direction of the source. Each point of the sensing surface receives a flux of radiation in a solid angle $\delta\varphi$ of which the apex angle is equal to $\delta\alpha$. From photometry, it is known that the illumination E received by the sensing surface is $$E = B d\omega \cos \theta$$

The luminance B being invariant, the maximum concentration corresponds to a solid angle $\Omega$ of value $2\pi$ steradians (a demi-space) as if the sensitive element were at the center of a semi-sphere of uniform luminance B. Integrating $B\, d\omega \cos \theta$ from 0 to $2\pi$ gives the value $B\pi$ which is the maximum illumination.

Since the illumination received directly by the sensing surface assumed normal to the direction of the suorce ($\cos \theta = 1$) is $B\delta\omega$ the ratio of the concentrations is $$\frac{B\pi}{B\delta\omega} = \frac{\pi}{\delta\omega}$$

Expressing the solid angle $\delta\omega$ as a function of its demi-angle at the apex $\alpha/2$ one has $$\delta\omega = 2\pi \left(1 - \cos \frac{\alpha}{2}\right)$$

If $\alpha$ is small $\cos \alpha/2$ can be replaced by $$1 - \frac{(\alpha/2)^2}{2}$$

whence $$\delta\omega = 2\pi \left(\frac{\alpha^2}{8}\right)$$

and $$\frac{\pi}{\delta\omega} = \frac{4}{\alpha^2}$$

Otherwise stated, a flux of radiation received in an apparent angle $\alpha$ can be concentrated in air to a limit ratio:

$$C_{1/\max.} = \frac{4}{\alpha^2} \qquad (8)$$

Concentrating the flux simultaneously on the two faces of the sensing element the concentrating effect is double and the absolute value of the limit ratio is $$C_{1/\text{absolute}} = \frac{8}{\alpha^2} \qquad (9)$$

For example, if radiation from the sun (apparent minimum diameter at equinoxes: 31'32") by means of a concentrator acting in air on one demi-space only of a transducing element, the limit ratio of concentration is (to a near approximation) 47,536. At the present time the greatest concentration which has been effectively realized in a solar furnaces is of the order of 20,000. Acting in $4\pi$ radians (on the two faces of a sensing element simultaneously) it is possible to obtain a double heating effect, the limit-ratio of which amounts to 95,072.

If a black body is submitted to such a maximum concentration the absolute temperature which it would theoretically attain in the limit, the temperaure corresponding to the radiance of the sun viewed directly through the atmosphere, would be between 5,200 and 5,800° K. (at zenith at latitude 45°).

Including the factor $n^2$ due to immersion, the limit ratio between the maximum energetic effect of concentration and the effect of direct reception of the flux of radiant energy, in the case of concentration on only one face of the sensing element the value:

$$C_{n/\max.} = \frac{4n^2}{\alpha^2} \qquad (10)$$

and by concentrating the flux simultaneously on both faces of the sensing element the doubled value:

$$C_{n/\text{absolute}} = \frac{8n^2}{\alpha^2}$$

In the case of an abundant and very energetic radiation such as solar radiation one would be limited practically in the use of immersion by the fusion and thermal destruction of the optical materials used. On the contrary in the case of concentration of radiation of low intensity or energy (as in detection devices) the value of the limit ratio takes its full significance.

With a concentrator of ordinary glass ($n=1.5$) and apparent diameter of $\frac{1}{100}$ radian (about 30') the limit ratio of concentration, $$\frac{8n^2}{\alpha^2}$$

attains 180,000. With a concentrator of germanium ($n=4$) it attains about 1,300,000. For a source of apparent diameter of 3' or $\frac{1}{1000}$ radian (for example a source of 1 meter real diameter detected at 1 km.) the ratios have values of over 18 millions as about 130 millions.

The absolute maximum possibilities of the concentration of given flux of radiant energy being thus clearly established it is manifest that the results obtained by means of the traditional optical combination remain far below the possibilities.

The purpose of the present invention is to remedy that deficiency and, to that end, the principle object of the invention is to provide an optical concentrating apparatus permitting the attainment of a maximum energetic illumination on the sensing element of a radiation receiver characterized by the following features alone or in combination:

(1) The optical device comprises essentially in combination: a front optical concentrating system of aperture 1/N which receives a radiation flux from a spaced source supposed situated in air and which effects a first concentration of the flux forming a convergent beam the rays of which have a maximum angle $\theta_1$ to the optical axis of the system, $\sin \theta_1$ having a value of the order of 1/2N; and at least one frustoconical mirror, or an equivalent optical element, the apical half-angle $\gamma$ of the mirror being small, of the order of $\frac{1}{10}$ radian as a maximum, which effects a second concentration by means of internal reflections from the conical lateral surface, the large entrance face having a maximum diameter $d_1$ positioned at the minimum cross section of the beam concentrated by the front optical concentrating system, and the small section, associated with a radiation sensing element positioned in the plane where the beam attains its maximum concentration, having a minimum diameter $d_x$ the value of which is determined by the formula $$\frac{d_1}{d_x} = \frac{\sin [\beta_1 + (2p'-1)\gamma]}{\sin (\beta_1-\gamma)}$$

wherein $p'$, the maximum number of internal reflections undergone by a ray making the maximum angle $\theta$, with the optical axis at its entry into the frustocone, is determined by the relation:

$$p' = E\left[\frac{\text{Arc sin}\left(\frac{n_2}{n_1}\right) - \beta_1}{2\gamma} + 1\right]$$

wherein the large E denotes "the integral part of" the expression in brackets, $n_1$ being the index of refraction of the internal medium of the frustoconical mirror, $n_2$ being the index of the medium in optical contact with the sensing element at the small section of the frustoconical mirror, and $\beta_1$ being the angle defined by the relation $$\beta_1 = \text{Arc sin}\left[\frac{\sin \theta_1}{n_1}\right] + 2\gamma$$

the quantities $n_1$, $n_2$, $\sin \theta_1$ and $\tan \delta$ being also related by $$\left(\frac{1+\sqrt{\frac{n_1^2}{n_2^2}-1} \cdot \tan \gamma}{1+\sqrt{\frac{n_1^2}{\sin^2 \theta_1}-1} \cdot \tan \gamma}\right)^2 \geq \eta$$

in which $\eta$ represents the minimum energy yield to be provided by the concentrator in relation to the absolute maximum concentration defined by the expression:

$$\frac{n_2^2}{\sin^2 \theta_1}$$

(2) The device according to (1) comprises at least one frustoconical mirror consisting of a bidiopter in which the internal reflections are exclusively total reflections, the minimum diameter $d_x$ being determined by the relation given in (1) in which the number $p'$ is not more than the maximum number $q$ of total reflection determined the relation:

$$q = E\left[\frac{\frac{\pi}{2} - \text{Arc sin}\frac{1}{n_1} + 3\gamma - \beta_1}{2\gamma}\right]$$

the quantities $n_1$, $\sin \theta_1$ and $\delta$ being also related by $$\left(\frac{\cos 2\gamma + \sqrt{\frac{1}{n_1^2-1}} \cdot \sin 2\gamma}{\cos \gamma + \sqrt{\frac{n_1^2}{\sin^2 \theta_1}-1} \cdot \sin \gamma}\right)^2 \geq \eta$$

in which $\eta$ represents the minimum energy yield to be provided by the concentrator in relation to the absolute maximum concentration corresponding to that specification of the concentrator and defined by the expression:

$$\frac{n_1^2-1}{\sin^2 \theta_1}$$

(3) The device according to (1) or (2) comprises a bundle of bidiopter frustoconical mirrors, the large entrance faces of which are positioned in the same plane and in coincidence with the minimum cross section of a beam concentrated by the front optical concentrating system likewise positioned in the same plane.

(4) The device according to (1) or (2) comprises a plurality of serially arranged frustoconical mirrors or diopters, the first of which, of index $n'_1$, having its large entrance face, diameter $d_1$, being positioned at the front optical concentrating system of aperture 1/N, the second, having an index $n''_1$, greater than $n'_1$ and having its large entrance face in coincidence with the minimum section of the first, the third, having an index $n'''_1$, larger than $n''_1$ and having its large entrance face in coincidence with the minimum section of the second and so on, the apex angles of the respective mirrors or bidiopters being equal or not, the minimum section of the last mirror or diopter, in which the flux attains its maximum concentration being associated with a radiation sensitive element immersed in a medium of index $n_2$, and having a diameter $d_x$ such that the ratio $d_1/d_x$ for the ensemble of serial mirrors or diopters to the same specifications as defined in (1) for a single mirror or diopter, that is, that the ratio has a value as near as possible to the absolute minimum value:

$$\frac{n_2}{\sin \theta_1} \sim 2Nn_2$$

(5) The device according to (1), (2) or (4) comprises at least one frustoconical mirror or bidiopter having sections cut, preferably at 45° to the axis, to permit folding back on each other as in prismatic optical instruments.

(6) The device comprises in series: a first bundle of frustoconical mirrors or bidiopters according to (3) and one or more mirrors or bidiopters according to (1), (2), (4) or (5) wherein the large entrance face of the first of the mirrors or bidiopters is in coincidence with the ensemble of adjacent minimum sections of the first bundle.

(7) The device comprises a plurality of bundles of frustoconical mirrors or bidiopters according to (3) positioned in series according to the characteristics defined in (4).

(8) The device according to (1), (2), (4), (5) or (6) comprises conic or conoidal, not of revolution, mirrors or bidiopters, wherein the ratio of the areas of the large entrance face and of the minimum small base, in the plane containing the optical axis is in all cases equal to the square of the ratio $d_1/d_x$ specified in (1), (2) or (4), the maximum number of internal reflections being determined by the value assumed for the half-angle in the longitudinal section effecting the greatest linear reduction.

(9) The device according to (3) or (7) comprises a bundle or a series of bundles of frustoconical mirrors or bidiopters arranged according to (8), that is, so that the area of the ensemble of large entrance faces and the area of the ensemble of minimum sections are in the ratio defined in (8).

(10) Two devices according to (1) or (9) are arranged "in parallel," the small bases of minimum section of their last frustoconical mirrors or bidiopters are associated respectively, by any known means, with each of the two faces of the same sensing element, the latter being preferably a thin plate.

The general type of the radiation concentrators of the invention have been determined a priori by the theoretical principles conceived by applicant which are briefly explained in the following.

An optical concentrator presents an extrance pupil of surface $s$ and a terminal pupil of surface $s'$ (with $s' < s$).

It receives a flux in a solid angle $\omega$ and it finally concentrates the flux in a solid angle $\omega'$. For maximum concentration the ratio $s/s'$ must be as large as possible. Moreover, the concentrator, like any optical system, is governed by the Clausius relation. The most direct way of establishing a formula characterizing the concentrator and not neglecting any of the data of the problem is to carry out an integration of the Clausius invariant, $n^2 \cos \theta ds d\omega$, taking care to fix the conditions of integration so that the conditions necessary for a maximum concentration are included.

Figure 2:
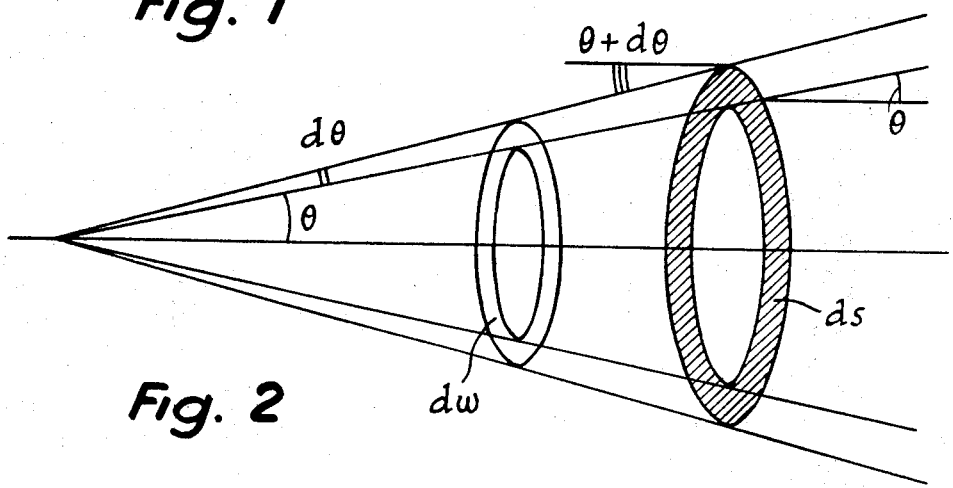

Referring to the diagram of FIG. 2, consider $d\omega$, the elementary solid angle of emission, as the difference of the solid angles of the two nested cones having respectively the half angles at the apex $\theta$ and $\theta+d\theta$. For every plane section perpendicular to the common axis of the cones, $\theta$ represents thus the angle which is made by the normal to the element of the section with the direction of the corresponding elementary pencil of rays. The element of surface $ds$ is taken as the difference of the right sections of the nested cones in the plane of the entrance pupil. An analogous diagram bringing in two nested cones having respectively the apical demi-angles $\theta'$ and $\theta'+d\theta'$ (not represented in the figures) is proposed for $d\omega'$, the elementary terminal solid angle and for $ds'$, the element of surface of the minimum section of the last pencil.

The ensembles thus considered are figures of revolution about their optical axes which restrains very little the generality of the treatment. On the contrary the schemes proposed for integration imply the supplemental restrictive hypotheses which express the necessary conditions for a maximum concentration: the elements $ds$ are all connected and do not overlap and the same is true of the elements $ds'$ and all of the elements $d\omega$ and $d\omega'$.

The surfaces $s$ of the circles are replaced by the expression $\pi/4 \cdot a^2$ as a function of their diameter $a$; and the solid angles $\omega$ by the expressions $2\pi(1-\cos \theta)$ as a function of the demi-angle $\theta$ at the apex of the cone, giving $$n_1^2 \cos \theta \, ds d\omega = n_1^2 \cos \theta \pi a/2 da d[2\pi(1-\cos \theta)]$$

or $$n_1^2 \cos \theta \, ds d\omega = \pi^2 n_1^2 a \cdot \cos \theta \sin \theta d\theta da$$

which is integrated according to:

$$\pi^2 n_1^2 \iint_{(D)} a \cdot \cos \theta \sin \theta d\theta da$$

the domain (D) being defined for $a$ varying from 0 to $d_1$ (diameter of the entrance pupil of the system) and for $\theta$ varying from 0 to $\theta_1$ (the maximum value).

This gives $$\pi^2 n_1^2 \int_0^{d_1} a \cdot da \int_0^{\theta_1} \cos \theta \sin \theta d\theta_1 =$$

$$\pi^2 n_1^2 \frac{d_1^2}{2} \frac{\sin^2 \theta}{2} = \frac{\pi^2}{4} n_1^2 d_1^2 \sin^2 \theta_1$$

The same reasoning may be applied to the invariant $$n_2^2 \cos \theta' ds' d\omega'$$

at the terminal part of the system in a domain (D') defined for $a$ varying from 0 to $d_2$, the diameter of the terminal pupil of the system and $\theta'$ varying from 0 to $\theta_2$ the maximum value giving finally, all of the quantities being positive:

$$n_1 d_1 \sin \theta_1 = n_2 d_2 \sin \theta_2 \qquad (12)$$

One recognizes immediately in the said relation (Equation 12) the Abbe sine law which characterizes aplantism in optics, that is, approaching stigmatism. This is not surprising since the conditions posed for the integration of the invariant of Clausius imply in effect aplantism. There is therefore a theoretical link between the conditions of maximum concentration and those of aplanatism.

One equally recognizes, in eliminating the indices $n_1$ and $n_2$, supposed equal, the general formula of fiber optics of the conical type ("tapered fibers"). This is not surprising since a tapered fiber constitutes the most simple of the aplanatic systems. At the limit, if the sections of entrance and exit of such a fiber become infinitely small they constitute a perfectly stigmatic system whatever the angle of the entering rays, that is without regard for the conditions of Gauss. This is not true of any of the other known convergent optical systems such as combinations of lenses, diopters or mirrors; they can only be aplanatic for paraxial rays, or in the immediate vicinity of one of their two points of absolute stigmatism (such as the points of Weierstrasse, for example, for a spherical diopter). The fact that a fiber does not transmit an image like the other traditional systems should not be illusory. A bundle of conical fibers can provide an image theoretically as fine as desired, surpassing thus in theoretical stigmatism all other known systems, without any regard for the conditions of Gauss.

Figure 3:
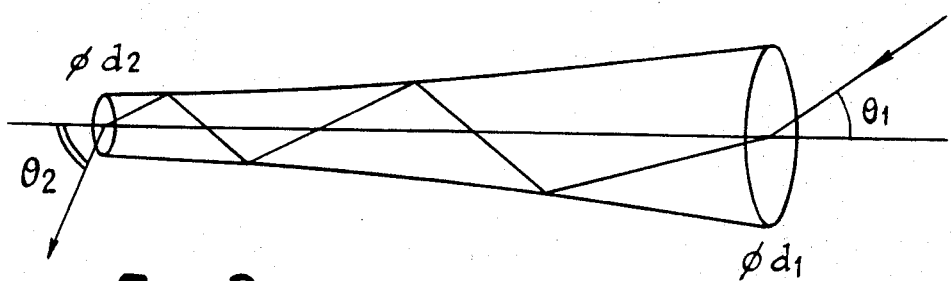
FIG. 3 is a diagram illustrating the discussion of tapered fiber optics.

The case of conical fibers is therefore preferred for the problem of maximum concentration of a radiation flux. Their properties are briefly recalled with reference to FIG. 3.

Consider a conical fiber with large entrance face of diameter $d_1$ and small exit face of diameter $d_2$. A ray entering at an angle $\theta_1$ to the axis leaves at angle $\theta_2$ after having undergone a series of total reflections in the fiber. In its usual mode of use the fiber is immersed in air and its index of refraction is not involved. The general formula is well known and is found, for example, in the "Fiber Optics Handbook," published in 1961 by the American Optical Company, Southbridge, Massachusetts:

$$d_1 \sin \theta_1 = d_2 \sin \theta_2 \qquad (13)$$

It will be seen that the length of the fiber is not involved, any more than the precise form of its longitudinal profile, provided that the length is very large in comparison with the mean section. In reality, formula (13) expresses a limit relation, exact only for a fiber of infinite length and approximately satisfied for a very long fiber. It would be entirely false for a cone in the ordinary sense. The authors do not indicate any limits for the correct application of the formula. In the usual conical fibers the half-angle at the tip has a very low mean value (a few minutes of arc or value of the order of $1/1000$ radian). But the curving shape arising from the drawing of the fibers renders imprecise the notion of a mean value of the half-angle at the tip.

To obtain images a large number of conical fibers are associated to form a tapered fiber bundle. Thus the flux from an object is analysed by the mosaic formed by the large entrance sections of the flux and an image is formed by the mosaic of the small exit sections. To cite a currently encountered example, the bundle of fibers would comprise 25,000 conical fibers each having a large entrance face 250 microns in diameter and a length of 100 mm. In this example, the ratio of the diameter is 5 and the ratio of concentration of light is 25.

The conical fibers thus appear, at first view, to be fully indicated for the concentration of a flux of radiant energy. However, in the actual state of fiber optics technique and of the techniques which use them, some observations must be made which limit or even obstruct this sort of use.

To begin with, there cannot be any question of using conical fibers directly to concentrate a luminous flux from a distant source. Their length would be inordinate. If one wants to concentrate a flux in a field of 8° with an efficiency of the same order as that of a theoretical convergent system of aperture F/0.5 with a bundle of 20,000 conical fibers each having a diameter of 50 microns at the exit, one would need fibers 40 meters in length with an entrance diameter of 100 mm. for each fiber and 16 meters for the entire bundle—as a simple calculation will show (introducing the concentration ratio $4/\alpha^2$ in Formula 8 with, here, $$\alpha \simeq 8°/160 \simeq 1/1000 \text{ radian}$$

for each fiber). If one associates the conical fibers with a convergent optical system to reduce their length, one would be on the way to a more acceptable solution. Nevertheless an empirical association would not furnish the best combinations assuring maximum concentration. Many factors come into play, notably, simplicity and cost of producing practical systems. The problem will be treated hereinafter in a complete manner and the solutions utilizing conical fibers will be proposed and constitute the particular application of the invention.

Further, the fact $n^2$, authorized by the Clausius relation and present in the formula which results from its integration, is absent from the general formula of conical fibers. These are generally used in air. The problem of immersing the sensing elements in the fibers and its diverse implictaions is to be studied and will be returned to as a particular case of application of the invention.

Finally, the technique and the applications of fiber optics are ancillary to the technology of drawn glass. Actually, fibers have been conceived essentially in connection with visible light and, in a strict sense, with the near infrared. But in these domains more notable materials, such as germanium for example, cannot be drawn into fibers like glass. The present conception of conical fibers is here again not adapted for utilization as a concentrator of radiation.

One must conclude from these remarks that it is necessary to pursue the problem further and to generalize the conception of a total reflection concentrator, which has been retained, according to the integration of the Clausius relation, as being the most simple and the most direct, and of which the conical glass fibers represent only a particular example.

Such a concentrator can be defined in general terms as a frustoconical diopter, that is, a truncated cone of refractive material, having a large flux receiving right section, a minimum right section where the flux attains its greatest concentration, and a lateral conic surface whereby the radiation is concentrated by internal reflections. In its more general aspect the internal reflections do not have to be total reflections, but may be reflections from a lateral mirror surface, such as a metallic coating. In a further general aspect, the concentrator may be a conical mirror, the index of the interior medium having the value 1, in which case it is a simple mirror, or a value greater than 1, in which case it is a bidiopter, and the term "frustoconical mirror" is used herein to include mirrors in the more limited sense and bidiopters, according to whether the index of the interior medium is 1 or greater than 1. The mirror or the bidiopter may have an internal surface which is longitudinally arched, having substantially the same optical effect as a conical surface, as is the case with drawn glass fibers. The lateral surfaces need not be true surfaces of revolution; the right sections being, for example, elliptical, or the lateral surface may be "conoidal" and transform a flux of circular section into one concentrated into a rectilinear section. Only the bidiopters which are frustocones "of revolution" will be considered in detail and will serve as models for all the others, these being the form of frustoconical concentrators most frequently used.

The determination of the characteristics of truncated cones best adapted to attain the maximum concentration of radiation will be more fully discussed with reference to FIGS. 4 through 10.

The bidiopter 1, of index of refraction $n_1$, is cut from a cone of revolution of apex S and apex demi-angle $\gamma$. It presents a large flux receiving face 2, of diameter $d_1$, a conical lateral surface 3 and a small face 4 of minimum diameter $d_2$ where the flux attains its greatest concentration. The received flux 5, supposed in air, is a pencil of rays whose maximum inclination to the optical axis is the angle $\theta_1$. The value $d_2$ of the diameter of the small face 4 and, at the same time, the ratio of the maximum concentration of flux $d_1/d_2$ is to be determined. To avoid confusing different problems, the first part of the discussion will consider only the progression of the rays in the interior of the cone, eliminating consideration of conditions of total reflection which will be considered subsequently.

It is evident that in a cone, any ray entering a right section (and not passing through the apex, a very particular case) will progress by a certain number of reflections from the lateral surface of the cone up to a certain limit at which the ray reverses upon itself and leaves the cone by the same section through which it entered. It can easily be shown that the ray progresses the less far in the cone, the nearer it is to the circumference of the right section and the greater its inclination to the optical axis. For a received pencil 5 (FIG. 4) the less favored rays are those such as 6, having a maximum inclination $\theta_1$ to the axis and entering near the edge of the large face 2. The course of ray 6 is calculated with assurance that, if it attains as certain minimum right section, all other received rays will also attain it.

Referring to FIG. 5 which shows in detail on a very large scale a ray 6 entering large face 2 at point A near its circular edge and being refracted inclination to the axis having a value $\theta_1'$ such that $n_1 \sin \theta_1' = \sin \theta_1$.

The refracted ray strikes the side of the cone for the first time at $\beta_1$. After reflection (total) at this surface its new inclination to the axis is $\beta_1$. This angle will be important in the calculations and its value is easily established. On FIG. 5, $\theta_1' + \gamma = \beta_1 - \gamma$ (by reflection) whence $\beta_1 = \theta_1' + 2\gamma$ and since $\theta_1' = $ Arc sin (sin $\theta_1/n_1$) (by refraction), $$\beta_1 = \text{Arc sin} \left[\frac{\sin \theta_1}{n_1}\right] + 2\gamma \qquad (14)$$

The inclination of the ray to the optical axis is thus augmented by $2\gamma$ upon reflection from the surface of the cone. It is the same at each reflection and this is the fundamental phenomenon for the progression of the ray in the conic diopter.

Returning to FIG. 4, the ray 6 is reflected at successive points $B_1$, $B_2$, $B_3$ . . . on the surface of the cone up to a point $B_p$ where, for the last time, it is reflected toward the apex of the cone. It finally strikes the lateral surface at point $B_{p+1}$ and is reflected backwards, as detailed in FIG. 6.

The right section through $B_{p+1}$ is then the minimum section of the cone attained by ray 6 and the value $d_2$ of its diameter is now to be determined. All this is with reservation of the conditions for total reflection to be considered subsequently.

Designate by $y_1$ the radius of the large receiving face 2, by $y_2$ the radius of the right section passing through $B_2$ and so on $y_3$, $y_4$ . . . to $y_p$ the radius of the right section through $B_p$ and $y_{p+1}$ the radius of the minimum section through $B_{p+1}$. Designate by $B_1'$, $B_2'$, $B_3'$ . . . $B_p'$, $B'$, $B_{p+1}'$ the projections on the optic axis of points $B_1$, $B_2$, $B_3$ . . . $B_p$, $B_{p+1}$, respectively; by $x_1$, $x_2$, $x_3$ . . . $x_p$ the distances $B_1'$ $B_2'$, $B_2'$, $B_3'$, $B_3'$ $B_4'$ . . . $B_p'$ $B_{p+1}'$; and by $C_1$, $C_2$, $C_2$ . . . $C_p$ the intersections with the axis of the segments $B_1 B_2$, $B_2 B_3$, $B_3 B_4$ . . . $B_p B_{p-1}$ respectively.

Then in the right triangle 7 (FIG. 4)

$$\tan \gamma = \frac{y_1 - y_2}{x_1}$$

and since, in the right triangle $B_1$ $C_1$ $B_1'$ and $B_2$ $C_1$ $B_2$ $$x_1 = y_1 \cot \beta_1 + y_2 \cot \beta_1$$

then $$\tan \gamma = \frac{y_1 - y_2}{\cot \beta_1 (y_1 + y_2)}$$

or $$y_1 - y_2 = \tan \gamma \cot \beta_1 (y_1 + y_2)$$

and $$y_2 = \frac{y_1(1-\tan\gamma\cot\beta_1)}{1+\tan\gamma\cot\beta_1}$$

or multiplying above and below by $\tan\beta_1$ $$y_2 = y_1 \frac{\tan\beta_1 - \tan\gamma}{\tan\beta_1 + \tan\gamma}$$

By the same reasoning $$y_3 = y_2 \frac{\tan\beta_2 - \tan\gamma}{\tan\beta_2 + \tan\gamma}$$

$$y_p = y_{p-1} \frac{\tan\beta_{p-1} - \tan\gamma}{\tan\beta_{p-1} + \tan\gamma}$$

$$y_{p+1} = y_p \frac{\tan\beta_p - \tan\gamma}{\tan\beta_p + \tan\gamma}$$

which solve to $$y_{p+1} = y_1 \prod_{i=1}^{i=p} \frac{\tan\beta_i - \tan\gamma}{\tan\beta_i + \tan\gamma}$$

wherein the large "pi" denotes the vector product of all the integers from $i=1$ to $i=p$.

Taking count of the formulas:

$$\tan\beta_i - \tan\gamma = \frac{\sin(\beta_i - \gamma)}{\cos\beta_i \cos\gamma}$$

and $$\tan\beta_i + \tan\gamma = \frac{\sin(\beta_i - \gamma)}{\cos\beta_i \cos\gamma}$$

$$\frac{\tan\beta_i - \tan\gamma}{\tan\beta_i + \tan\gamma} = \frac{\sin(\beta_i - \gamma)}{\sin(\beta_i + \gamma)}$$

and $$y_{p+1} = y_1 \prod_{i=1}^{i=p} \frac{\sin(\beta_i - \gamma)}{\sin(\beta_i + \gamma)}$$

Since it is known that $$\beta_2 = \beta_1 + 2\gamma$$

$$\beta_3 = \beta_2 + 2\gamma$$

$$\beta_p = \beta_{p-1} + 2\gamma$$

$$\beta_{p+1} = \beta_p + 2\gamma$$

$$y_{p+1} = y_1 \frac{\sin(\beta_1-\gamma)\cdot\sin(\beta_1+\gamma)\cdot\sin(\beta_1+3\gamma)}{\sin(\beta_1+\gamma)\cdot\sin(\beta_1+3\gamma)\cdot\sin(\beta_1+5\gamma)}\cdots$$

$$\cdots \frac{\sin[\beta_1+(2_p-3)\gamma]}{\sin[\beta_1+(2_p-1)\gamma]}$$

from which $$y_{p+1} = y_1 \frac{\sin(\beta_1-\gamma)}{\sin[\beta_1+(2p-1)\gamma]}$$

or in terms of the diameters $d_1$ and $d_2$ $$d_1/d_2 = \frac{\sin[\beta_1+(2p-1)\gamma]}{\sin(\beta_1-\gamma)} \quad (15)$$

This ratio is a function of $\beta_1$ and thus according to Equation 14, a function likewise of $\theta_1$, of $\gamma$, and of $p$. The number $p$ represents exactly the maximum number of reflections which ray 6 (the least favorable of the received pencil) can make from the lateral conic surface without reversing. It remains to determine the value of the number $p$ as a function of $\beta_1$ and $\gamma$.

The ray 6, increasing its inclination to the optical axis by $2\gamma$ at each reflection can be reflected $(\beta_p-\beta_1)/2\gamma$ times between the points $B_1$ and $B_p$; that is in all (including reflection $B_1$)

$$p = \frac{\beta_p - \beta_1}{2\gamma} + 1$$

The maximum value of $p$ thus depends on the maximum value of $\beta_p$ which is obviously $\pi/2$. The expression $(\pi/2-\beta_1)/2\gamma$ does not in general represent a whole number and $p$ must be taken as "the integral part" of $$\frac{\pi/2-\beta_1}{2\gamma}+1$$

which may be written $$p = E\left[\frac{\pi/2-\beta_1}{2\gamma}+1\right] \quad (16)$$

The Formulas 14, 15 and 16 define the minimum value of the diameter $d_2$ of the right section of the cone in which it is possible to concentrate all of the received flux under the given conditions. Denoting the absolute maximum concentration under these conditions by $C\gamma/d_2$ we have:

$$C\gamma/d_2 = (d_1/d_2)^2$$

or $$C\gamma/d_2 = \frac{\sin^2[\beta_1+(2p-1)\gamma]}{\sin^2(\beta_1-\gamma)} \quad (17)$$

For a sensing surface of the receiver to make full use of this maximum concentration it is necessary and sufficient that the sensing surface be immersed in the minimum right section and that it coincide therewith, its own diameter having the same value $d_2$. The frustoconical bidiopter of maximum concentration having a receiving face of diameter $d_1$, a small face of diameter $d_2$ and an apical demi-angle $\gamma$ is thus fully defined for a given pencil of radiation of maximum inclination $\theta_1$.

But it is not always possible to immerse the sensing surface directly at the small face of the bidiopter. In many cases, it must be immersed in an intermediate optical medium the index of refraction $n_2$ of which is smaller than the index $n_1$ of the bidiopter. The small face can then no longer be the right section of diameter $d_2$, since a certain number of the concentrated rays undergo a total reflection at the small face and cannot penetrate the medium of index $n_2$ and reach the sensing surface. It becomes necessary to generalize the foregoing formulas to the case where the sensing surface is immersed in a medium of any refractive index $$(1 \leq n_2 \leq n_1).$$

The sensing element being positioned as close as possible to the small outlet face of the bidiopter, the maximum exit angle of ray 6 is $\pi/2$ (see FIG. 7). The maximum angle of incidence of ray 6 on the outlet face in the interior of the bidiopter is $\lambda n_1/n_2$, the angle of total reflection of a medium of index $n_1$, with respect to a medium of index $n_2$, so $$\lambda n_1/n_2 = \text{Arc sin}(n_2/n_1)$$

The maximum value of angle $\beta_p$ is then likewise in this case: Arc sin $n_2/n_1$ (FIG. 7) and denoting by $p'$ the maximum number of reflections that ray 6 can undergo from the lateral surface of the frustocone:

$$p' = E\left[\frac{\text{Arc sin}(n_2/n_1) - \beta_1}{2\gamma}+1\right] \quad (18)$$

This formula is of broad scope while Formula 16 is only a particular case as will be seen when in Formula 18 $n_2$ is equal to $n_1$ since Arc sin $1=\pi/2$. Giving $n_1$ the value 1, Formula 18 becomes generally applicable to frustoconical mirrors.

Denoting by $d_x$ the minimum value of the small face of the bidiopter in the general case where the sensing surface is immersed in a medium of index $n_2$, the relation between the diameter $d_x$ and the diameter $d_1$ of the large face becomes:

$$d_1/d_x = \frac{\sin[\beta_1+(2p'-1)\gamma]}{\sin(\beta_1-\gamma)} \quad (19)$$

The corresponding maximum concentration is:

$$C\gamma/d_x = \frac{\sin^2 [\beta_1 + (2p'-1)\gamma]}{\sin^2 (\beta_1 - \gamma)} \qquad (20)$$

The relation 19 together with relations 14 and 18 suffice to characterize all the possible frustoconical mirrors or bidiopters. The concept of maximum concentration of a given flux is thus not absolute but is relative to the value $n_2$ of the index of refraction of the last medium in optical contact with the sensing element of the receiver.

The least favorable case is that where $n_2=1$, that is, the case where the sensing element is immersed in air. In this case the expression Arc sin $n_2/n_1$ in the general Forumla 18 by the known value of the angle $\lambda n_1$ of total reflection in the medium of the bidiopter giving:

$$p_1 = E\left[\frac{\lambda n_1 - \beta_1}{2\gamma} + 1\right] \qquad (21)$$

Denoting by $d_3$ the minimum value of the diameter of the small face in this particular case Formula 19 becomes:

$$d_1/d_3 = \frac{\sin [\beta_1 + (2p_1'-1)\gamma]}{\sin (\beta_1 - \gamma)} \qquad (22)$$

and the maximum concentration $C\gamma/d_3$ is:

$$C\gamma/d_3 = \frac{\sin^2 [\beta_1 + (2p_1'-1)\gamma]}{\sin^2 (\beta_1 - \gamma)} \qquad (23)$$

The most favorable case is that in which $n_2=n_1$, that is to say the case in which the sensing element is immersed directly on the small face of the bidiopter, and the more so the greater the refractive index $n_1$. It is only limited by the properties of the available materials and the conditions of the application in view. It should be noted that in every case where $n_2 < n_1$, the index $n_1$ of the bidiopter does not itself have any effect on the theoretical maximum concentration. As for the case where $n_2$ is greater than $n_1$, it is of no practical utility. Either it is possible to form the bidiopter of the material of index $n_2$ in which case $n_2=n_1$ or, if it is not possible, there is no additional advantage of the higher index and the result is the same as if the sensing element were immersed in the bidiopter.

To determine the condition of total reflection of the ray 6 the formula $$p = \frac{\beta_p - \beta_1}{2\gamma} + 1$$

may be transposed. This condition is clearly that the angle of incidence of ray 6 on the lateral conical surface is greater or at least equal to the angle of total reflection in the medium of the bidiopter, or $\lambda n_1$ in the general case where the surface is bathed in air. Referring to FIG. 8, it will be seen that this condition implies for the angle $\beta_q$ corresponding to the last point of total reflection $B_q$ $$\beta_q = \pi/2 - (\lambda n_1 - \gamma)$$

whence $$q = E\left[\frac{\pi/2 - \lambda n_1 + \gamma - \beta_1}{2\gamma} + 1\right]$$

or $$q = E\left[\frac{\pi/2 - \lambda n_1 + 3\gamma - \beta_1}{2\gamma}\right] \qquad (24)$$

The letter $q$ designates here the maximum number of total reflections. In the case where the surface of the bidiopter is not bathed in air but in a medium of index $n_3$ (a sheathed bidiopter, for example), the angle $\lambda n_1$ is replaced, in Equation 24 by:

Arc sin $n_3/n_1$

Comparing Formulas 16 and 24 it will be seen that the maximum number $p$ of reflections in the case of immersion in the bidiopter is larger than the number $q$ of possible total reflections. In effect, $\lambda n_1$ is in general larger than $3\gamma$ since $\gamma$ cannot, as will be seen below, exceed a few degrees in practice, while $\lambda n_1$ is at least equal to about fifteen degrees (for $n_1=4$, for example in the case of germanium). Therefore, one would not fully benefit from the maximum concentration permitted by immersion of the sensitive element in the bidiopter, if one were restricted to the use of natural total reflection. To benefit nearly to the point of loss by absorption, from that maximum concentration it is necessary to use a reflective coating (silver, gold, aluminum, or other) on the terminal portion of the lateral frustoconical surface between the points $Bq+1$ (FIG. 8) and $Bp+1$ (FIG. 6), that is, between sections 8 and 4.

Denoting by $d_4$ the minimum value of the diameter of the right section passing through point $Bq+1$, Formula 19 becomes:

$$d_1/d_4 = \frac{\sin [\beta_1 + (2q-1)\gamma]}{\sin (\beta_1 - \gamma)} \qquad (25)$$

and the maximum concentration $C\gamma/d_4$ corresponding to the smallest right section attained by total reflection is:

$$C\gamma/d_4 = \frac{\sin^2 [\beta_1 + (2q-1)\gamma]}{\sin^2 (\beta_1 - \gamma)} \qquad (26)$$

The section of diameter $d_4$ plays an important role. In practice, it most often forms the minimum section of the bidiopter. On the one hand, in effect, the concentration $C\gamma/d_4$ has a value approaching the absolute maximum concentration $C\gamma/d_2$ as the index $n_1$ becomes greater; and on the other hand the necessity for immersing sensing element of the receiver in a medium of index $n_2$ lower than that of the bidiopter, usually makes it useless to push the concentration beyond that of $C\gamma/d_4$. The use of silvering or other reflective coating (the same as using a frustoconical mirror in place of a bidiopter) is moreover subject to a loss by absorption, weak at each reflection but becoming considerable for a large number of reflections. On the contrary total reflection occurs practically without energy loss. It is known that for a normally polished surface, the radiation diffused to the exterior on total reflection is spread out in a plume of which the maximum energy content is of the order of $0.5 \cdot 10^{-4}\%$. After 100 total reflections, the loss of energy in the least favorable direction is of the order of 0.5%.

FIG. 9 summarizes the results obtained for the unique values $d_2$, $d_x$, $d_3$ and $d_4$ of the diameter of the minimum section of a diopter. For an apical angle of the given cone, $2\gamma$, and a pencil of radiation of given angular aperture $2\theta_1$, a frustoconical bidiopter of index $n_1$, at maximum concentration has its small face at a minimum section of which the diameter $d_x$ lies between the extreme values: $d_2$ and $d_3$. The value $d_3$, the largest of all, corresponds to the small face of a bidiopter for which all of the rays of a pencil of radiation are allowed to escape into the air after maximum concentration. The value $d_2$, the smallest of all, corresponds to the small face of a bidiopter for which none of the rays are allowed to escape into the air or into any optical medium of lower index than that of the bidiopter. Between these two extreme values, all of the intermediate values $d_x$ are possible, corresponding to maximum concentrations in all the cases where the pencil of radiation is allowed to escape in a medium of index $n_2$ (of value between 1 and $n_1$). Among these intermediate values, the value $d_4$ corresponds to the minimum section for which total reflection at the lateral surface of the truncated cone is possible.

It remains, in order to have all of the characteristics of the frustoconical mirrors or bidiopters of maximum concentration included in the radiation concentrating apparatus of the invention, to calculate the length of the frustum of the cone $L\gamma$. This value is readily deduced from the general Formula 19:

$$L\gamma/d_x = \frac{d_1 - d_x}{2 \tan \gamma} \qquad (27)$$

This formula may usefully be transformed into:

$$L\gamma/d_x = \frac{(d_1/d_x)-1}{2\tan\gamma} d_x$$

or $$L\gamma/d_x = \frac{\sqrt{C\gamma/d_x}-1}{2\tan\gamma} d_x \quad (28)$$

The last formula permits the calculation of the length of the frustoconical mirror or bidiopter from the diameter $d_x$ of this minimum section. If this minimum section is to be associated with the sensing surface of a receiver, the value $d_x$ also must be that of the diameter of the associated sensing surface, a value which is most often the essential design datum of the apparatus. Formula 28 is therefore of great practical interest.

In an analogous manner the lengths of the bidiopter of the form: $L\gamma/d_2$, $L\gamma/d_3$, $L\gamma/d_4$ corresponding to the diameters $d_2$, $d_3$, $d_4$, respectively, are defined. It is to be noted that if a bidiopter (or a frustoconical mirror) is given an actual length greater than the length calculated by means of one of these formulas, the concentration is not much affected. In fact, the loss due to the rays which revert towards the entrance face is nearly compensated by the gain due to the fact that the area of the minimum section is reduced. For a small excess in length the concentration obtained is about the same. On the contrary if the bidiopter is given a length shorter than the calculated length, the concentration obtained is rapidly reduced. Care should be taken therefore in the construction of a bidiopter that any error in length should be in the direction of greater rather than lesser lengths than those calculated by the formulas.

All of the Formulas 15–18 calculated above have been "exact" formulas, that is, they do not incorporate any approximations. They characterize completely all of possible frustoconical mirrors or bidiopters of maximum concentration on the basis of their apical demi-angle $\gamma$. However, simplified formulas, especially for carrying out a succession of calculations and for rapidly determining optimum combinations involving a variety of parameters may be used.

A first simplification can be made when the expression $$\frac{\text{Arc sin } (n_2/n_1) - \beta_1}{2\gamma}$$

in formula 18 is an integer or nearly an integer because the maximum number of reflections $p$ is quite large (that is, when the apical demi-angle is quite small).

This simplication can be established for the ratios $d_1/d_2$, $d_1/d_x$, $d_1'/d_3$ and $d_1/d_4$, by designating as $d_2'$, $d_x$, $d_3'$ and $d_4'$ the values of the minimum diameters thus simplified.

In the case of the minimum section of diameter $d_2$ (maximum immersion) the expression for $p$ (Formula 16) becomes $$p = \frac{\pi/2 - \beta_1}{2\gamma} + 1$$

whence $$(2p-1)\gamma = \pi/2 - \beta_1 + \gamma$$

and, according to Formula 15:

$$d_1/d_2' = \frac{\sin(\beta_1 + \pi/2 - \beta_1 + \gamma)}{\sin(\beta_1 - \gamma)}$$

that is, $$d_1/d_2' = \frac{\cos\gamma}{\sin(\beta_1 - \gamma)} \quad (29)$$

It follows that a simplified expression for the maximum concentration $C\gamma/d_2'$ is $$C\gamma/d_2' = \frac{\cos 2\gamma}{\sin^2(\beta_1 - \gamma)} \quad (30)$$

In the case of the minimum section of diameter $d_x$ (the general case of immersion of the sensing element in a medium of index $n_2$) the expression $p'$ Formula 18) becomes $$p' = \frac{\text{Arc sin } (n_2/n_1) - \beta_1}{2\gamma} + 1$$

whence $$(2p'-1)\gamma = \text{Arc sin } (n_2/n_1) - \beta_1 + \gamma$$

and, according to Formula 19:

$$d_1/d_x' = \frac{\sin(\beta_1 + \text{Arc sin } (n_2/n_1) - \beta_1 + \gamma)}{\sin(\beta_1 - \gamma)}$$

or $$d_1/d_x' = \frac{n_2/n_1 (\cos\gamma + \sqrt{1-(n_2^2/n_1^2)} \cdot \sin\gamma}{\sin(\beta_1 - \gamma)} \quad (31)$$

and for the concentration $C\gamma/d_x'$:

$$C\gamma/d_x' = \frac{n_2^2/n_1^2 (\cos 2\gamma + \sqrt{n_1^2/n_2^2-1} \cdot \sin 2\gamma) + \sin 2\gamma}{\sin^2(\beta_1 - \gamma)} \quad (32)$$

In the case of the minimum section of diameter $d_3$ (immersion in air; $n_2=1$):

$$d_1/d_3' = \frac{1/n_1 \cos\gamma + \sqrt{1-1/n_1} \cdot \sin\gamma}{\sin(\beta_1 - \gamma)} \quad (33)$$

and for the concentration $C\gamma/d_3'$:

$$C\gamma/d_3' = \frac{1/n_1^2 (\cos 2\gamma + \sqrt{n_1^2-1} \cdot \sin 2\gamma) + \sin^2\gamma}{\sin^2(\beta_1 - \gamma)} \quad (34)$$

Finally, in the case of the minimum section of diameter $d_4$ (limit section for total reflection) the expression for $q$ (Formula 24) becomes:

$$q = \frac{\pi/2 - \lambda n_1 + 3\gamma - \beta_1}{2\gamma}$$

whence $$(2q-1) = \pi/2 - \lambda n_1 + 2\gamma - \beta_1$$

and according to Formula 25:

$$d_1/d_4' = \frac{\sin(\beta_1 - \pi/2 - \lambda n_1 + 2\gamma - \beta_1)}{\sin(\beta_1 - \gamma)}$$

that is:

$$d_1/d_4' = \frac{\cos(\lambda n_1 - 2\gamma)}{\sin(\beta_1 - \gamma)} \quad (35)$$

and for the corresponding concentration, $C\gamma/d_4'$:

$$C\gamma/d_4' = \frac{\cos^2(\lambda n_1 - 2\gamma)}{\sin^2(\beta_1 - \gamma)} \quad (36)$$

Formulas 29 to 36 provide an excellent approximation. It has been found that the relative errors arising from their use are always less than $\gamma^2/2$ (even with an angle as great as $1/10$ radian the relative error is less than $1/200$ of the length).

An even greater simplification is possible when the value of the apical demi-angle $\gamma$ may be considered as negligible, that is when the value tends to zero.

When $\gamma$ approaches zero, the limit values of $d_2$, $d_x$, $d_3$, $d_4$ are designated $d_2''$, $d_x''$, $d_3''$ and $d_4''$.

In the case of the section of diameter $d_2$ (absolute maximum) the Formula 29 gives $$\lim \gamma \to 0 \ d_1/d_2 = d_1/d_2'' = 1/\sin\beta_1$$

Since $$\beta_1 = \text{Arc sin} \cdot \sin\theta_1/n_1 + 2\gamma$$

it follows that $\sin\beta_1$ approaches $\sin\theta_1/n_1$. Hence:

$$d_1/d_2'' = n_1/\sin\theta_1 \quad (37)$$

and for the maximum limit concentration $C_0/d_2''$:

$$\lim \gamma \to 0 \ C\gamma/d_2' = C_0/d_2'' = n_1^2/\sin^2\theta_1 \quad (38)$$

In the general case of the section of diameter $d_x$, Formula 31 gives $$\lim_{\gamma \to 0} d_1/d_x = d_1/d_x'' = \frac{n_2/n_1}{\sin \theta_1/n_1}$$

or $$d_1/d_x'' = n_2/\sin \theta_1 \quad (39)$$

and for the maximum limit concentration, $C_0/d_x''$:

$$C_0/d_x'' = n_2^2/\sin^2 \theta_1 \quad (40)$$

In the particular case of section $d_3$ ($n_2=1$)

$$d_1/d_3'' = 1/\sin \theta_1 \quad (41)$$

and for the maximum limit concentration $C_0/d_3''$:

$$C_0/d_3'' = 1/\sin^2 \theta_1 \quad (42)$$

Finally for the section of diameter $d_4$ (limit for total reflection), Formula 35 gives:

$$\lim_{\gamma \to 0} d_1/d_4 = d_1/d_4'' = \frac{\cos \lambda n_1}{\sin \theta_1/n_1}$$

$\sin \lambda n_1$ having the value $1/n_1$ $$\cos \lambda n_1 = \sqrt{1 - 1/n_1^2}$$

whence $$d_1/d_4'' = \frac{\sqrt{n_1^2-1}}{\sin \theta_1} \quad (43)$$

and for the maximum limit concentration, $C_0/d_4''$:

$$C_0/d_4'' = \frac{n_1^2-1}{\sin^2 \theta_1} \quad (44)$$

Formula 41 could have been derived from the general Formula 12 of conical fibers, adapted to the present notation:

$$d_1 \sin \theta_1 = d_3'' \sin \theta_2$$

In effect, the concentration is maximal for the exit angle $\theta$ equal to $\pi/2$ or for $\sin \theta_2 = 1$ whence $d_1 \sin \theta_1 = d_3''$ or $$d_1/d_3'' = 1/\sin \theta_1$$

This shows that the general formula for conical fibers is the ideal formula which can only be true for a fiber of infinite length ($\gamma$ approaching zero). The Formula 43 fixing the limit section for total reflection can also be calculated directly from the case of the conical fiber. Formulas 37 and 39 correspond to a generalization to fibers in the case of immersion which will be considered for bidiopters in the strict sense.

The conical fibers thus appear as a particular case or, more exactly, as a limit case of frustoconical bidiopters. To this extent they can be utilized in the receivers of the invention; the necessary condition being to give the diameter of the large flux receiving face and the diameter of the minimum section the respective value defined by relations 37, 39, 41 or 43.

The results derived from these formulas are set forth on FIG. 10 which represents, analogously to FIG. 9, a frustum of a conical fiber with sections $d_2''$, $d_x''$, $d_3''$, $d_4''$ and which otherwise consist with the formulas for the concentrations and their relation to the theoretical limit concentration of a convergent system of aperture F/0.5.

There are particular cases of a quite different order for radiation very different from visible or infrared radiation. For example, the concentration of short or very short (radar) Hertzian waves requires according to the invention mirrors in the form of elongated metallic frustocones, the minimum section of which is associated with a dipole.

Knowing the characteristics of all of the frustoconical mirrors and bidiopters of maximum concentration and their approximations, the remaining problem to be solved will be apparent. In effect, leaving aside the special formulas where the apical demiangle $\gamma$ negligible ($\gamma$ approaching zero), all of the formulas and notably the formulas giving the relations of maximum concentration are expressed as a function of $\gamma$. It is therefore essential to ascertain precisely the effect of the value of $\gamma$ on the energy yield of frustoconical mirrors.

Taking for comparison the maximum concentrations given by conical fibers ($\gamma$ approaching zero), it will be seen that they theoretically constitute, in each of the categories, the most favorable case. The ratios of the form $C_0$ characterizing these concentrations have been established in the foregoing: $C_0/d_2''$ (Formula 38), $C_0/d_x''$ (40), $C_0/d_3''$ (42), $C_0/d_4''$ (44). The problem is to compare with them the relations of the form $C\gamma$ characterizing the concentrations in all of the cases where the value $\gamma$ of the apical demi-angle is not negligible, to know respectively: $C\gamma/d_2$ (Formula 17) and $C\gamma/d_2'$ (Formula 30); $C\gamma/d_x$ (20) and $C\gamma/d_x'$ (32), $C\gamma/d_3$ (23) and $C\gamma/d_3'$ (34), $C\gamma/d_4$ (26) and $C\gamma/d_4'$ (36).

Take, for example, the comparison between $C\gamma/d_2'$ and $C_0/d_2''$. The calculation for $C\gamma/d_2'$ is selected because it would be too time-consuming to treat each case in detail and because $C\gamma/d_2'$ (the case of maximum concentration for complete immersion in simplified form) is particularly useful. It involves comparing a frustoconical bidiopter of apical demi-angle $\gamma$, with a large flux receiving face of diameter $d_1$ accepting a pencil of angular aperture $\theta_1$, with a conical fiber with a large flux receiving face of the same diameter $d_1$, accepting the same pencil of the same angular aperture $\theta_1$. To be established is the relation:

$$\frac{C\gamma/d_2'}{C_0/d_2''}$$

To simplify the notation it will be convenient in the calculations to designate $C\gamma/d_2'$ by $C\gamma$, simply, and $C_0/d_2''$ by $C_0$.

According to Formula 30

$$\sqrt{C\gamma} = \frac{\cos \gamma}{\sin(\beta_1 - \gamma)}$$

As $\beta_1 = \text{Arc sin}(\sin \theta_1/n_1) + 2\gamma$ (Formula 14)

$$\sqrt{C\gamma} = \frac{\cos \gamma}{\sin(\text{Arc sin}(\sin \theta_1/n_1) + \gamma)}$$

and as $n_1/\sin \theta_1 = \sqrt{C_0}$ (Formula 38)

$$\sqrt{C\gamma} = \frac{\cos \gamma}{\sin(\text{Arc sin} \sqrt{1/C_0} + \gamma)}$$

or $$\sqrt{C\gamma} = \frac{\cos \gamma}{\sqrt{1/C_0} \cdot \cos \gamma + \sin \gamma \sqrt{1 - 1/C_0}}$$

and $$\sqrt{C\gamma} = \frac{\sqrt{C_0} \cdot \cos \gamma}{\cos \gamma + \sin \gamma \sqrt{C_0 - 1}}$$

$$\sqrt{C\gamma} = \frac{\sqrt{C_0}}{1 + \tan \gamma \sqrt{C_0 - 1}}$$

hence $$\frac{C\gamma/d_2'}{C_0/d_2''} = \frac{1}{(1 + \tan \gamma \sqrt{C_0/d_2'' - 1})^2} \quad (45)$$

Comparing $C\gamma/d_x'$ (general case in simplified formula) and $C_0/d_x''$ in the same way the following more general formula is established:

$$\frac{C\gamma/d_x'}{C_0/d_x''} = \left(\frac{1 + \sqrt{(n_1^2/n_2^2) - 1} \cdot \tan \gamma}{1 + \sqrt{C_0/d_x''(n_1^2/n_2^2) - 1} \cdot \tan \gamma}\right)^2 \quad (46)$$

Finally, comparing $C\gamma/d_4'$ (the case of total reflection) and $C_0/d_4''$ gives:

$$\frac{C\gamma/d_4'}{C_0/d_4''} = \left(\frac{\cos 2\gamma + \sqrt{1/(n_1^2-1)} \cdot \sin 2\gamma}{\cos \gamma + \sqrt{C_0/d_4'' n_1^2/(n_1^2-1) - 1} \cdot \sin \gamma}\right)^2 \quad (47)$$

It can be seen from these formulas that the most favorable case is always that where $\gamma$ approaches zero. The ratio $C\gamma/C_0$ then tends towards one. On the contrary, for all non-negligible values of $\gamma$, the energy yield of the bidiopter is subject to a systematic loss: $C_0-C\gamma/C_0$. The precise knowledge of this systematic loss provides the last of the theoretical elements required for the definition in useful form of the new radiation concentrators of the invention.

The ratio $$\frac{C\gamma/d_x'}{C_0/d_x''}$$

of Formula 46 represents, in the most general case, the energy yield of the bidiopter relative to the ideal concentration which would be realized if the value of its apical demi-angle $\gamma$ were nearly zero. This ratio may be directly expressed as a function of $n_1$, $n_2$, $\sin \theta_1$, and $\tan \gamma$ by replacing $C_0/d_x''$ in Formula 46 by its value $$n_2^2/\sin \theta_1$$

and simplifying, giving $$\frac{C\gamma/d_x'}{C_0/d_x''}=\left(\frac{1+\sqrt{(n_1^2/n_2^2)-1}\cdot\tan \gamma}{1+\sqrt{(n_1^2/\sin^2 \theta_1)-1}\cdot\tan \gamma}\right)^2$$

Fixing a minimum $\eta$ for the energy yield gives the relation:

$$\frac{C\gamma/d_x'}{C_0/d_x''}=\left(\frac{1+\sqrt{(n_1^2/n_2^2)-1}\cdot\tan \gamma}{1+\sqrt{(n_1^2/\sin^2 \theta_1)-1}\cdot\tan \gamma}\right)^2\geq\eta \quad (48)$$

which is the characteristic formula of frustoconical bidiopters and mirrors yielding a given minimum of the maximum concentration under given conditions.

The approximation of the Formula 46 is sufficient to calculate the yield.

In the case of a bidiopter of strictly total internal reflection the approximation of Formula 47 may be used:

$$\left(\frac{\cos 2\gamma+\sqrt{1/(n_1^2-1)}\cdot\sin 2\gamma}{\cos \gamma+\sqrt{(n_1^2/\sin^2 \theta_1)-1}\cdot\sin \gamma}\right)^2\geq\eta \quad (49)$$

$\eta$ is expressed as a number between 0 and 1 or as a percentage. Expressing, for example in Formula 48, $\eta$ by 0.80 or by 80% signifies that the ratio $$\frac{C\gamma/d_4'}{C_0/d_4''}$$

is not less than 80%.

It will now be realized why the results obtained with frustoconical mirrors or refractive cones of relatively large apical angle have given results too mediocre to encourage further investigation in this direction. If it were proposed, for example, to concentrate in air ($n_2=1$) a flux of solar radiation by 400 times ($C_0=400$) by means of a glass truncated cone ($n_1=1.5$) having an apical demi-angle of 1/6 radian (a little less than 10°), one would obtain by general Formula 46

$$\left(\frac{1+\sqrt{2.25-1}\cdot 1/6}{1+\sqrt{2.25\times 400-1}\cdot 1/6}\right)^2=0.039$$

or a yield of about 4% of the theoretical concentration. One therefore obtains an actual concentration of about 16 times.

If it is proposed to obtain with a cone of the same apical demi-angle ($\gamma=1/6$ radian) the greatest possible concentration, $C_0$ would have to have a value in excess of 47,000 and Formula 46 would give for the value of $C\gamma/C_0$ about: 0.0007. The yield would be less than 1% compared to the maximum theoretical concentration in air, that is compared to that of a convergent system of aperture F/0.5. Such a yield would be very much less than that of the most rudimentary parabolic mirror.

Thus if it is proposed to obtain with a frustoconical concentrator a minimum yield $\eta$ amounting to a substantial proportion of the maximum theoretical concentration the apical demi-angle $\gamma$ cannot have too great angle (the order of which will be shortly seen).

Next to be determined, by means of the formulas, is the best means of augmenting the value $C\gamma/C_0$, as the apical demi-angle $\gamma$ is not the only parameter involved.

Three factors enter into the expressions of the ratio $C\gamma/C_0$. First, $\tan \gamma$, as it will be designated. Next, the ideal reference concentration $C_0$ which enters into the denominator of the ratio. Finally the yield $$\frac{C\gamma/d_x'}{C_0/d_4''}$$

is not the same as the yield $$\frac{C\gamma/d_2'}{C_0/d_2''}$$

which signifies that the ratio $n_1/n_2$ is a factor.

Consideration of the last factor permits a judicious choice of the optical materials used in construction of the bidiopter and the immersion of the sensing element of the receiver but it does not provide much latitude in improving the ratio $C\gamma/C_0$. In general, the yield $$\frac{C\gamma/d_2'}{C_0/d_2''}$$

is better than the yield $$\frac{C\gamma/d_x'}{C_0/d_2''}$$

except for relatively small values of $C_0$ for which the relation is the inverse. There is thus more frequently a greater advantage in immersing the sensing element in the bidiopter than in choosing materials which make $n_1$ and $n_2$ as close as possible. The choice must be studied in each particular case.

As to the first factor, $\tan \gamma$, its value can only be decreased with discretion. As Formula 27 shows the length of the bidiopter increases as $\tan \gamma$ decreases. But this length cannot be made too great. The incumbrance, the weight and the cost of production present limits. Moreover, internal absorption ought not decrease the yield. Most materials used in the field of visible light or for other radiations have a low optical density and absorption is usually negligible even at considerable thickness. However, this problem which will be given further consideration may present difficulty with certain materials. There is thus in each case a limit to the possible diminution of the apical demi-angle.

The only remaining possibility is to work on the second factor, that is, to decrease the ratio $C_0/d_x''$ (or, according to the case, $C_0/d_2''$ or $C_0/d_4''$) of the theoretical concentration required of the bidiopter. Since these ratios can be expressed as $n_2^2/\sin^2 \theta_1$ (40)

$$n_1^2/\sin^2 \theta_1 \text{ (38), or } (n_1^2-1)/\sin^2 \theta_1 \text{ (44)}$$

respectively, the solution is to increase the maximum inclination to the axis $\theta_1$, of the received rays, that is to adjoin to the frustoconical bidiopter or mirror a frontal optical system effecting a preliminary first concentration. In this way the ratio of concentration required of the frustoconical bidiopter or mirror to obtain the maximum possible illumination of the sensing element is reduced which allows a greater latitude of choice of the value of the apical demi-angle $\theta$.

The optical systems capable of effecting this preliminary concentration of a flux are of two kinds: convergent systems (objective lenses, diopters, mirrors) which furnish an image of the source in their focal plane, and certain afocal systems (telescope or spyglass type) in which all of the flux received through a large entrance pupil leaves by a small pupil or ocular circle without forming an image in the plane of the circle.

The combination with a convergent frontal system will be described first with reference to FIGS. 11–13.

In FIG. 11, lenticular objective 9 has an aperture of diameter 2R and a focal image distance $f$. Its relative aperture $1/N$ is therefore $$1/N=2R/f$$

This objective gives in focal plane 10 a real image of diameter $i$ of a distant image of apparent diameter $\alpha$:

$$i \simeq f \cdot \alpha \ (\alpha \text{ in radians and assumed small})$$

The pencil of radiation which converges to form that image and which diverges on passing it has an apical demi-angle the maximum value of which is designated by $\theta_1$.

The energy concentration $C_1$ effected by the objective is measured by the ratio of the entrance surface to the image surface:

$$C_1 = (2R/i)^2$$

Since $2R = f/N$ and $i = f\alpha$ $$C_1 = 1/N^2\alpha^2 \qquad (50)$$

Since (Formula 10) the maximum concentration on an element immersed in a medium of index $n_2$ is, for a pencil of rays of apparent angle $\alpha$:

$$Cn_2/\text{max.} = 4n_2^2/\alpha^2$$

The associated frustoconical bidiopter must therefore effect a concentration $C_o$ equal to the quotient of $C_n^2/$max. by $C_1$, or:

$$C_o = 4n_2^2/\alpha^2 : 1/N^2\alpha^2$$

or $$C_o = 4N^2 n_2^2 \qquad (51)$$

Such a bidiopter 11 is represented schematically in FIG. 11. The large flux receiving face 12 is coplanar with the image formed in focal plane 10. The diameter of the large face, $d_1$, is then equal to the diameter $i$ of the image. The bidiopter receives all of the flux partially concentrated by the frontal objective. The diameter $d_x$ of the minimum section 13 of the bidiopter, in which the maximum concentration of the flux is effected, has a value given by Formula 19 taken with Formulas 14 and 18, as a function of the apical demi-angle $\alpha$. A sensing element 14 is positioned at face 13 and is immersed in an optical medium of index $n_2$, for example, a thin film 15.

In case the frontal convergent system is a diopter, the term "diopter" being used hereinafter to designate generically optical elements acting solely by reflection from a surface between two mediums having different indices of refractions, the immersion of the image, which augments the real relative aperture, must be taken into account. A spherical diopter of index $n$, diameter of aperture $2R$, and focal length $f'$, has a nominal aperture $$1/N' = 2R/f'.$$

Its real aperture is $n$ times as great and the real aperture:

$$1/N = n/N' \qquad (52)$$

will be used in further calculations.

$1/N$ thus represents the relative aperture of the lenticular objective equivalent to this spherical diopter. The advantage of this notation is to conserve, in the case of the frontal diopters the Formula 51, already established for the concentration $C_o$ of the associated bidiopter.

It should only be noted that the real focal length $f'$ of the spherical diopter is equal to the focal length $f$ of the equivalent lens multiplied by the index $n$ of the diopter:

$$f' = nf \qquad (53)$$

There have been schematically represented on FIG. 12 two spherical diopters $D_1$ and $D_2$, with indices 3/2 and 2 respectively, having the same real aperture (F/2) and the same geometric center C. These diopters give, in their common focal plane, the same image $i$ of a source apparent diameter $\alpha$. 1 designates the thin lens, of relative aperture F/2, equivalent to the two diopters: its optical center coincides with the center C of the diopters; its focal plane corresponds with that of the diopters. For an associated bidiopter the three convergent systems $D_1$, $D_2$ and 1 are equivalents.

Of course, all of the dioptric combinations used in the novel concentrators of the invention as well as the plane faces of the bidiopters are advantageously surface treated to suppress partial reflections detrimental to the energy yield. It is known that in the case of two optical media of optical indices $n_0$ and $n_1$, in contact, and for a given wavelength $\lambda$, the application to the surface of separation of an anti-reflective layer of index $\sqrt{n_0 n_1}$ and a thickness or $\lambda/4$ (or an odd integral multiple thereof) will suppress nearly all partial reflections up to an angle of incidence of about 45° to the normal.

In the case, finally, where the frontal convergent system is a mirror, the arrangement is as shown in FIG. 13 which schematically represents the association of a spherical mirror 16 and a frustoconical bidiopter 17. The bidiopter is positioned ahead of the mirror. The latter has an entrance diameter 2R, a focal length $f$ and a relative aperture $1/N$, which characteristics are assumed to be the same as those of the dioptric objective of FIG. 1, to facilitate comparison. Likewise, the maximum angle of inclination to the optical axis of the convergent pencil of rays formed by the mirror 16 is designated $\theta_1$.

The formulas established previously in the case of a lenticular objective are valid in the case of a mirror, notably Formula 51 determining the theoretical concentration $C_o$ required of the associated bidiopter.

In one case as in the other, the sine of the maximum angle of inclination $\theta$, which is an important feature of the characteristic formulas of the associated bidiopter, has a value near to the ratio $R/F$ $$\sin \theta_1 \simeq 1/2N \qquad (54)$$

This formula is useful in facilitating the calculations in the present case. But the value $1/2N$ is only an approximation for $\sin \theta_1$. First this value is established in optical instruments for the mean angle of inclination of the rays of the convergent pencil and not for the maximum angle properly speaking. Also it is not valid for aplanatic systems. In the case of aplanatic systems (such as parabolic mirrors, for example) and in every case where a high precision is needed the exact value of $\sin \theta_1$ must be the object of a special calculation or measurement.

The frontal optical concentrating system may finally be constituted by an afocal system (of null convergence) which represents a separate case.

FIG. 14 represents an afocal system schematically reduced to a combination of two lenses 18 and 19, having a common focus designated $F_2-F_1$. Lens 18 has an opening of diameter $2R_1$ and a focal length $f_1$. Lens 19 has a diameter $2R_2$ and a focal length $f_2$; its second focus is desgnated $F'_2$. The optical centers of the lenses are designated by $O_1$ and $O_2$, respectively. $2R_1$ is taken greater than $2R_2$.

The angle $\alpha'$ at which lens 19 is seen from the optical center $O_1$ of lens 18 is approximately the field of the afocal combination.

It is known that with such a combination all rays received in the field angle $\alpha'$ by the entrance pupil of lens 18, pass finally through an exit pupil 20 of center $O_3$, known as the "ocular circle." The ocular circle is the real image of the lens 18 (entrance pupil) formed by lens 19 in a plane close to its focal plane.

Denoting by $j$ the diameter of the ocular circle one has with relation to the optical center $O_2$ of lens 19:

$$2R_1/j = O_2O_1/O_2O_3$$

Moreover:

$$O_2O_1 = f_1 + f_2$$

and $$O_2O_3 = f_2(f_1 + f_2)/f_1$$

whence $$2R_1/j = f_1/f_2$$

The energy concentration $C_a$ of the afocal combination in relation to the ratio of the diameter of the entrance pupil $2R_1$ to the diameter $j$ of the exit pupil is:

$$C_a = (f_1/f_2)^2 \qquad (55)$$

To avoid changing notations, the relative aperture of a convergent system of equivalent effectiveness as the present afocal system in concentrating a given flux of apparent angle $\alpha'$, may be designated as $1/N$. This convergent system must have a diameter of aperture equal to $2R_1$ and must form with the given flux an image of diameter equal to $j$. It is then defined by the two following relations, designating its focal length by $f$:

$$1/N = 2R_1/f$$
$$j = f \cdot \alpha'$$

giving $$1/N = 2R_1 \alpha'/j$$

whence $$1/N = f_1/f_2 \alpha' \qquad (56)$$

Utilizing this notation of equivalence Formula 55 for the energy concentration $C_a$ becomes:

$$C_a = 1/N^2 \alpha'^2 \qquad (57)$$

This is of the same form as the relation 50 giving the ratio of energy concentration $C_1$ in the case of a lenticular objective.

As for calculating the concentration $C_o$ required of the associated frustoconical bidiopter (the large entrance face of which is positioned in coincidence with the ocular circle), it is accomplished by simply replacing N in Formula 51 by its value from 56 as a function of the three values $f_1$, $f_2$ and $\alpha'$ characterizing the afocal frontal system.

Thus, thanks to the convention of energy equivalence, the expression $1/N$ which appears in the fundamental definition of the novel concentrator preserves the same usage in the case of an afocal frontal system as in the case of a convergent system.

In particular, the sines of the maximum angle of inclination $\theta_1$ to the optic axis of the rays emerging from the ocular circle preserve the same approximate value: $1/2N$. There is shown in FIG. 14 a ray 21 having at its exit from the afocal system that maximum inclination $\theta_1$. There are also shown in this figure several rays, such as 22 and 23, which are found to be outside of the real field of the system to show that ray 21 is indeed the one which has the maximum inclination of those passing through the ocular circle 20.

Designating by E the intersection of ray 21 with the focal plane passing through $F_2$–$F_1$, the direction of ray 21 after leaving lens 19 is parallel to $O_2E$ so that Angle $EO_2F_2 = \theta_1$ but $$F_2E \simeq f_1 \alpha'/2$$

and $$O_2F_2 = f_2$$

so that $$\sin \theta_1 \simeq f_1/f_2 \cdot \alpha'/2$$

and according to the equivalence relation 56:

$$\sin \theta_1 \simeq 1/2N$$

The combination of a frontal concentrating system (convergent or afocal) and a frustoconical bidiopter or mirror of maximum concentration being thus defined, the essential problem is the efficiency of such a combination for a source of radiation of any diameter situated in any field. In effect, in the cases which will be studied to establish the formulas, the combination of the frontal system and the associated bidiopter has been selected so that its field is equal to the apparent angle of the source, its optical axis being understood to pass through the source. The actual conditions of use are usually quite different.

Consider a given combination of a frontal concentrator and a bidiopter of field $\epsilon$ and a source of apparent diameter $\alpha$ of which a flux of radiation is to be concentrated.

The angle of the field $\epsilon$ is determined by the diameter $d_1$ of the large flux receiving face of the bidopter and the focal length $f$ (or its equivalent) of the frontal concentrating system according to the relation:

$$\epsilon \simeq d_1/f$$

($d_1$ being the diameter of the image or of the ocular circle for the angle of field $\epsilon$).

The first condition for receiving a flux of radiation from the source is obviously that it be situated in the field $\epsilon$. If this is the case, two cases are to be considered (a convergent frontal concentrator forming an image being assumed):

The field $\epsilon$ is smaller or at most equal to the apparent diameter $\alpha$ of the source and the concentration of the received flux is effected at the maximum.

Or, on the hand, $\epsilon > \alpha$ and the concentration is not maximal. In effect the frontal conversion system provides an image of the source of diameter $i \simeq f \cdot \alpha$.

This image is smaller than the large flux entrance face of the associated bidiopter the diameter of $d_1$ of which is:

$$d_1 = f \cdot \epsilon$$

The concentration effected by the bidiopter in the plane of its minimum section of diameter $d_x$ is the equal $(i/d_x)^2$, a ratio which is smaller than the maximum ratio $(d_1/d_x)^2$.

An analogous reasoning may be carried out in the case of an afocal frontal concentrating system. The diameter of the ocular circle remains invariable and is the value of the maximum angle $\theta_1$ of the rays passing the ocular circle which is found to be less than the value for maximum concentration.

In this case, as in that of the convergent frontal system, the ratio between the concentratiton obtained and the h°o maximum concentration is approximately equal to $(\alpha/\epsilon)^2$. It will be seen that for certain very particular applications this may be satisfactory but this is not the principal object of the invention.

It is thus clear that to obtain by means of a simple bidiopter, associated in a simple manner with a frontal concentrating system, the maximum concentration of a flux emitted by a source, the optical axis of the concentrator must be directed at the source of radiation and the angle of the field of the concentrator (frontal system plus bidiopter) must have a value smaller or at most equal to the apparent diameter of the source.

In many cases the realization of the necessary conditions does not present any particular difficulty.

This is true when the source is well defined, easily located and of known apparent diameter, as is the case with most laboratory radiation concentrators (photocells, bolometers, photomultipliers, scintillation counters, nuclear radiation detectors, spectrophotometers, etc.) or for a solar energy concentrator, for example. In the latter case it is sufficient to impress on the concentrator a movement which causes it to follow the sun in its course using devices already known for traditional solar energy receivers.

In the case of so called "active" detectors using an emitter which scans by mechanical means a certain area of space with a concentrated beam of radiation (generally in the infrared or in very short Hertzian waves—"radar") it is sufficient to give the concentrator an angle of field at least equal to the apparent diameter of the zone "lighted" by the emitter at the mean distance of use, and to give the concentrator a sweep movement adjusted so that its optical axis remains parallel to that of the emitter. This method of operation is used in certain of the apparatus applying the principles of the invention and it will be found that it is possible in this way to provide a simple infrared detector, for example, from 100 to 500 times more sensitive than the detector now in use under the same conditions.

In the same order of ideas the characteristics of the present invention may be combined with the scanning emitters and receivers described in French Pat. 1,358,366 of June 15, 1962 to the present applicant, the characteristics of which give considerable physiological advantages for ocular observations.

In all other cases, that is, when no mechanical arrangement for scanning is preexistent, and there is a surplus of variable emitting or reemitting sources of indeterminate or unknown position, it is necessary to adjoin to the concentrator of the invention automatic scanning mechanism permitting the exploration of a region of space until a radiation of flux to be concentrated is received. Devices of this kind will be described in particular cases, notably for searching heads, but usually this mode of operation is least convenient.

It is easy to mitigate this difficulty in two other ways. A distinction is to be drawn between the case where the frontal concentrating system is convergent and that where it is afocal. When the system is convergent (forming an image), on the one hand, a bundle of bidiopters may be used instead of a single bidiopter, which increases the total field without diminishing the efficiency of each particular elementary bidiopter. Or, on the other hand, the image formed by the frontal system (receiving radiation over a large field) can be subjected to optical scanning by known means, which automatically bring at a certain moment the image of the source into coincidence with the flux receiving face of the associated bidiopter.

When the frontal system is afocal, optical scanning is possible only ahead of the system, equivalent to an angular scanning of the field, the ocular circle remaining of constant size equal to that of the large face of the associated bidiopter.

The first of these solutions (the bundle of bidiopters) has the advantage of providing a permanent image or at least a permanent localization of the emitting source in a given field. The principle of operation will be briefly described with reference to FIG. 15 which represents schematically a convergent objective 24, having an aperture diameter 2R, a focal length $f$ and a relative aperture 1/N. In its focal plane 25 is positioned the ensemble of large flux entrance faces of a bundle 26 of frustoconical bidiopters such as 27. $d_1$ designates the diameter of the large flux entrance face of one of the elementary bidiopters, $e_1$ designates the diameter of the ensemble of large flux entrance faces, $d_x$ designates the diameter of the minimum section of one of the elementray bidiopters and $e_x$ designates the diameter of the ensemble of minimum sections.

The total field of the concentrator is an angle $\Gamma$ (FIG. 15) defined by the ratio:

$$\Gamma \simeq e_1/f$$

The field relative to one of the elementary bidiopters, such as 27, is an angle $\epsilon$, previously defined by the ratio:

$$\epsilon \simeq d_1/f$$

Of the ensemble of objects situated in the field $\Gamma$, the objective 24 provides an image of diameter $e_1$, which is in effect analysed by the elementary bidiopters. The angle $\epsilon$ measures the limit of angular separation (resolving power) of the concentrator $$\epsilon/\Gamma = d_1/e_1$$

The angle $\epsilon$ may be very small (when using a bundle of glass fibers, for example) and correspond to a precise image of the emitting object. It may on the other hand be very large (with a bundle of relatively large bidiopters) and correspond only to a rough localization of the more important sources in a given field. In both cases, to obtain the maximum concentration as previously defined, the angle $\epsilon$ must be smaller than or at most equal to the apparent diameter of the smallest of the sources to be detected or observed. Each concentrator has, therefore, a well defined limit of maximum efficiency and mean distance of utilization. For example, a concentrator for which $\epsilon = 1/1000$ radian (3'26"), and $e_1/d_1 = 100$, can concentrate in maximal manner, in a field $\Gamma$ of nearly 6°, the flux emanating from all sources or objects having an apparent diameter greater than or at least equal to $1/1000$ radian (that is, 10 cm. at 100 meters or 1 meter at 1 kilometer).

The resolving power of such a combination is practically equivalent to that of the human eye in broad daylight.

The applications of this type of concentrator (bundle of bidiopters) are very numerous and extend to all cases where it is desirable to obtain a permanent image by simple means (photographic apparatus, image tubes, metascopes and phosphoresent viewers, radioscopes . . .). It will be seen that another advantage of bundles of bidiopters is that they have a considerably shorter length for the same concentration and yield.

If it is desired to convert a given concentrator to permit maximal operation on sources of smaller size than had been foreseen (for example, receding sources), there may be added to the frontal objective a further optical combination, such as a telephoto lens or a variable focus system. The images of the sources are then enlarged and the total field is, as expected, reduced.

The second solution may be realized in several ways and may employ any of the known optical scanning methods. For example, in front of the combination of a frontal convergent or afocal system and associated bidiopter of field $\epsilon$, may be added an arrangement of moving mirrors or prisms, or a Nipkov disk or any other optical scanning device. The image of constant size then reflects successively the various elementary regions (of apparent angle $\epsilon$) of the scanned field. On the other hand certain elements of the concentrator (having a field $\Gamma > \epsilon$) are moved with respect to others. For example, the convergent frontal system may be displaced in a plane perpendicular to the optical axis causing a symmetrical movement of the image in the focal plane, which has the effect of bringing successive different elementary regions (of apparent angle $\epsilon$) of the image into coincidence with the flux receiving face of the associated bidiopter. Again, the frontal convergent system may be fixed and the associated bidiopter displaced parallel to itself, its flux receiving face coming successively into coincidence with each elementary region of the image. All the combination of the different modes of operation are possible. The methods of image scanning are known in themselves and will not be described in detail. Only the results will be set forth.

Figures 15, 16:
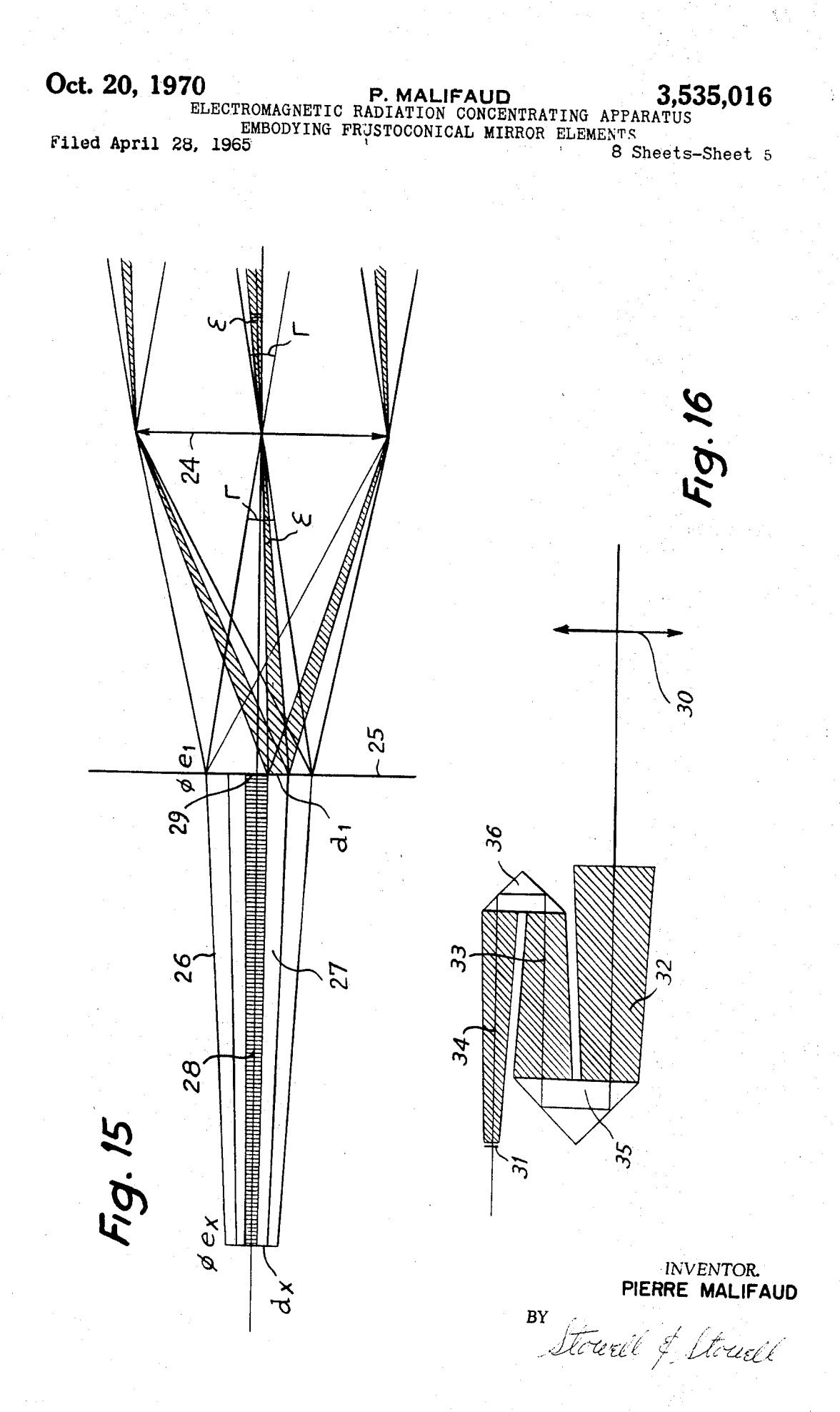

Consider a bidiopter having a large flux receiving face of diameter $d_1$ such as is represented at 28 in FIG. 15. Its optical axis coincides with that of the associated convergent frontal system 24 with the characteristics previously defined: $e_1$, the diameter of the total image formed in the focal plane; $\Gamma$, the total field and $\epsilon$, the field of the bidiopter 28.

The scan is periodic and generally continuous. In the course of the scanning cycle each of the elements of diameter $d_1$, contained in the image of diameter $e_1$, must coincide once with the large flux receiving face 29 of the bidiopter. In general, a horizontal or vertical sweep in adjacent parallel bands is used. The scanning frequency may have a wide range of values according to the conditions of operation and the results desired. When the receiver is used for ocular observation with the human eye, the scanning characteristics and mode of observation described in the present applicant's French Pat. No. 1,358,-366 of June 15, 1962 may be used. Arresting and control arrangements for holding the bidiopter on a particular source region or for following the displacement of a source region may be provided.

In its direct use this method of optical scanning does not provide an image since the associated bidiopter is unique. The same is true of mechanical scanning in active or in passive detection. In all of these cases it is nevertheless possible to reconstitute an image of the scanned field on the basis of variations in successive illuminating energy in the plane of the minimum section of the bidiopter. In effect, the successive variations in illumination have a unique relation with the variation in radiation of the elementary regions of the scanned field of objects. To obtain an image of the ensemble of objects requires the same unique relation between the variations of illumination of the small section of the bidiopter and the variations of luminosity on a fluorescent screen of suitable persistence. This is exactly what is done in certain television systems which operate with a single photoelectric cell (without iconoscope), such as the old Nipkov camera.

In certain cases the transduction into an image may be effected directly, without the intervention of electronic arrangements. For example, in the case where the associated bidiopter scans the frontal image by displacement parallel to itself, it is sufficient to position a fluorescent screen at the plane of the small face of the bidiopter in order to obtain an image.

The two types of solution may also be combined, that is, by using both a bundle of bidiopters and a scanning of the image. The angle of the field of the bundle is then reduced and scanning is simplified. This combination has various practical advantages (larger total field and possibility of immediate localization in the small elementary field). It leads to a series of apparatus arrangements embodying the principles of the invention.

Finally, a further important aspect of the problem of the real efficiency of the concentrator is posed by its association with the sensing element.

This element is most frequently present in the form of a sensing surface: a thin plate or ribbon. It has been said, in a general way, that the diameter of the minimum section of the bidiopter (or of the bundle) at which the concentration attains its maximum value, must be equal to the diameter of the associated sensing surface. But it must be noted that there are two types of sensing surfaces: those which can effectively utilize an image, and those which react only to the integrated sum of the illumination which they receive.

The first type, which may be designated type A, react to the energy of illumination at each point of the surface as if the points were independent, within the limit imposed by their discontinuous structure (resolving power). Among this type are: the retina of the eye, photographic plates, mosaic cells, etc. The second type, type B, do not differentiate in reaction to illumination of different particular points of the surface. This type includes: photoelectric cells, the metallic ribbons and thermistors of bolometers, photoconductive cells, photopiles, etc.

However, the combinations of the different types of sensing surfaces with the concentrators of the invention cannot be the same. Particularly a bundle of bidiopters can only be properly associated with a sensing surface of type A. Consider an association of the ensemble of small terminal faces of a bundle and a sensing surface of type B of the same over-all diameter. If one of the elementary bidiopters of the bundle has effected a maximum concentration of a flux emanating from a source, in a field angle $\epsilon$, the maximum illumination thus produced at the end of the bidiopter can only be utilized by the sensing surface in a small element of its total surface. Since it can only integrate the elementary illuminations which it receives the effect of the concentration is largely lost. If $\epsilon'$ is the field of angle of the bundle of bidiopters, the energy concentration effect is divided by $(\epsilon'/\epsilon)^2$. To conserve the maximum ratio of concentration the sensing surface of type B must be replaced, either by a surface of type A, or by a mosaic of small surfaces of type B, the area of each of the small surfaces being smaller or at most equal to the area of the terminal section of each of the bidiopters of the bundle.

The features of the novel concentrator of the invention are now becoming apparent.

To concentrate a flux of radiation emanating from a source of apparent angle $\alpha$, embracing a total field $\Gamma$, a frontal concentrating system of field $\Gamma$, of relative aperture $1/N$ and of focal length $f$, is associated with at least one frustoconical bidiopter or mirror of field $\epsilon$ such that $\epsilon \leqslant \alpha$.

Thus in every case where the frustoconical bidiopter or mirror forms an element of a bundle or where it is alone and is illuminated by a scanner, the diameter $d_1$ of its large flux receiving face is always $$d_1 \simeq f \cdot \epsilon \qquad (58)$$

This bidiopter will in every case be designated "the elementary bidiopter" even when it is sole and even when the total field $\Gamma$ is equal to the angle $\epsilon$ as in certain solar concentrators, for example, or in certain laboratory concentrators. In the case of frustoconical mirrors, in analogous manner, the "elementary frustoconical mirror" must be considered.

It is the elementary bidiopter or the elementary frustoconical mirror which is specified above in the fundamental definition of the apparatus of the invention, and it is to these elements that nearly all of the formulas which have been calculated are directed. The notations are invariable: $d_1$ is always the diameter of the large flux receiving face of the elementary bidiopter, $d_x$ is the diameter of the minimum section and $\gamma$ is the apical demi-angle of the cone.

Therefore the foregoing formulas permit the precise determination of the elementary bidiopter or frustoconical mirror in every case. However, before proceeding with such determinations it is necessary, in each particular case, that a preliminary idea be formed of the order of magnitude of the characteristics in order to be able to make overall adjustments in the numerous parameters which are involved.

It is possible to do this on the basis of Formula 51 defining the concentration $C_0$ required of an elementary bidiopter as a function of the relative aperture $1/N$ of the frontal optical system and of the index $n_2$ of the medium in which the sensitive element of the receiver is immersed:

$$C_0 = 4N^2 n_2^2$$

Knowing $C_0$ and $d_1$ (by Formula 58) an idea of the order of magnitude of the dimensions of the bidiopter can be obtained.

Calling $d_0$ the theoretical value of the diameter of the minimum section of the diopter, since $d_1/d_0 = \sqrt{C_0}$ $$d_1/d_0 = 2Nn_2 \qquad (59)$$

This calculation can also be made in another sense if $C_0$ and the order of magnitude of $d_0$ are known, for example, when the diameter of the sensing surface associated with the minimum section of the bidiopter is given. Formula 59 then gives the order of magnitude of $d_1$. And, the field $\epsilon$ being generally imposed, the focal length $f$ is definitively determined by the Formula 58: $f = d_1/\epsilon$.

Since the angle $\epsilon$ may be very small the value of $f$ thus determined may be very large and incompatible with the practical conditions available. For example, if $d_0 = 0.5$ mm., $C_0 = 64$, and $\epsilon = \frac{1}{1000}$ radian, $d_1 = 8 \times 0.5 = 4$ mm., and $f = 4$ meters.

This difficulty can be overcome in two ways: by decreasing the diameter $d_0$ and that of the associated sensing surface, or by replacing the elementary bidiopter by a bundle of elementary bidiopters each having a smaller minimum diameter $d_0$. The choice between these solutions depends on the type of the associated sensing surface.

If the sensing surface is of type B, the second solution cannot be employed directly. The diameter of the sensing surface must be reduced. At the present time a bolometric thermistor, for example, may have the dimensions: $0.1 \times 0.1$ mm. It is to be expected that progress in this direction will be made by way of miniaturization. With $d_0 = 0.1$ mm., the foregoing calculation would give $f = 800$ mm.

There is also the resource of using a prismatic frontal convergent or afocal system to reduce the length.

If the sensing surface is of type A, there is less limitation and, notably by using conical fibers, $d_0$ may be given a very small value. By replacing the elementary bidiopter of the foregoing example ($d_0 = 0.5$ mm.) by a bundle of 20 bidiopters, $d_0 = 25\mu$, $d_1 = 0.2$ mm. and $f = 200$ mm.

This solution may be applied indirectly to sensing surfaces of type B whenever it is possible to make of them a mosaic of very small independent elements. For example, for television cameras there may be made mosaics of photoelectric cells of cesium on oxidized silver, each insulated cell having a diameter of the order of a micron.

It remains, to characterize the elementary bidiopter or frustoconical mirror to determine the order of magnitude of its length. Formula 28 is transposed replacing $d_x$ by $d_0$ giving the length $L_0$ $$L_o = \frac{2Nn_2 - 1}{2\gamma} \cdot d_o \qquad (60)$$

This formula relates to an imaginary bidiopter or frustoconical mirror, since on the one hand $C_o$ is not the real concentration (which would be $C\gamma$) and, on the other hand, the apical demi-angle $\gamma$, as yet unknown, enters into Formula 60. The diameter $d_o$ is thus always too small and the length $L_o$ is always too large. But the formula is very useful in solving the problem of determining the characteristics of the elementary bidiopter. It is notably helpful in selecting a value of $\gamma$ (and that of the energy yield with which it is connected) as it permits the evaluation in advance of an order of magnitude of the length of the bidiopter. The whole practical problem is to obtain an advantageous energy yield by choosing $C_o$ (and thence $1/N$) and $\gamma$ so as not to entail too great a length for the bidiopter.

It is convenient to call the bidiopter or mirror defined by $d_1$, $d_o$, $\gamma$ and $L_o$ "the schematic elementary bidiopter or frustoconical mirror."

An illustrative calculation will explain the considerations:

A flux of infrared radiation is to be concentrated by means of a concentrator comprising:

A convergent frontal receiver of relative aperture at most equal to F/2.5.

A frustoconical bidiopter of vitreous arsenic trisulfide ($n_1 = 2.45$) the length of which must not exceed 200 mm.

An associated sensing surface of diameter 0.5 mm. immersed in the small face of the bidiopter ($n_2 = 2.45$).

Further, a minimum $\eta$ of the energy yield is fixed at 80%.

Taking as a basis of calculation $d_0 = 0.5$ mm. for the schematic elementary bidiopter there are given in the following table some numerical examples of combinations of the magnitudes $F/N$, $C_o$, $\gamma$, $d_1$, $C\gamma/C_o$ and $L_o$.

The combination designated (1) in the last column of the table is the most acceptable although the relative aparture ($F/2$) required of the frontal system may be a little too high for the data of the problem. The length is satisfactory as the value 220 mm. (for $L_o$) is too great. If a better approximation is calculated from Formula 28, $L\gamma$ is found to be 198 mm. The combination (2) leads to too long a bidiopter and too low an energy yield. The combination (3) would be excellent if it did not require such a difficult relative aperture ($F/1$) for the front optical system. The combinations (4) and (5) have a good length but too poor an energy yield.

Of course, the very limited table given by way of example only includes some arbitrarily chosen elements and the proper lengths of a suitable convergent frontal system have been omitted to simplify the table. A correct solution of the problem requires a more precise method of determination of the optimum characteristics of the concentrator and much more complete comparison tables. This method constitutes the second aspect of the invention and the preceding considerations on the schematic elementary bidiopter are only a first approach. Before describing the method and giving examples of the tables which it utilizes, further characteristics and important formulas relating to the new concentrator and its bidiopters require discussion.

The example outlined above has shown how, in a simple case, a compromise between $F/N$, the resulting $C_o$, $\gamma$, the requirement $C\gamma/C_o \geq \eta$ and $L_o$, may be found. The problem only poses real difficulty when the ratio $C_o$ has a high value or when the diameter of the minimum section of the bidiopter is too large (more than a half-millimeter, for example). It shows that the dimensions of the bidiopter are functions of each other; if the diameter $d_1$ of the flux receiving face has a high value, it follows, as was seen, that for a given angle $\epsilon$ the focal length of the front optical system is greater. It is therefore clear that in every case it is desirable to give the diameter $d_x$ a value as small as possible and to give the aperture $F/N$ a value as large as possible to reduce the ratio $C_o$.

Since the possibilites of reducing $d_x$ and of increasing $F/N$ are generally limited, other means of reducing the length of the elementary bidiopter or froustoconical mirror must be restorted to. This is why the definition of the novel concentrator includes points (3) through (7).

Point (3) relates to the feature of bundles of bidiopters previously discussed in connection with the field of the concentrator and now considered from the point of view of its length and energy yield.

If for a bidiopter of minimum diameter $e_x$ is substituted a bundle of elementary bidiopters each having a minimum diameter $d_x$, smaller than $e_x$, the length is divided by the ratio $e_x/d_x$, assumed to be integral. For example, in combination (2) of the foregoing table, the bidiopter may be replaced by a bundle such that $e_x/d_x = 3$. This bundle comprises a total of 7 bidiopters ($\pi \cdot 9/4$) and its schematic length $L_o$ becomes 114 mm. instead of 342.

Bundles of conical glass fibers, of characteristics conforming to the requirements of the present invention, may

| $F/N$ | $C_o = 4N^2n_2{}^2$ | $\gamma$ | $d_1 = \sqrt{C_o \, d_o}$ | $\dfrac{C\gamma}{C_o} = \dfrac{1}{(1+\sqrt{C_o-1}\gamma)^2}$ | $L_o = \dfrac{\sqrt{C_o}-1}{2\gamma} d_o$ | |
|---|---|---|---|---|---|---|
| F/3 | 216 | 1/100 rad | 7 mm | 76% | 342 mm | (2) |
|  |  | 1/50 | 7 | 60% | 171 mm | (5) |
| F/2 | 96 | 1/100 rad | 5 mm | 83% | 220 mm | (1) |
|  |  | 1/50 | 5 | 70% | 110 | (4) |
|  |  | 1/40 | 5 | 57% | 66 |  |
| F/1 | 24 | 1/100 rad | 2.5 mm | 91% | 97 | (3) |
|  |  | 1/20 | 2.5 | 65% | 20 |  |
| (F/0.5) | 6 | 1/50 rad | 1.2 mm | 92% | 18 |  |
|  |  | 1/10 | 1.2 | 67% | 4 |  |

For various values of $F/N$ (left column) there are two or three selected values of $\gamma$ from which follow various determinations for $d_1$, $C\gamma/C_o$ and $L_o$.

The ratio $C\gamma/C_o$ expresses the energy yield as a percentage.

be used. The apical demi-angle $\gamma$ being very small for the fibers (of the order of 1/1000 radian), the ratio of the length to the minimum diameter is very large. If the length of the bundle is to be effectively reduced, it should be constituted of a large number of fibers. For example, application of Formula 60 indicates that a conical fiber in air ($n_2=1$) and associated with an objective of aperture $F/4$.

(concentration $C_o = 4N^2 n_2^2 = 64$)

has a length of the order of 3,500 times its minimum diameter. If the latter has a value of $20\mu$, the fiber has a length of the order of 70 mm. A bundle containing 2000 of these fibers (or about 50 fibers across the diameter) would have a minimum section of 1 mm.

There is no interest in using here fibers of the conventional size. They are much too long. With fibers having a larger apical demi-angle, for example, $1/100$ radian there would be needed, for the same bundle length, about $1/10$ the number of fibers across the diameter, or about $1/100$ the total number of fibers. The energy yield of each fiber remains very high since $\gamma = 1/100$ radian. If, because of requirements of resolving power, it is not desirable to reduce the number of fibers in the bundle, the length would become ten times as great. In many cases, however, bundles of elementray bidiopters for which $\gamma$ is $1/60$, $1/30$ or $1/20$ radian may be used. When the bidiopters are made by drawing out an optical material, such as glass, it will be seen that the fibers useful in the invention will have relatively large apical angles as compared with conventional fibers.

The energy yield of the various bundles of bidiopters is not in direct ratio to the yield of the elementary bidiopters of which they are composed. The yield of a bundle is subject to a loss arising from the interstices between the elementary bidiopters, assumed to be circular in section and in contact between the entrance and exit faces. This loss can easily be calculated. Designating by $e_x$ the minimum diameter of the bundle and by $d_x$ the minimum diameter of an element bidiopter, the number of bidiopters composing the bundle is:

$$\pi(e_x/d_x)^2/4$$

The total actual surface of the small faces is then:

$$\pi d_x^2/4 \cdot \pi(e_x/d_x)^2/4 = \pi^2 e_x^2/16$$

Since the total minimum surface of the bundle is $$\pi e_x^2/4$$

the ratio of the useful surface to the total surface is $\pi/4$. This ratio is independent of $e_x$ and of $d_x$ and is equal to 0.785 or 78.5%. The interstitial loss of yield is 21.5%. This is conditioned on the minimum section of the bundle being a circle which is only true when the bundle is composed of a large enough number of bidiopters. When it is composed of a small number of bidiopters, its external contour is very different from a circle and the total loss is relatively smaller being only that due to the interstices between the bidiopters. The ratio thus calculated approaches an order of magnitude of 80%.

To the loss of 21.5% must be added for bundles of conical fibers a further loss due to the cladding with which the fibers are sheathed to avoid optical contact being established between them, particularly in a humid atmosphere; this cladding increases the diameter of the minimum sections in greater proportion than the diameter of the maximum sections and consequently diminishes the yield. These various losses must be taken into consideration in correctly evaluating the final yield of the concentrator. In general, it is desirable to use "large fibers" (for example, having a minimum diameter of the order of $50\mu$) and to give them a relatively large apical angle so as not to unduly increase their length, as proposed above. The effect of cladding is then much less important.

It is important to emphasize that the interstitial losses only occur in cases where the concentration of the radiant energy is effected by a plurality of elementary bidiopters at a time (that is, when an image is formed). When, regardless of the number of bidiopters, the concentration is effected by only one of them at a time, these losses do not occur. This is the case, for example, when a bundle of bidiopters is used to increase the field within which small isolated sources are to be detected and localized in the field.

Furthermore, the use of bundles is not the only expedient which permits reducing the length of a bidiopter. For example, when using optical materials (notably materials which are highly refractive in the infrared) which do not lend themselves to being drawn out into fibers nor to being shaped into bidiopters which are long and thin, there is another way of reducing the length of the bidiopter. This is to connect serially a plurality of bidiopters of different materials as called for in point 4 of the definition of the concentrator of the invention. For example, for an infrared detector there may be arranged serially, first, a bidiopter of glass (special infrared transparent) and, second, a bidiopter of highly refractive material (such as silicon, germanium, indium antimonide, ...). The latter is then much shorter than if it effected the entire concentration. Further, the theoretical concentration $C_0$ required of it being small, its apical demi-angle $\gamma$ may be larger to obtain the same energy yield and its length is again shortened. In a particular case the concentration $C_0$ required of the terminal bidiopter may be very small (as small as 3 or even 2, for example). The apical demi-angle may then be relatively large $1/10$ radian, for example).

The characteristics of the individually serially joined bidiopters are not required to respond to the conditions for maximum concentration heretofore formulated. It is sufficient if the ensemble of the bidiopters provides the maximum concentration for a given aperture $1/N$ of the frontal optical system and a given index $n_2$ of the medium in which the sensing element is immersed. If $d_1$ designates the maximum diameter of the large flux receiving face of the front bidiopter and $d_x$ the minimum diameter of the rearmost bidiopter, it is sufficient that $$(d_1/d_x)^2 \simeq 4N^2 n_2^2$$

or $$d_1/d_x \simeq 2N n_2$$

to approximations of the systematic losses of the various bidiopters when their apical demi-angles are not negligible. It is sufficient, in other words if the ensemble of connected bidiopters acts like a single bidiopter of the invention. Formula 59, which applies precisely to point (4) of the definition, will be recognized. The front bidiopter may be a simple frustoconical mirror; the others must then be bidiopters with internal indices greater than 1.

Each of the connected bidiopters thus have individual characteristics which may have no relation to those of the bidiopters heretofore described. To calculate these characteristics the general Formulas 14, 18, 19, 20, in which $p'$ (the maximum number of internal reflections) is given a value determined by other criteria than those of maximizing the concentration may be used.

In Formula 18 the expression: Arc sin ($n_2/n_1$) represents the limit angle $\lambda n_1/n_2$ of total reflection at the small exit face of the bidiopter and this formula determines maximum $p'$ for all rays leaving the medium of index $n_2$. It is sufficient therefore in extending the use of the formula to replace Arc sin ($n_2/n_1$) by an expression representing a requirement of different type.

For example, in the case of bidiopters connected in series, it is important to reduce as far as possible the supplemental losses due to partial reflections occurring in the passage of the rays from one bidiopter to a succeeding bidiopter. These losses are considerably reduced by means of anti-reflective coatings on the contacting surfaces of the bidiopters. But these coatings are only maximally effective for mean wavelengths and for angles of incidence below a certain value. It is therefore important to determine in each case a limit $\psi_x$ for the maximum angle of incidence on the face separating the bidiopters. This limit value $\psi_x$ then replaces the expression Arc sin $(n_2/n_1)$ in Formula 18. For an anti-reflective coating of thickness $\lambda/4$, $\psi_x$ may be given the value of about 50° (reflection substantially nil) or even 60° (reflection about 5% for glass). The $\psi_x=1$ radian (a little over 57°) is satisfactory in most cases.

Moreover, the first of the connected bidiopters is not necessarily the bidiopter associated with the frontal convergent system. The angle of incidence of the rays on the large entrance face of the first bidiopter should then not be designated $\theta_1$ but $\theta_1'$, the value of which is determined for each particular case. If $\psi_x'$ is the maximum angle of incidence on the minimum section of the anterior bidiopter, $\theta_1'$ is precisely equal to $\psi_x'$.

The relation 14 becomes $$\beta_1' = \text{Arc sin } [(n_1'/n_2') \sin \theta_1'] + 2\gamma \quad (61)$$

in which $n_1'$ represents the index of the first of the bidiopters, $n_2'$ the index of the second and $\gamma$ is the apical demi-angle of the first bidiopter.

The formulas characterizing the bidiopter may be made explicit by calling $p_2'$ the maximum number of internal reflections of a ray having the angle of inclination $\theta_1'$ at the entrance, $d_m$ the diameter of the maximum section, $d_n$ the diameter of the minimum section and $C\gamma/d_n$ the energy concentration of the bidiopter, giving:

$$p_2' \sqsubseteq \left[\frac{\psi_x - \beta_1'}{2\gamma} + 1\right] \quad (62)$$

$$d_m/d_n = \frac{\sin [\beta_1' + (2p_1' - 1)\gamma]}{\sin (\beta_1' - \gamma)} \quad (63)$$

$$C\gamma/d_n = \frac{\sin^2 [\beta_1' + (2p_2' - 1)\gamma]}{\sin^2 (\beta_1' - \gamma)} \quad (64)$$

To these exact formulas are added approximation formulas for $C\gamma/d_n'$ and $C_0/d_n''$ analogous to general formulas 32 and 40 and the formula of energy yield for $(C\gamma/d_n')/(C_0/d_n'')$ analogous to formulas 46 and 48. These formulas will not be detailed here.

It is interesting to compare the results calculated by Formulas 62, 63 and 64 with those obtained by means of Formulas 24, 25 and 26 expressing the condition of total reflection at the lateral conical surface of the bidiopter. In general, (when the indices $n_1'$ and $n_2'$ of the joined bidiopters are not too far apart), the minimum diameter $d_n$ calculated by Formula 63 is smaller than the minimum diameter $d_4$ calculated by Formula 25 or at least $d_n$ and $d_4$ are close together. It is advantageous to use the value $d_4$ as it avoids silvering the terminal portion of the lateral conical surface. The maximum angle of incidence on the separation surface of the bidiopters then has a value which may be designated as $\psi_4$ and which is in this case smaller than that of $\psi_x$.

The value of $\psi_4$ can be obtained and compared with $\psi_x$ without using the general formulas. It can be shown, referring to FIG. 8, that the maximum angle of incidence on the small terminal face 8 of a bidiopter in the case of total reflection at the lateral conical surface is equal to the angle $\beta_q$ which is the same as the complement of the angle $(\lambda n_1' - \gamma)$. Therefore, in air:

$$\psi_4 = \pi/2 - \lambda n_1' + \gamma$$

a value which can be compared directly with $\psi_x$ to determine whether or not it is advantageous to cut the bidiopter at section $d_4$ in a particular case. This value of the maximum angle of incidence, $\psi_4$, has another interest: when calculating the succeeding bidiopter in a series it enters directly into Formula 14 where it replaces $\theta_1$, $n_1$ replaced by the relative index of the two connected bidiopters.

When the limit for $\psi_x$ which cannot be exceeded has been determined, the limit value of the index $n_1'$ of the first bidiopter beyond which $\psi_4$ becomes greater than $\psi_x$, can be found. It is sufficient to put $\psi_4 = \psi_x$ where $$\pi/2 - \lambda n_1' + \gamma = \psi_x$$

If, for example, $\gamma = \frac{1}{50}$ radian or a little more than 1° and if the critical value adopted for $\psi_x$ is 1 radian (about 57°) then, in degrees:

$$90 - \lambda n_1' + 1 = 57 \text{ whence } \lambda n_1' = 34°$$

The limit value for the index $n_1'$ is then given by the relation (for limit of total reflection)

$$\sin \lambda n_1' = 1/n_1' \text{ whence } n_1' = 1.78$$

If the index of the first bidiopter is greater than 1.78, $\psi_4$ is larger than $\psi_x$ and the bidiopter must be cut ahead of section $d_4$ at a section $d_n$ of larger diameter given by Formula 63. On the contrary, if the index is less than 1.78, the minimum section may be given the value $d_4$ without fear of a prejudicial loss by partial reflection.

All of what has just been said about bidiopters assembled in series is also applicable to concentration devices as defined in paragraphs (6) and (7) of the fundamental definitions.

According to (6) the reduction in length by means of a bundle of bidiopters (3) is combined with the adjunction of a coupled terminal bidiopter.

According to (7) of the definition of the device, several bundles of bidiopters are positioned in series. Thus one benefits from the advantage of the length reduction and also from the advantage of an enlarged field and a direct permanent image.

According to (5) the overall length is decreased by means of a completely different device: the bidiopter (or series of bidiopters) is folded back on itself by means of a set of total reflection prisms. FIG. 16 schematically shows a form of realization of such a device: the bidiopter, associated on one hand with the frontal optical system 30 and on the other hand with the sensitive surface 31, is replaced by three sections 32, 33 and 34 interconnected by means of total reflection prisms 35 and 36. The sections of the bidiopter and the prisms are preferably made of the same material and adjoin each other.

Finally, in some particular cases, it may be of interest to employ a bidiopter (or a bundle of bidiopters) not of revolution, in accordance with (8) and (9) of the definition of the device. When the sensitive element is filiform, the elemenary bidiopter may be "conoidal," collecting the radiation with a circular entrance pupil and concentrating it along a straight linear segment or a very flattened ellipse. The reverse could also occur, for instance when the image of the source is formed by a slit, as in a spectrometer.

With these remarks it canbe seen how diversified, in practice, is the use of the different forms of the new concentrator depending upon the intended utilization and the availability of materials. In order to effectively build a concentrator of this type it remains to define a method permitting the determination of its varied characteristics. This method constitutes the second object of the invention. Said method is described hereafter, in 48 points, discussed with reference to tables of charts, and illustrated by means of numerical examples which also define embodiments of devices incorporating the invention—devices which constitute the third object of the invention.

The method is characterized in that the following operations are performed in the indicated order or according to any combination that will suit the needs:

(1) The nature of the sensing surface of the receiver being known, one determines the order of minimal magnitude $\Delta_0$ of said sensing surface or the order of magnitude $\Delta_0'$ of its linear limit of resolution when it pertains to category A.

(2) The value, preferably maximal, of index $n_2$ of the medium in optical contact with the sensing surface is determined according to the experimental conditions which are available.

(3) The valve $1/N$ of the relative opening (or its equivalent) of the frontal concentration system is fixed as large as possible depending upon cost and suitable optical characteristics.

(4) The total energizing concentration $C_t$ which must be required of the bidiopter or elementary frustoconical mirror (or from the combinations of bidiopters, mirrors or bundles positoned in series) is calculated as follows:

$$C_t = 4N^2 n_2^2$$

(5) The value of the resolving power $\epsilon$ or field angle of the elementary bidiopter is determined as a function of $\alpha$, the apparent diameter of the smallest sources of a radiation flux which one desires to concentrate at an average distance of utilization:

$$\epsilon \leqslant \alpha$$

(6) An upper limit, $f_{max}$, is fixed for the focal length of the frontal concentrator system.

(7) The upper limit, $d_{1\ max}$, of the diameter of the large flux receiving face (associated with the frontal optical system) of the elementary bidiopter is subsequently determined:

$$d_{1\ max} = f_{max} \times \epsilon$$

(8) $d_{o\ max}$, the corresponding upper limit for the schematic value $d_o$ of the diameter of the minimal section (associated with the sensing surface) of the elementary bidiopter, is calculated:

$$d_{o\ max} = d_{1\ max}/\sqrt{C_t}$$

(9) Value $d_{o\ max}$ is compared with the minimal value of $\Delta_o$ as determined in (1) in the case where the sensing surface belongs to category A.

If $d_{o\ max} > \Delta_o$, the order of magnitude of $d_o$, preferably minimal, is fixed:

$$d_o = \Delta_o$$

If $d_{o\ max} < \Delta_o$, one fixes the minimal number $w$ (on the diameter) of bidiopters of the elementary beam which must be associated with the sensing surface:

$$w \simeq \Delta_o/d_{o\ max}$$

and $$\pi w^2/4 \simeq \pi \Delta_o^2/4\ d_{o\ max}^2.$$

(total minimal number of bidiopters).

The order of magnitude of $d_o$ is then fixed:

$$d_o = \Delta_o/w$$

(contingent on $d_o$ being greater than or equal to the linear limit of resolution $\Delta_o'$ fixed in (1)).

(10) In the event the sensitive surface belongs to category B, the order of magnitude of $d_o$ is nevertheless chosen so that $$d_o = \Delta_o$$

If $d_{o\ max} < \Delta_o$, means, such as total reflection prisms, are provided to shorten the overall length which is determined by the focal length $f$. Or, if this is not possible, one increases the relative opening $1/N$ of the frontal optical system in order to decrease the value $C_t$ and finally increase the value of $d_{o\ max}$ (to bring it closer to the value of $\Delta_o$).

(11) The final value of focal length $f$ of the frontal optical system is determined by adjusting $f_{max}$ to the results obtained at (9) and (10).

(12) The diameter $2R$ of effective opening of the frontal optical system is calculated:

$$2R = f/N$$

(13) The value of the angle of total field $\Gamma$ of the concentrator system is fixed.

(14) From it is deduced the value $e_1$ of the diameter of the frontal image (or "ocular circle"):

$$e_1 = f.\Gamma$$

(15) In the case of a concentrator of the direct permanent image type, one figures out the total number $W'$ (at the diameter) of bidiopters associated with the sensing surface:

$$W = We'/d_o\sqrt{C_t}$$

wherein $W = 1$ when $d_o = \Delta_o$.

The order of magnitude of the minimal diameter of the beam associated with the sensitive surface is equal to $W'd_0$.

The diameter of the total sensing surface receiving the image is equal to $W'\Delta_o/W$.

(16) In the case of a scanning concentrator, the characteristics of the scanning are determined: frequency, average duration of coincidence of each image element with the large flux receiving face of the elementary bidiopter.

(17) One fixes the minimum H of energy yield for the entire assembly of bidiopters or frustoconical mirrors or associated bundles.

(18) An order of maximal magnitude $L_{max}$ is chosen for the total length of the assembly of bidiopters or bundles.

(19) The order of magnitude of index factor $n_1$ of the bidiopter (or of the bundle) associated with the sensing surface is calculated as a function of the materials available.

(20) Graphs or tables are prepared each one indicating for a given value of the ratio $n_1/n_2$ a great number of combinations between the values of:

$\gamma$, the half-angle at the apex of a bidiopter.

$C_o$, the desired energy concentration required of said bidiopter.

$\eta$, the true energy efficiency.

$L_o$, the length of the schematic bidiopter. For simplification this length is expressed with $d_o$ taken as the unit.

(21) It is determined whether the order of maximal magnitude of length $L_{max}$ chosen at (18) is compatible with the values of $C_t$ and H previously fixed. One begins by expressing $L_{max}$, taking as a unit the order of magnitude of $d_o$ fixed at (9) or at (10) and one then consults the tables that have been prepared to find if there is at least one value of $\gamma$ which offers an acceptable compromise between $C_t$, H and $L_{max}/d_o$.

If such a value of $\gamma$ exists, only one elementary bidiopter (or bundle) may suffice.

The true order of magnitude of this elementary bidiopter (or of this bundle) can be chosen smaller than $L_{max}$ if the combinations offered by the tables are many.

If no such value $\gamma$ exists and in the case the sensing surface belongs to category A, it is necessary to give $d_o$ a value smaller than the order of magnitude previously chosen so that the ratio $L_{max}/d_o$ has a value compatible, in the tables, with $C_t$ and H. The final value of $d_o$ is subsequently fixed and the value of the number (at the diameter) of elementary bidiopters associated with the sensing surface is readjusted: $W = \Delta_o/d_o$.

In the event the sensing surface belongs to category B, it is necessary either to decrease the values of $C_t$ or of H, or to decide upon devices comprising total reflection prisms so as to decrease the overall length of $L_{max}$.

(22) One fixes the number of bidiopters (or bundles) to be coupled in series by determining if the order of magnitude of length $L_{max}$ (or of true length considered at 21), is compatible with the technology and the cost of the materials available.

(23) If only one bidiopter or frustoconical mirror is used (or only one bundle) the optimal parameters are determined by referring directly to paragraphs 37 to 46 of the present procedure, proper consideration being also given to paragraph 26.

(24) If several bidiopters (or bundles) are used in series, generally two of them, the order of magnitude of their respective energy yields $\eta$ and $\eta'$ are determined so that $$\eta \cdot \eta' \geq H$$

(25) Proper consideration being given to the technology of materials, the cost, and the order of magnitude of $d_o$, it is determined between which limits it is suitable to locate the optimal value of length $L_o$ of the terminal schematic elementary bidiopter (associated with the sensing surface). Two limit values are chosen, an upper and a lower value, and are expressed choosing $d_o$ as a unit.

(26) One establishes the order of magnitude of the average length of travel of a ray inside said terminal bidiopter and it is determined if the proportion of radiation flux which is lost by absorption during such travel is compatible with the minimum energy yield $\eta$ as defined in (24).

Such evaluation is performed by calculation similar to the one previously developed in the preamble of the present procedure, consideration being taken of the temperature of the bidiopter while in operation.

If the loss by absorption is negligible with regard to the efficiency (as in most cases) the first evaluation of $L_o$ is kept. When it is not so (special situations) lower values of $L_o$ are chosen.

(27) An upper limit $C_{o\ max}$ is chosen relating to the theoretical concentration expected from the terminal bidiopter (or from the bundle) by looking through the tables of 20 for the greatest value of $C_o$ to which corresponds a pair of values $\eta$ and $L_o$ compatible with the previous results. The corresponding values of $\gamma$ are noted.

(28) The lower limit $C'_{o\ min}$ is then deduced relating to the theoretical concentration $C'_o$ expected from the front bidiopter (or from the bundle) associated with the frontal optical system:

$$C'_{o\ min} = C_t / C_{o\ max}$$

(29) The minimal value $n'_{1\ min}$ of factor $n'_1$ of the front bidiopter is then calculated as follows:

$$n'_{1\ min} = \sqrt{\frac{C'_{o\ min}}{4N^2}}$$

(30) It is determined if the minimal section of this front bidiopter belongs to category $d_4$ (conditions of total reflection) or $d_x$ (general case) or $d_n$ (conditions related to angle $\psi_x$ depending upon the special data concerning partial reections). The optimal value of $n'_1$ is then chosen. For example in the case of section $d_4$:

$$n'_1 \simeq \sqrt{n'^2_{1\ min} + 1}$$

(31) The final value of $n'_1$ is subsequently chosen depending upon the availability of materials, their cost.

(32) The final value of $C'_o$, the concentration required of the front bidiopter is then calculated. For instance, in the case of section $d_4$:

$$C'_o = 4N^2(n'^2_1 - 1)$$

(33) The upper limit $L'_{o\ max}$ of the schematic length of the front bidiopter is made explicit:

$$L'_{max} = L_{max} - L_o$$

and $L'_{o\ max}$ is expressed taking $d_o$ as a unit ($L_{max}$ has been fixed at 18); $L_o$ evaluated in (25) and (26)).

(34) The optimal value of $\gamma'$, the apical demi-angle of the front didiopter is chosen by consulting the charts of (20) as a function of the values previously fixed for $C'_o$, $\eta'$ and $L'_{omax}$.

(35) In the event no value found in the charts is suitable for $\gamma'$, the bidiopter is replaced by a bundle or a third bidiopter is calculated according to the procedure from (28) to (34).

(36) The final value of the theoretical concentration $C_o$ required of the last bidiopter (which until now was only characterized by the upper limit as determined in 27) is calculated:

$$C_{lo} = C_t / C'_o$$

(37) One fixes the final and optimal value of $n_1$, index of the terminal bidiopter (the order of magnitude of which has been determined at 19) taking into consideration the best energy efficiency that may be obtained depending upon the values of the $n_1/n_2$ ratio.

(38) The optimal value of $\gamma$, the apical demi-angle of the terminal elementary bidiopter is determined by consulting the charts of (20) and as a function of the values chosen above for $C_o$, $\eta$ and $L_o$.

(39) One proceeds with the verification of the previously obtained findings by comparison with one another and, if need be, some of the values may then be readjusted.

(40) The frontal concentrator system is constructed, characterized by an useful opening radius R and a focal length $f$ which results in allowing the measurement of its other characteristics.

(41) One proceeds with the accurate determination, by special calculation depending upon each particular case or by accurate measurement performed on the frontal concentrator system, of the value of $\sin \theta_1$, the order of magnitude of which is $1/2N$ (an approximation which is generally satisfactory when the frontal system is aplanatic).

(42) The final value of diameter $d_1$ is fixed, the diameter of the large radiation receiving face of the frontal elementary bidiopter (associated with the frontal optical system) the upper limit of which had been calculated at 7, as a function of the true value (or measurement) of focal length $f$ (determined in 11), and measurable at (40):

$$d_1 = f \cdot \epsilon$$

(43) One determines the value of the minimal diameter $d'_x$ of the frontal elementary bidiopter by means of Formula 19 in general cases or (25) in the case of a section of category $d_4$ or else (63). One may also be satisfied with the excellent approximation provided by Formula 31 in general cases or Formula 35 in the case of a minimal section $d_4$. To use basic Formula 14 $\theta_1$ is replaced by $\psi_x$, the maximum angle of incidence on the minimum section of the frontal bidiopter, and $n_1$ by the relative index of the two coupled bidiopters.

(44) One calculates the value of length $L'\gamma$, of the frontal elementary bidiopter, by means of general Equation 28.

(45) $d_x$, the minimal diameter of the terminal elementary bidiopter is calculated by means of the proper Equations 19, 15, 22 or 25 or one of the approximation Equations 31 or 35. To characterize $d_1$, diameter of the large face of radiation collection of this bidiopter, one chooses the value found at (43) for the minimal diameter of the frontal elementary bidiopter.

(46) The value of length $L\gamma$ of the terminal elementary bidiopter is calculated by means of general Formula 28.

(47) From the values calculated above one determines the characteristics of bundles of elementary bidiopters, coupled in series or not, the general structures of which were outlined in (9), (15) and (35).

(48) Depending upon the intended utilization and the cost it is decided whether two identical concentrators are to be placed "in parallel" to act simultaneously on both faces of the sensing element.

Understanding this procedure necessitates a few remarks.

From (1) to (10) there are set down the values of a few basic dimensions and the imperative and generally conflicting data are adjusted, data provided on one hand by the minimal value $\Delta_o$ of the diameter of the sensing surface and on the other hand by the maximum value that may be assigned to the focal length $f$ of the frontal optical system. This problem being settled as well as whether the sensing surface belongs to category A or to category B, the general arrangements of the concentrator are the object of evaluation and complementary determination in paragraphs (11) to (18). Then the characteristics per se of the elementary bidiopter are defined by a series of approximations. Most of the time it is necessary to couple in series two elementary bidiopters or two elementary bundles. First, and according to points (19) to (27), orders of magnitude and limit values are selected for the terminal elementary bidiopter (or bundle). Further, according to points (28) to (35) the structures of the frontal bidiopter (or bundle) are determined. Then, at points (36) to (38), the determination of the characteristics of the terminal bidiopter is effected and the procedure is completed by the final calculations based on the lengthy accurate equations relating to frustoconical bidiopters of maximum concentration (or their approximations).

In practice, as can be verified, the sequence of operations constituting the procedure cannot develop automatically. The problem is itself too complex and it is necessary to perform successive readjustments of which the efficacious and logical order has been indicated. This is why a large number of steps of the procedure concern the determination of orders of magnitude. This is also why there is specified at (20) the preparation of a chart and tables, examples of which will be furnished hereafter.

There are eleven parameters involved in the simple association of a frontal concentrator with a schematic elementary bidiopter:

$n_2, N, f, C_0, \epsilon, d_1, d_0, n_1, \gamma, L_0, \eta$

The most complete approach includes preparing a chart presenting 10 entries, choosing the minimal schematic diameter $d_0$ as a unit for evaluating the other dimensions (f, $d_1$, $L_0$).

One can also prepare tables. The most useful type of tables is prepared as follows: for a given value of ratio $n_1/n_2$ (which enters into the choice of the formula giving the energy efficiencies) the values of $\eta$ and of $L_0$ are determined as functions of $\gamma$ and of $C_0$. $d_0$ is chosen as a unit for evaluating $L_0$. Three examples of such tables are presented hereafter:

TABLE I $n_1 = n_2$ (complete immersion)

$$\eta = \frac{1}{(1+\sqrt{C_0-1}\cdot\gamma)^2}$$

FIRST PART OF TABLE

| | | (For terminal bidiopters) | | | | For: $n_1=n_2=3$ Preliminary concentration of: | | | |
|---|---|---|---|---|---|---|---|---|---|
| | | | | | | | | F/1 | F/1.3 |
| | $C_0$ | 9/4 | 3 | 4 | 9 | 16 | 32 | 36 | 64 |
| $\gamma=1/10$ rad | $\eta$ / $L_0$ | 0.809 / 2.5 | 0.77 / 3.7 | 0.73 / 5 | 0.61 / 10 | 0.52 / 15 | 0.41 / 23 | 0.40 / 25 | 0.31 / 35 $d_0$ |
| $\gamma=1/20$ | $\eta$ / $L_0$ | 0.896 / 5 | 0.87 / 7.3 | 0.85 / 10 | 0.77 / 20 | 0.70 / 30 | 0.61 / 46 | 0.60 / 50 | 0.51 / 70 $d_0$ |
| $\gamma=1/30$ | $\eta$ / $L_0$ | 0.930 / 7.5 | 0.91 / 11 | 0.89 / 15 | 0.83 / 30 | 0.78 / 45 | 0.71 / 70 | 0.70 / 75 | 0.63 / 105 $d_0$ |
| $\gamma=1/50$ | $\eta$ / $L_0$ | 0.957 / 12.5 | 0.94 / 18 | 0.93 / 25 | 0.90 / 50 | 0.86 / 75 | 0.81 / 116 | 0.80 / 125 | 0.75 / 175 $d_0$ |
| $\gamma=1/100$ | $\eta$ / $L_0$ | 0.978 / 25 | 0.972 / 37 | 0.967 / 50 | 0.946 / 100 | 0.93 / 150 | 0.90 / 233 | 0.89 / 250 | 0.86 / 350 $d_0$ |
| $\gamma=1/1000$ | $\eta$ / $L_0$ | 0.997 / 250 | 0.997 / 370 | 0.996 / 500 | 0.994 / 1,000 | 0.992 / 1,500 | 0.989 / 2,328 | 0.988 / 2,500 | 0.984 / 3,500 $d_0$ |

The first part of Table I concerns principally the terminal bidiopters (a primary concentration having been effected by prior bidiopters).

SECOND PART OF TABLE

If: $n_1=n_2=3$ (for example), preliminary frontal concentration:

| | | F/1.4 | F/2 | | F/2.8 | | F/4 | F/5.6 |
|---|---|---|---|---|---|---|---|---|
| | $C_0$ | 72 | 81 | 144 | 256 | 288 | 324 | 576 | 1,152 |
| $\gamma=1/10$ rad | $\eta$ / $L_0$ | 0.29 / 37 | 0.28 / 40 | 0.21 / 55 | 0.15 / 75 | 0.14 / 80 | 0.13 / 85 | 0.08 / 115 | 0.05 / 170 $d_0$ |
| $\gamma=1/20$ | $\eta$ / $L_0$ | 0.50 / 74 | 0.48 / 80 | 0.40 / 110 | 0.31 / 150 | 0.29 / 160 | 0.28 / 170 | 0.21 / 230 | 0.13 / 340 $d_0$ |
| $\gamma=1/30$ | $\eta$ / $L_0$ | 0.61 / 111 | 0.59 / 120 | 0.51 / 165 | 0.43 / 225 | 0.41 / 240 | 0.39 / 255 | 0.31 / 345 | 0.22 / 510 $d_0$ |
| $\gamma=1/50$ | $\eta$ / $L_0$ | 0.73 / 185 | 0.72 / 200 | 0.65 / 275 | 0.57 / 375 | 0.56 / 400 | 0.54 / 425 | 0.45 / 575 | 0.36 / 850 $d_0$ |
| $\gamma=1/100$ | $\eta$ / $L_0$ | 0.85 / 374 | 0.84 / 400 | 0.80 / 550 | 0.74 / 750 | 0.73 / 800 | 0.72 / 805 | 0.65 / 1,150 | 0.56 / 1,700 $d_0$ |
| $\gamma=1/1000$ | $\eta$ / $L_0$ | 0.98 / 3,740 | 0.98 / 4,000 | 0.97 / 5,500 | 0.97 / 7,500 | 0.97 / 8,000 | 0.965 / 8,500 | 0.95 / 11,500 | 0.94 / 17,000 $d_0$ |

TABLE II $n_2=3$; $n_1=4$ (principally for terminal bidiopters)

$$\eta = \left[\frac{1+\sqrt{\frac{n_1^2}{n_2^2}-1}\cdot\tan\gamma}{1+\sqrt{C_0\frac{n_1^2}{n_2^2}-1}\cdot\tan\gamma}\right]^2$$

| | | | | | | | | F/1.8 |
|---|---|---|---|---|---|---|---|---|
| | $C_0$ | 9/4 | 3 | 4 | 9 | 16 | 32 | 64 |
| $\gamma=1/10$ rad | $\eta$ / $L_0$ | 0.860 / 2.5 | 0.81 / 3.7 | 0.76 / 5 | 0.60 / 10 | 0.51 / 15 | 0.39 / 23 | 0.28 / 35 $d_0$ |
| $\gamma=1/20$ | $\eta$ / $L_0$ | 0.922 / 5 | 0.894 / 7.3 | 0.86 / 10 | 0.76 / 20 | 0.68 / 30 | 0.57 / 46 | 0.46 / 70 $d_0$ |
| $\gamma=1/30$ | $\eta$ / $L_0$ | 0.946 / 7.5 | 0.926 / 11 | 0.90 / 15 | 0.82 / 30 | 0.76 / 45 | 0.68 / 70 | 0.57 / 105 $d_0$ |
| $\gamma=1/50$ | $\eta$ / $L_0$ | 0.966 / 12.5 | 0.95 / 18 | 0.94 / 25 | 0.89 / 50 | 0.84 / 75 | 0.78 / 116 | 0.72 / 175 $d_0$ |
| $\gamma=1/100$ | $\eta$ / $L_0$ | 0.983 / 25 | 0.977 / 37 | 0.968 / 50 | 0.945 / 100 | 0.920 / 150 | 0.881 / 233 | 0.832 / 350 $d_0$ |
| $\gamma=1/1000$ | $\eta$ / $L_0$ | 0.998 / 250 | 0.997_6 / 370 | 0.996_8 / 500 | 0.994_0 / 1,000 | 0.991_3 / 1,500 | 0.987 / 2,328 | 0.981 / 3,500 $d_0$ |

TABLE III $n_2=1$ (sensing surface immersed in air)
$n_1=1.5$ (bidiopter of ordinary glass)

In addition to those heretofore given other types of tables are useful. More specifically tables prepared each for a given angle of elementary field $\epsilon$, indicating, as functions of varied values of $n_2$ and N, the values of the total

RELATIVE APERTURES OF FRONTAL CONCENTRATOR

| | | F/1 | F/1.4 | F/2 | F/2.8 | F/4 | F/5.6 | |
|---|---|---|---|---|---|---|---|---|
| | $C_o$ | 4 | 8 | 16 | 32 | 64 | 128 | |
| $\gamma=1/10$ rad | $\eta$ | $0.66_4$ | $0.54_8$ | $0.43_2$ | $0.32_1$ | $0.22_6$ | $0.15_1$ | |
| | $L_o$ | 5 | 9 | 15 | 23 | 35 | 52 | $d_o$ |
| $\gamma=1/20$ | $\eta$ | $0.80_3$ | $0.71_7$ | $0.62_3$ | $0.50_6$ | $0.40_8$ | $0.30_7$ | |
| | $L_o$ | 10 | 18 | 30 | 46 | 70 | 104 | $d_o$ |
| $\gamma=1/30$ | $\eta$ | $0.86_5$ | $0.79_2$ | $0.71_2$ | $0.62_7$ | $0.52_5$ | $0.42_1$ | |
| | $L_o$ | 15 | 27 | 45 | 70 | 105 | 156 | $d_o$ |
| $\gamma=1/50$ | $\eta$ | $0.91_2$ | $0.87_4$ | $0.82_4$ | $0.74_5$ | $0.66_3$ | $0.56_9$ | |
| | $L_o$ | 25 | 46 | 75 | 116 | 175 | 258 | $d_o$ |
| $\gamma=1/100$ | $\eta$ | $0.95_5$ | $0.92_2$ | $0.89_9$ | $0.85_7$ | $0.80_5$ | $0.73_8$ | |
| | $L_o$ | 50 | 92 | 150 | 233 | 350 | 516 | $d_o$ |
| $\gamma=1/1000$ | $\eta$ | $0.99_5$ | $0.99_2$ | $0.99_0$ | $0.98_1$ | $0.97_6$ | $0.96_8$ | |
| | $L_o$ | 500 | 9,140 | 1,500 | 2,328 | 3,500 | 5,160 | $d_o$ |

The method of using these tables is obvious. The theoretical concentration $C_o$ being fixed, the energy efficiencies and the lengths for different given values of the apical demiangle of the cone are compared at a glance. It should be understood that the tables presented here as examples are far from being complete enough to answer the actual needs of the engineer charged with producing frustoconical bidiopters according to the invention. Very detailed tables should be prepared wherein the successive values of angle $\gamma$ would differ by 10' and those of indices $n_2$ and $n_1$ would differ by tenths (or less). Tables should also be prepared for the case of the condition of total reflection (section $d_4$, point (2) of the fundamental definition) and the efficiency $\eta$ be determined by means of equation (47).

theoretical concentration $C_t$ and of the focal length $f$ of the frontal optical system. ($f$ will be calculated using as a unit $d_o$, diameter of the schematic elementary bidiopter, which permits finding at a glance the order of magnitude to be considered for $d_{o\,max}$ of step (8) of the procedure.) Two examples of such tables are offered hereinafter and will be used for numerical illustrations.

Table IV is prepared for $\epsilon=1/100$ radian and will be especially useful for solar concentrators. Table V is prepared for $\epsilon=1/1000$ radian (resolving power comparable to the human eye during full daylight). In each of these tables there has been presented for a given value of $n_2$ and a given value of $F/N$ the corresponding values of $C_t$ and $f$.

TABLE IV $$C_t = 4N^2 n_2^2$$

$$f = \frac{\sqrt{C_t}}{\epsilon} d_o$$

| $\epsilon=1/100$ radian | $N^2$ | | 1 | 2 | 4 | 8 | 16 | |
|---|---|---|---|---|---|---|---|---|
| (34') | $n_2^2$ | F/N | F/1 | F/1.4 | F/2 | F/2.8 | F/4 | |
| $n_2=1$ | 1 | $C_t$ | 4 | 8 | 16 | 32 | 64 | |
| | | $f$ | 200 | 382 | 400 | 566 | 800 | $d_o$ |
| $n_2=1.5$ | 2.25 | $C_t$ | 9 | 18 | 36 | 72 | 144 | |
| | | $f$ | 300 | 424 | 600 | 848 | 1,200 | $d_o$ |
| $n_2=2$ | 4 | $C_t$ | 16 | 32 | 64 | 128 | 256 | |
| | | $f$ | 400 | 566 | 800 | 1,131 | 1,1600 | $d_o$ |
| $n_2=2.25$ | 5 | $C_t$ | 20 | 40 | 80 | 160 | 320 | |
| | | $f$ | 447 | 632 | 894 | 1,265 | 1,789 | $d_o$ |
| $n_2=2.5$ | 6.25 | $C_t$ | 25 | 50 | 100 | 200 | 400 | |
| | | $f$ | 500 | 707 | 1,000 | 1,414 | 2,000 | $d_o$ |
| $n_2=3$ | 9 | $C_t$ | 36 | 72 | 144 | 288 | 576 | |
| | | $f$ | 600 | 848 | 1,200 | 1,697 | 2,400 | $d_o$ |
| $n_2=3.5$ | 12.25 | $C_t$ | 49 | 98 | 196 | 392 | 784 | |
| | | $f$ | 700 | 989 | 400 | 1,980 | 2,800 | $d_o$ |
| $n_2=4$ | 16 | $C_t$ | 64 | 128 | 256 | 512 | 1,024 | |
| | | $f$ | 800 | 1,131 | 1,600 | 2,263 | 3,200 | $d_o$ |

TABLE V

| $\epsilon=1/1000$ radian | $N^2$ | | 1 | 2 | 4 | 8 | 16 | |
|---|---|---|---|---|---|---|---|---|
| (34') | $n_2^2$ | F/N | F/1 | F/1.4 | F/2 | F/2.8 | F/4 | |
| $n_2=1$ | 1 | $C_t$ | 4 | 8 | 16 | 32 | 64 | |
| | | $f$ | 2,000 | 2,830 | 4,000 | 5,660 | 8,000 | $d_o$ |
| $n_2=2.5$ | 2.25 | $C_t$ | 9 | 18 | 36 | 72 | 144 | |
| | | $f$ | 3,000 | 4,240 | 6,000 | 8,480 | 12,000 | $d_o$ |
| $n_2=2$ | 4 | $C_t$ | 16 | 32 | 64 | 128 | 256 | |
| | | $f$ | 4,000 | 5,660 | 8,000 | 11,300 | 16,000 | $d_o$ |
| $n_2=2.25$ | 5 | $C_t$ | 20 | 40 | 80 | 160 | 320 | |
| | | $f$ | 4,470 | 6,320 | 8,940 | 12,650 | 17,890 | $d_o$ |
| $n_2=2.5$ | 6.25 | $C_t$ | 25 | 50 | 100 | 200 | 400 | |
| | | $f$ | 5,000 | 7,070 | 10,000 | 14,140 | 20,000 | $d_o$ |
| $n_2=3$ | 9 | $C_t$ | 36 | 72 | 144 | 288 | 576 | |
| | | $f$ | 6,000 | 8,480 | 12,000 | 16,970 | 24,000 | $d_o$ |
| $n_2=3.5$ | 12.25 | $C_t$ | 49 | 98 | 196 | 392 | 784 | |
| | | $f$ | 7,000 | 9,890 | 14,000 | 19,800 | 28,000 | $d_o$ |
| $n_2=4$ | 16 | $C_t$ | 64 | 128 | 256 | 512 | 1,024 | |
| | | $f$ | 8,000 | 11,300 | 16,000 | 22,630 | 32,000 | $d_o$ |

Two distinct tables have been prepared for $\epsilon = 1/100$ radian and for $\epsilon = 1/1000$ radian so as to make their consulation easier while proceeding with numerical applications. However, as the values of $C_t$ are the same whatever $\epsilon$ may be, it is possible to combine several of these tables providing $f$ with as many entries as we have values relating to $\epsilon$. The evaluations of $f$ as a function of $d_0$ have been presented in round figures; only the order of magnitude of these figures need be used.

Several refinements concerning the practical method of using these tables will appear when numerical examples are developed.

A few other points of the procedure call for special comments.

While figuring the lower limit of energy efficiency H at point (17), or of $\eta$ and $\eta'$ at point (24) consideration should be given to intersticial losses in the bundles of bidiopters being considered. The efficiency of a bundle is obtained by multiplying the efficiency of one of its bidiopters by 0.785 or by a factor comprised between 0.7 and 0.6 if the bidiopters are sheathed.

Point (26) further requires clarification. Calculation of the efficiency loss by absorption in a bidiopter is not a simple matter. An excessive order of magnitude can be obtained by considering the ray traveling the longest path inside the bidiopter. Such ray is one of these entering at the margin of the large surface of radiation entrance and presenting the maximal incline $\theta_1$ relatively to the optical axis. It is determined that its length is fixed by the relation $$z^2 = L\gamma \frac{d_1}{2 \tan \gamma}$$

It is also known that any optical material transparent to radiation of a given wave length is characterized by a constant factor $k$ which is optical density per unit of thickness. If a thickness $x$ of such material is traversed by the radiation, the ratio $\Phi_x/\Phi_o$ of transmitted flux $\Phi_x$ (after travel $x$) to original flux $\Phi_o$ is the factor of internal transmission $\tau_x$:

$$\tau_x = \Phi_x/\Phi_o$$

and $$\tau_x = 10^{-kx}$$

It is therefore possible to know the proportion of preserved flux and the proportion of absorbed flux in a bidiopter after a maximum traverse in the order of $z$. The loss by absorption is thus largely over-estimated when compared to the true average loss.

However, in most cases this loss, even if over-estimated, remains small. Good materials indeed have an optical density $k$ per unit of length which is very small; for instance close to $10^{-4}$ cm.$^{-1}$ for a good glass (in the visible range) and even less for germanium and silicon of great purity (in the infrared). When $k=10^{-4}$ cm.$^{-1}$ and the traverse is 100 cm., we have $\tau_x=0.9772$ and a loss of 2.2%.

However, in some cases, absorption can present a problem. On one hand, for materials such as germanium and silicon, for instance, the factor $k$ is only very small when the material is very pure which is not always the case. On the other hand, germanium and silicon being still taken as examples, the factor $k$ increases with the temperature. It is therefore important in the practical application of point (26) of the procedure to specify the experimental conditions existing while the concentration occurs so as to determine the optimal value $L_o$ accordingly.

There is finally the case of optical materials which are relatively absorbent which can be considered for constituting bidiopters according to the invention only by limiting their use for very short bidiopters coupled with others made of very transparent materials. Tellurium is, in that respect, very interesting. It is very absorbent (about 20% loss, for a thickness of 1 mm. in the infrared) but its refractive index is very high (6.3). The square of the index reaches about 40, 2.5 times more than with germanium ($n^2=16$). Therefore, if one limits the average optical path to 1 mm. in a very short terminal bidiopter made of tellurium, it is possible to obtain a concentration about twice as great as with germanium. This is realizable by having such a terminal tellurium bidiopter preceded by a coupled bidiopter of germanium. The concentration $C_o$ required from the terminal bidiopter is slightly greater than 2.5 (be it taken into consideration that it is preferable to end the minimal section of the germanium bidiopter at $d_4$, and that the maximal incidence angle $\psi_x$ must be controlled). Table I indicates that for so small a value of $C_o$ an apical demi-angle $\gamma$ of $1/20$ radian allows an efficiency of almost 90% for a schematic length $L_o$ equal to only 5 times the minimum schematic diameter $d_o$. With $d_o=0.1$ mm. we therefore obtain a small schematic frustum of a cone 0.5 mm. long. The maximum optical path $z$, defined above, will not reach 1 mm.

This possibility will be again found in the examples of numerical applications. It should be understood that to benefit from this exceptional maximum concentration it has to be possible to immerse the sensing surface in the small face of the tellurium bidiopter. This is feasible in the case, for instance, of a phosphorographic powder for a metascope. It is not possible in the case, for instance, of a thermistor for a bolometer because tellurium is a semi-conductor. It is then necessary (in the present state of the art), as it is for germanium and silicon, to isolate the thermistor with a thin layer of selenium arsenide for instance, the index of which is lower than 3, which makes this type of application unattractive.

These remarks about the procedure will be terminated by specifying the conditions for choosing index $n_1$ at steps (19) and (37). The value of the ratio $n_1/n_2$ is involved in the calculation of the energy yield $\eta$ as was previously seen. By comparing Tables I and II it can be seen that for any given value of $\gamma$ the efficiencies of Table I are better when $C_o$ is at least equal to or greater than 9; on the contrary, they are not as good as those of Table II when $C_o$ is smaller than 9. This dividing line located here (for $n_1/n_2=4/3$ compared to $n_1/n_2=1$) at $C_o=9$, also varies with the value of $n_1/n_2$. When $n_1/n_2=3/2$, compared to $n_1/n_2=1$, it is located at about $C_o=3$. Thus the greater the variation between index $n_1$ of the bidiopter and $n_2$, the index of immersion of the sensing surface, the more often it is desirable to immerse this sensing surface in the bidiopter itself. The difference of efficiency may be important. For instance, with $n_1=4$ and $n_2=2$, we have, for $C_o=144$ and $\gamma=1/100$ radian, an efficiency $\eta$ which is equal to 0.67. With $n_1=n_2=2$ (immersion) we have, under the same conditions, $\eta=0.80$, which represents a gain of 13%. Therefore the problem should be considered in each special case before choosing the material composing the terminal bidiopter.

A few numerical examples (six) of concentrator calculation, accompanied by figures, will conclude the clarification of the procedure and will define embodiments of devices incorporating the invention.

In the example of the design of a concentrator of infrared radiations (1 to $5\mu$) for a laboratory receiver of the cell type or bolometer, each step of the procedure will be taken up seriatim:

(1) A receiver of infrared radiation of the cell type or bolometer has a sensing surface of category B, that is to say, integrating all the radiation that is received without point-by-point differentiation. In the cell type, the smallest sensing surfaces appear to be the photovoltaic elements consisting of indium antimonide, the surface of which is in the order of 0.03 mm.$^2$. Thermistors for bolometers have a smaller surface for instance in the order of 0.01 mm.$^2$.

We fix here:

$$\Delta_o \simeq 0.2 \text{ mm.}$$

(2) All materials the index of which is greater than 3 for infrared radiations are semi-conductors. As it is then necessary to insulate the sensing element and as the insulating material having the greatest index (near 3) is selenium arsenide, we have $$n_2 \simeq 3 \text{ (maximal)}$$

(3) Lens objective opening at $F/2$ (supposed given) $N=2$.

(4)
$$C_o = 4N^2 n_2^2 = 144$$

(5) We can here verify the distance from the source and, subsequently, its apparent diameter. We fix:

$$\epsilon = \frac{1}{10} \text{ radian } (5°43'46'')$$

(6) $f_{max} = 50$ mm. (supposed given).
(7) $d_{1\,max} = 5$ mm.
(8) $d_{o\,max} = 5/12 = 0.42$ mm.
(9) Not needed.
(10) $d_o = \Delta_o = 0.2$ mm. (since $d_{o\,max} > \Delta_o$).
(11) $f = f_{max} \times 0.2/0.42 = 24$ mm.
(12) $2R = 12$ mm.
(13) In this particular instance, $\Gamma = \epsilon = \frac{1}{10}$ radian.
(14) (15) (16) Purposeless here.
(17) $H \geq 0.75$ (supposed given).
(18) $L_{max} = 100$ mm. (supposed given).
(19) To prevent having to resort to silvering the terminal portion of the elementary bidiopter it is preferable to provide for the termination of said bidiopter at section $d_4$. As $n_2 = 3$, the minimum value of index $n_1$ of the terminal bidiopter is $$n_1 \geq \sqrt{9+1} \text{ that is, 3.16}$$

Many optical materials are transparents from 1 to 5 also having a mean index greater than 3.16. One of the most common is silicon (index 3.43 for $3\mu$).

(20) See tables.
(21) $L_{max} = 500 d_o$. Table I is used as the conditions are near those of immersion in the bidiopter.

There is a value of $\gamma$ which is perfectly suitable. For $\gamma = \frac{1}{100}$ and $C_t = 144$ we have $H = 0.80$ and $L_o = 550 d_o$.

Only one elementary bidiopter will suffice (it is not necessary to resort to a bundle).

(22) On the other hand, it is not desirable to have the elementary bidiopter (the length of which may reach 100 mm.) made only of one material such as silicon.

(23) Not needed.
(24) $\eta = \eta' = \sqrt{0.75}$ (less than 0.87).
(25) $2 < L_o < 5$ mm. or
$10 d_o < L_o < 25 d_o$.
(26) No problem of absorption.
(27) From Table I: $C_{o\,max} \simeq 4$ (two sets of values are suitable:

$\eta = 0.89$ and $L_o = 15 d_o$ for $\gamma = \frac{1}{30}$ radian and
$\eta = 0.93$ and $L_o = 25 d_o$ for $\gamma = \frac{1}{50}$ radian).

(28) $C'_{o\,min} = 144/4 = 36$
(29) $n'_{1\,min} = \sqrt{36/16} = 1.5$
(30) In the case of section $d_4$ (condition of non-silvering)

$$n'_1 = \sqrt{2.25 + 1} = 1.80$$

Furthermore, assuming that the limit of the angle of incidence $\psi_x$ after anti-reflection treatment of the surfaces is 1 radian it has been seen that the index of the bidiopter should not be too much greater than 1.78. It is therefore desirable in the present circumstances to cut the bidiopter at section $d_4$ and to choose an optical material with an index close as possible to 1.80.

(31) Such material exists. Glass VIR-3 containing germanium oxide (manufactured by Societe Sovirel, Parra-Mantois Department) is characterized by the following limits of transmission: 0.3 to 5.5$\mu$ and by an index of refraction of 1.799 for $\lambda = 3\mu$.

(32) $C'_o = 16 \times 2.24 = 35.85 \simeq 36$.
(33) $L'_{o\,max} \simeq 100 - 5 \simeq 95$ mm. $\simeq 475 d_o$.
(34) For $C'_o = 36$, Tables I and II supply values of $\eta'$ which are close. In Table I: $\gamma' = \frac{1}{100}$, $\eta' = 0.89$, $L'_o = 250 d_o$.

(35) Not needed.
(36) $C_o = 144/36 = 4$ ($C'_o$ and $C_o$ are round numbers because the value 1.799 of $n'_1$ varies only slightly from the theoretical value 1.80).
(37) $n_1 = 3.43$ (silicon is perfectly suitable).
(38) There is a choice in Table I between $\gamma = 1/30$, $\eta = 0.89$, $L_o = 15 d_o$ and $\gamma = 1/50$, $\eta = 0.93$, $L_o = 25 d_o$.

The first combination can be used. The efficiency is sufficient. The schematic length equals 3 mm.

(39) A total efficiency greater than 0.75 is obtained $$\eta \cdot \eta' = 0.89 \times 0.89 \simeq 0.79$$

(40) and (41) It is assumed that the frontal converging system is aplanatic and $$\sin \theta_1 = 1/4$$

(42) $d_1 = f \cdot \epsilon = 2.4$ mm.
(43) The minimum section of the frontal bidiopter belongs to category $d'_4$. Its diameter is therefore obtained accurately by applying Equation 25 and Equation 35 provides an excellent approximation. By using the latter together with Equation 14 we find that $$d'_4 = 0.43 \text{ mm.}$$

As the values of the theoretical concentration $C'_o (=36)$ and of the energy yield $\eta' (=0.89)$ are known the value of diameter $d'_4$ can be calculated more rapidly. Because the true ratio $d_1/d'_4$ is equal to $\sqrt{36}$ multiplied by $\sqrt{0.89}$ or $$6 \times 0.94 = 5.65$$

so that $$d'_4 = 2.4/5.65 = 0.43$$

(44) According to Equation 28 the length $L'_\gamma$ of the frontal bidiopter is 99.97, or, choosing the closest round value $$L'_\gamma = 100 \text{ mm.}$$

(45) By the quick procedure with $C_o = 4$ and $\eta = 0.89$:

$$d'_4 d_x = 2 \times 0.94 = 1.88$$

so that $$d_x = 0.23 \text{ mm.}$$

To use Equations 31 and 14 one would have had to replace the maximum angle of incidence $\theta_1$ at the entrance by the maximum angle $\psi_4$ calculated by means of the following equation (already encountered):

$$\psi_4 = \pi/2 - \lambda_{n'_1} + \gamma$$

(46) Calculation provides:

$$L\gamma = 3.036$$

or $$L\gamma = 3.04$$

(47) Not needed.
(48) The cell for infrared radiation or the laboratory bolometer constituting this first example of numerical application may advantageously comprise two devices according to the invention disposed in parallel.

FIG. 17 shows the optical part of a bolometer having an immersed thermistor, the characteristics of which are those just calculated. This bolometer comprises two spherical diopters for flux entrance, 37 and 38, the optical axes 39 and 40 of which converge in the direction of the infrared radiation source assumed to be located at a known distance. The index of these diopters equals 1.8. The entrance surfaces 41 and 42 coated with an anti-reflection layer are characterized by an aperture diameter of 12 mm. and a radius of curvature of 19.2 mm. The optical axes of totally reflecting faces 43 and 44, cut at an angle of inclination of about 44°, coincide at 45. These frontal diopters form images of the source respectively at 46 and 47. The associated frontal bidiopters 48 and 49 measure 2.4 mm. at the diameter of the large faces, 100 mm. in length and 0.43 mm. at the diameter of the small faces (50, 51 on the figure). The terminal bidiopters 52 and 53 of silicon (appearing in black on the drawing) are 3.04 mm. long and the diameter of the small terminal faces (54, 55) is 0.23 mm. The two small end faces coupled respectively with the two faces of a semiconductor sensing layer (thermistor) 56 and insulated from it by means of thin films 57 and 58 (of selenium arsenide, for example). The proportions of these terminal elements have been exaggerated in the drawings; actually the minimal sections 54 and 55 are extremely close to sensing tape 56. The latter is connected to the electrical components (not shown) of the bolometer.

The energizing concentration obtained by means of this bolometer according to the invention can be compared with the concentrations obtained by means of conventional bolometers. The energizing efficiency of the coupled bidiopters is $$\eta \cdot \eta' = 0.89 \times 0.89 = 0.79$$

It may be assumed that the actual efficiency is in the order of 0.70. The other losses of efficiency are the same in the bolometer of the invention as in the other bolometers; they will not be considered in evaluating the comparison.

With respect to a bolometer with immersed thermistor having at the entrance a convergent system consisting of a spherical diopter having the same characteristics as those of diopters 37 and 38 described above, the energizing efficiency obtained with the new bolometer is:

$$144 \times 0.7 \times 2 = 201.6$$

that is, two hundred times greater.

It is to be noted that bolometers of known designs are most often equipped with entrance diopters of lesser opening or presenting optical characteristics which are not the most suitable (for instance, the sensing element is located at the geometric center of the spherical diopter, which lessens the efficiency). In comparison to a frontal system opening to F/3 for instance, the concentration obtained with the bolometer according to the invention is $$(4 \times 9 \times 9) \times 0.70 \times 2 = 453.6$$

that is, four hundred fifty times greater.

In comparison with a bolometer having a simple window with parallel faces as an entry optical system, the resulting concentration, for a source of apparent angle $\alpha$ (Equation 10) is $$8/\alpha^2 \times 9 \times 0.7 = 72/\alpha^2 \times 0.7$$

times greater which for a field of $\frac{1}{10}$ radian amounts to a concentration about 5,000 times greater.

The second numerical example relates to a concentrator associated with an active detector of centimeter waves ("radar" or "maser" type). The main characteristics will be given directly without going through each step of the procedure and reference will be made to FIG. 18.

The sensing element is here a dipole antenna 59, the useful minimum diameter of which is about 0.5 cm.

$$\Delta_0 = 0.5 \text{ cm.}$$

This dipole antenna is located in air so that $n_2 = 1$.

The frontal convergent system is a parabolic mirror 60, opening to F/1.4.

The associated concentrator according to the invention is here a frustoconical mirror 61 ($n_1 = 1$), of aluminum for example, the desired theoretical concentration $C_0$ of which is equal to:

$$C_0 = 4 \times (1.4)^2 = 8$$

$$d_0 = 0.5 \text{ cm.}$$

$$d_1 = 0.5 \times \sqrt{8} = \sqrt{2} = 1.41 \text{ cm.}$$

The field angle of the ultra-short wave scanning spot is about 30' or $\frac{1}{100}$ radian. Thus $$\epsilon = \frac{1}{100} \text{ radian}$$

It follows that the focal length of the parabolic mirror is $f = 1.41$ cm.

The diameter of the mirror is $2R = 100$ cm.

It remains to determine the optimum characteristics of the frustoconical mirror 61. Table I offers for $C_0 = 9$ (closest value to 8) a choice of values for the apical demi-angle $\gamma$. The value $\gamma = \frac{1}{50}$ radian is excellent as it permits an efficiency of 90% and requires a schematic length $L_0$ of about $50 d_0$ or 25 cm.

Calculation results in $d_1 = 1.41$ cm. (already fixed); $d_3 = 0.53$ cm.

The diameter of the minimum section of the frustoconical mirror 61 is here designated as $d_3$ because the utilization occurs in air. Calculation results in $d_3 = 0.526$ and the value of 0.53 is chosen for calculating $L\gamma$ $$L\gamma = 20.50 \text{ cm.}$$

The large section $d_1$ of the metallic frustoconical mirror 61 is located in the focal plane of the parabolic mirror (see FIG. 18). The end 59 of the dipole antenna is located as close as possible to minimum section $d_3$ and is connected to the radar (or maser) assembly by means of wave guide tube 62.

Such a wave detector is characterized by an efficiency about 7 times greater ($8 \times 0.9$) than the efficiency presented by a parabolic mirror such as 60, used above.

The third numerical example relates to searching heads for detecting missiles by infra-red radiation. We will consider successively several conditions of utilization.

The angle $\epsilon$ of the elementary field will first be chosen equal to $\frac{1}{1000}$ radian and the scanning field $\Gamma$ of the searching head equal 30°.

If the sensing element is of the B type (bolometer tape, or thermistor, or infra-red sensitive cell . . .) its minimum diameter $\Delta_0$ is about $\frac{1}{10}$ or, at least $\frac{1}{20}$ mm. Therefore long focal lengths will characterize the frontal optical system.

For instance, when $\Delta_0 = 0.1$ mm. and $n_2 = 3$ we have:

$$C_t = 72$$

$$d_0 = 0.1 \text{ mm.}$$

$$d_1 = 0.85 \text{ mm.}$$

The focal length $f$ of the frontal optical system equals $$f = 0.85 \times 1.000 = 850 \text{ cm.}$$

and its diameter 2R is equal to 607 mm.

The device, even though it is cumbersome, is realizable by means of a parabolic mirror associated with a bidiopter. For the latter we will have, for instance:

$$\gamma = \frac{1}{50} \text{ radian}$$

$$\eta = 0.73$$

$$L_0 = 185 d_0 = 18.5 \text{ mm.}$$

The biodiopter may be simple or may consist of two biodiopters coupled in series, the first made of glass and the second made of a material having an index greater than 3.

With a sensing element having a diameter equal to $\frac{1}{20}$ mm. we obtain dimensions which are half as large:

$$d_0 = \Delta_0 = 0.05 \text{ mm.}$$

$$d_1 = 0.425$$

$$L_0 = 9.3 \text{ mm.}$$

$$f = 425$$

$$2R = 304 \text{ mm.}$$

The frontal optical system may consist of a converging lens system or of an afocal arrangement provided, if need be, with a prism device for reducing the overall dimensions.

If it is intended to further decrease all dimensions it is necessary to resort to a sensing element of category A associated with bundles of biodiopters. Two numerical examples are presented:

The first relates to a searching head having a resolving power of $\frac{1}{1000}$ radian, a total field of 30°, and a total length (without any prism) of about 15 cm. The main characteristics are as follows, reference being made to FIG. 19.

The sensing surface is a photocathode 63 the linear limit of resolution of which is about $10\mu$ and the useful diameter about 0.2 mm. This photocathode is immersed in the plane of the minimum section of a bundle 64 of conical fibers made of special glass having a large index such as arsenic trisulphide glass ($As_2S_3$) or arsenic pentaselenide glass ($As_2Se_5$). The index of these glasses is comprised between 2.4 and 2.7 for infra-red radiation. We will take for calculation purpose: $n_2=2.45$ so that $n_2^2=6$.

The frontal optical system 65 is a convergent objective lens, opening to F/1.4. The concentration $C_o$ required of the fiber bundle consequently equals:

$$C_o = 4 \times 6 \times 2 = 48$$

The minimum diameter $d_o$ of each fiber is about $20\mu$, so that, for each fiber:

$$d_1 = \sqrt{48} \cdot 20\mu \simeq 140\mu$$

Since $\epsilon = \frac{1}{1000}$ the focal length $f$ and the opening diameter 2R of the frontal objective are, respectively:

$$f = 140 \text{ mm.}$$
$$2R = 100 \text{ mm.}$$

The fiber bundle comprises 10 fibers per diameter (which results in a total of about 78 fibers). The minimum diameter of the bundle is therefore in the order of $200\mu$, which is also the order of magnitude of the useful diameter of the photocathode.

$$\Delta_o = 0.2 \text{ mm.}$$

The elementary field $\epsilon'$ of the bundle equals 10 times the elmentary field of one fiber.

$$\epsilon' = \frac{1}{100} \text{ radian}$$

The schematic characteristics of each fiber of the bundle are as follows:

$$d_o = 20\mu$$
$$d_1 = 140\mu$$
$$\gamma = \frac{1}{100} \text{ radian}$$
$$\eta = 0.85$$
$$L_o = 300 d_o = 6 \text{ mm.}$$

The true characteristics are:

$$d_1 = 140\mu$$
$$d_2 = 21.9\mu$$

(using symbol $d_2$ to designate the minimum diameter of one fiber, the present case being a case of complete immersion) or $$d_2 = 22\mu$$
$$L\gamma = 5.918 \text{ mm. or } 5.92 \text{ mm.}$$

(in practice if the fibers are made of drawn glass, the measurement of $L\gamma$ provides only an approximative value, the accurate measurement of $d_1$ and $d_2$ only need be considered).

The total field ($\Gamma = 30°$) of the device being about 20 times greater than the elementary field ($\epsilon' = \frac{1}{100}$ radian) of the bundle, a scanning movement is imparted to the searching head so that it is capable of exploring the field in its entirety. On FIG. 19 has been shown the spiral 66 described by the optical axis of the concentrator, said optical axis being caused to rotate around a fixed point located in the vicinity of sensing element 63.

Scanning is realized by any known means. It is also possible to resort to an optical scanning of the image.

Photocathode 63 is incorporated with a phototransmitting detector 67 (a vacuum cell of the silver-cesium layer type, or a gas cell, or a dynode photomultiplier) which accelerates and focalizes the electrons transmitted by the sensing element.

A second example of realization (not shown in the drawings) extends the performance even further.

The resolving power $\epsilon$ is increased to $\frac{1}{5000}$ radian (or 2 m. as seen from a distance of 10 km.). The total field remains equal to 30°. The opening of the frontal convergent objective is F/2.04. The theoretical concentration $C_o$ now equals 100. The associated fiber bundle comprises 50 fibers per diameter (a little less than 2000 total) the characteristics of which are, for each one of them:

$$d_o = 8\mu$$

(this is a minimum, with respect to the wave lengths of the concentrated radiations)

$$d_1 = 80\mu$$
$$\gamma = \frac{1}{1000} \text{ radian}$$
$$\eta = 0.98$$
$$L_o = 4,500 \ d_o = 36 \text{ mm.}$$
$$f = 5,000 \ d_1 = 400 \text{ mm.}$$
$$2R = 196 \text{ mm.}$$

The elementary field $\epsilon'$ of the bundle equals $\frac{1}{100}$ radian. As in the preceding example the total field (30°) is explored by scanning (mechanical scanning or scanning of the image). The exploration movement can be slow as the elementary field $\epsilon'$ has a large value relative to the total field. An automatic device can maintain the image of the detected source at the center of the sensing surface and control the scanning to keep the concentrator aimed at the source.

Searching heads of this type, considerably more sensitive and more accurate than the detectors presently known, make it possible to spot, at a great distance, any type of missile and trigger its interception.

The fourth example relates to a phosphorescence telescope. (Not shown in the drawings as the schematic illustration of it is substantially the same as in FIG. 19 reduced to parts 63, 64 and 65).

The resolving power $\epsilon$ is $\frac{1}{1000}$ radian. The total field $\Gamma$ is 8° ($\Gamma \simeq 140\epsilon$).

The frontal optical system consists of a convergent objective lens opening to F/2. A bundle of conical fibers associated with this objective comprises 140 fibers per diameter (that is, about 15,400 fibers total). These fibers are made of special glass for infrared radiations, the index of which is about 2.45.

The sensing surface consists of a very fine phosphorographic powder (that is to say a phosphorescent substance initially excited by means of ultraviolet radiations having the property of becoming luminescent when subsequent infrared illumination occurs) immersed in the plane of minimum sections of the fibers. We have $$n_2 = 2.45$$
$$n_2^2 = 6$$
$$C_o = 96$$

The minimum diameter of each fiber is about $$d_o = 25\mu$$
$$d_1 = 245\mu$$

so that with $\epsilon = \frac{1}{1000}$ radian the focal length $f$ and the opening diameter 2R of the frontal optical system will respectively be:

$$f = 245 \text{ mm.}$$
$$2R = 123 \text{ mm.}$$

For each fiber we have $$\gamma = \frac{1}{1000} \text{ radian}$$
$$\eta = 0.98$$
$$L_o = 4,400 d_o = 110 \text{ mm.}$$

The bundle efficiency, consideration being taken of the intersticial losses and of the fiber sheathing, is about 60%.

The phosphorescence telescope further comprises a magnifying ocular (linear magnification×10 or ×20) allowing the observation of the image formed by the mosaic of the fiber minimum sections and revealed by the phosphorographic powder. The over-all length is less than 40 cm.

The fifth example relates to a special metascope conceived for detecting at distance small sources transmitting infrared radiation in a narrow and well defined frequency band.

Taking into consideration the atmospheric spectral transmission, this narrow band can be centered, for instance, at about $1\mu$, $1.5\mu$, $2.1\mu$, $3.7\mu$ or $10\mu$, because, in practice, for such wave lengths, atmospheric air offers excellent transparency whereas around $2.5\mu$, $6\mu$ and $15\mu$, for instance, the transparency is practically non-existent. A $10\mu$ wave length is particularly interesting in that it corresponds to an absolute black body temperature of about 310° K. It therefore corresponds to the natural transmission characterizing the human body and not very warm objects (310° K. equals 37° C.).

The metascope according to the invention described herein is designed for detecting natural infrared transmission of sources having an apparent diameter greater than $\frac{1}{1000}$ radian ( 50 cm. at 500 m., or 1 m. at 1 km.). Its principal characteristics, reference being made to FIG. 20, are as follows:

A lens objective 68, of relative aperture F/1.4, is associated with a bundle 69 of conical fibers made of glass which is transparent to the selected wave length. In the case of a wave length in the vicinity of $10\mu$ it is advantageous to use a glass containing selenium and arsenic the curve of internal transmission of which shows a sudden drop toward zero between 12 and $13\mu$ (providing a good selective function) and having an index of 2.47 (for $10\mu$).

The sensing surface consists (as in the case of the phosphorescence telescope) of a fine phosphorographic powder immersed in the plane 70 of the minimum sections of the fibers. For some of the values of detected wave lengths it may be difficult to experimentally select the adequate phosphorographic powder. However, research is being pursued in this field and soon there will be available phosphorescent powders suitable for any wave length. The minimum section of each conical fiber has a diameter of about $30\mu$. We then have, with the notations heretofore used:

$$N=1.4$$
$$n_2=2.47$$

(glass of selenium and arsenic, for instance)

$$n_2^2 \simeq 6$$
$$C_0=48$$
$$d_0=30\mu$$
$$d_1=210\mu$$

So that the characteristics of the frontal optical system are $$f=210 \text{ mm.}$$
(since $\epsilon=\frac{1}{1000}$ radian)
$$2R \simeq 150 \text{ mm.}$$

The fibers forming the bundle are characterized by $$\gamma=\frac{1}{1000} \text{ radian}$$
$$\eta=0.88$$
$$L_0=300 \ d_0 \text{ or } 7.5 \text{ mm.}$$

The bundle comprises 10 fibers per diameter or a total of about 78 fibers. The large face of flux entrance of the bundle has a diameter $e_1$ equal to about 1.47 mm. and the small terminal face has a diameter $e_0$ of about 0.3 mm. The elementary field $\epsilon'$ of the bundle associated with the frontal optical system is 10 times greater than the field of one fiber:

$$\epsilon' = \frac{1}{1000} \text{ radian}$$

An ocular 71 of linear magnification of ×15, permits observation of the elementary luminous signal appearing at the end 70 of the fiber bundle.

The total field $\Gamma$ of the device is 20° (or about 0.35 radian). The elementary field $\epsilon'$ being equal to 0.01 radian, the apparatus is provided with a dual mechanical scanning device which allows a system exploration of its field of action. To achieve this (see FIG. 20) the metascope is mounted on a horizontal platen 72 of tripod 73 by means of an annular element 74 in semi-tight frictional and pivotal engagement with platen 72. The latter is provided with two levels for controlling the horizontality and is locked in position by means of a ball-and-socket joint (accessories which are not shown in the drawing). The observer can therefore impart to the metascope a slow horizontal exploratory movement by means of handles 75 and 76. The metascope is further supported, in a plane close to its center of gravity, by two brackets 77 and 78 gripping a third bracket 79 integral with the annular part 74. A pawl-and-ratchet device (not shown on the drawing) similar to the one cooperating with the rollers of a typewriter, provides for pivoting the metascope by means of knurled knob 80 in a vertical plane containing its optical axis by small angular increments $\frac{1}{1000}$ radian).

The exploration movement is thus very efficient and easy to control. The elementary field $\epsilon'$ of a bundle ($\frac{1}{100}$ radian) being 10 times greater than the field $\epsilon$ of a fiber ($\frac{1}{1000}$ radian) one assumes that the luminous signal indicating the existence of a source remains visible long enough while the slow scanning movement is taking place. A selective filter may be added to the apparatus (located, for example, in front of the large face of flux entry of the fiber bundle) in order to allow detection in a very narrow band. For instance, in the case of detection at about $10\mu$ by utilization of selenium-arsenic glass, it is possible to limit the transmitted band to the interval 9 to $12\mu$ by adjoining a thin filter of indium antimonide (coated with an anti-reflection layer of $PbCl_2$).

The sixth example of numerical application relates to a solar furnace. The main characteristics are detailed as follows, reference being made to FIG. 21 which is a horizontal section.

Two parabolic mirrors 81 and 82, each having an aperture diameter of 2 m. and a focal length of 2.83 m. (relative aperture: F/1.4), collect solar radiation and form images of the sun at 83 and 84. Two plane mirrors 85 and 86 inclined at 45° to the optical axis of the parabolic mirrors bring these two images into the same transverse axis 87.

Two frustoconical glass bidiopters 88 and 89 are located about axis 87 in such a manner that their maximum sections of flux entrance respectively coincide each with one of the images formed of the sun at 83 and 84. These bidiopters are extended at their small diameter end portions by means of frustoconical metallic mirrors 90 and 91, the sections of minimum diameter 92 and 93 of which are located in the plane of the access orifices of furnace 94.

We have:

$$\epsilon = \frac{1}{100} \text{ radian}$$

(apparent angle of the sun)

$$n_2=1$$
$$N=1.4$$
$$f=283 \text{ cm.}$$
$$2R=200 \text{ cm.}$$
$$d_1=2.83 \text{ cm.}$$
$$C_0=4 \times 1 \times (1.4)^2=8$$
$$d_0=1 \text{ cm.}$$

The bidiopters are made of borosilicate-crown glass of 1.50 index (for $\lambda=1.6\mu$) transparent from $0.3\mu$ to $3\mu$. Table IV offers a choice of values for $\gamma$, $\eta$ and $L_o$. We choose:

$\gamma = 1/50$ radian
$\eta = 0.874$
$L_o = 46$ $d_o = 46$ cm.

Calculation results in $d_1 = 2.83$ cm.
$d_3 = 1.07$ ($d_3$ notation is chosen since the apparatus is performing in air)

$L\gamma = 41.25$

In order to prevent the glass from melting in the vicinity of the orifice of the solar furnace, each of the bidiopters 88 and 89 is cut before minimal section $d_3$ and is therefore shortened. The actual length may be, for example:

$L'\gamma = 40$ cm.

The end portion of each of the bidiopters is replaced by a short frustoconical mirror 90 (and 91) made of metal capable of sustaining a high temperature and having as great as possible a reflecting power.

To further isolate the glass at the ends 95 and 96 of the bidiopters, thin frustoconical elements of periclase, MgO, are interposed, characterized by an excellent transparency between $0.25\mu$ and $8\mu$ and a melting point of about $2,800°$ C.

The bidiopters are therefore each composed of: a glass bidiopter 39.5 cm. long for example, a very short coupled bidiopter, of periclase and 0.5 cm. long for example, and of a short metallic frustoconical mirror 1.25 cm. long. The value 1.07 cm. calculated for the minimal diameter $d_3$ corresponds to the diameter of the small base of the terminal frustoconical mirror.

Furnace 94 is similar to solar furnaces presently in use except that it is provided with two orifices instead of one. It consists of a crucible 97 made of cast refractory material insulated from a metallic envelope 99 by insulating powder 98. It is a rotating furnace the axis of rotation of which coincides with the horizontal optical axis 87. As having two optical entries 92 and 93 located on said axis prevents the use of a rotating shaft the movement of rotation is imparted by means of a wheel 100 affixed to the furnace.

The rotating device is schematically shown in FIG. 22. The furnace and its metallic envelope 99 are recessed in wheel 100 which is provided at each peripheral edge with a circular groove 101. Three synchronized driving wheels 102, 103 and 104 actuate wheel 100 by peripheral engagement. Each of the driving wheels is further provided with a peripheral groove which encompasses wheel 100 and maintains it in the same vertical plane. With this arrangement entry orifices 92 and 93 (and their optical axis 87) are free of interference during rotation.

The solar radiation concentration characterizing the device according to the invention can readily be compared with the concentration obtained with the devices presently used. For each of the two bidiopters associated with the parabolic mirrors the concentration in air ($n_2 = 1$) is equal to the maximum concentration of a convergent system of aperture F/0.5 and multiplied by the the energy efficiency $\eta$ corresponding to the bidiopter. That is, for the sun:

$46,140 \times 0.874 = 40,326$

The apparatus comprising a dual concentration device, the total concentration that is reached is theoretically equal to about 80,000.

In the best solar furnaces presently in use the concentration reaches about 20,000. Even if consideration is given to unexpected losses the gain is substantial.

The six numerical applications described above constitute as many examples of devices incorporating the invention. There exists an indefinite number of variations as all types of receivers are susceptible of benefiting from maximum concentration of radiation energy by means of the same devices. A few of these types of devices are listed hereafter, referring to the apparatus already described to which they are related and, on occasion, pointing out some special characteristics.

To the first example (bolometer or cell) are related all the laboratory receivers:

Thermal detectors.
Metallic film bolometers, thermistor bolometers, niobium nitride superconducting film bolometers.
Thermoelectric batteries of the Horning, Roess and Dacus or Schwarz type (employing semi-conductors).
Pneumatic detectors.
Photoconductive cell detectors.
Germanium photodiodes, point photodiodes.
Photovoltaic cell detectors.
Photomagnetoelectric detectors.
Photoemitting detectors.
Dynode photomultiplicators.
Cell luxmeters.
Spectrographs.
Scintillation counters.
Particle detectors, etc.

All these laboratory receivers constructed according to the invention present a structure similar to the structure of the bolometer described with respect to FIG. 17. The frontal optical system may be a convergent objective (with lenses or mirrors) or an afocal system. The apparatus may comprise two concentrators in series as in the example or only one.

To the second example ("radar" or "maser" detector) are related all devices of active detection:

Detectors coupled with an infrared emitting beacon.
Detectors coupled with "lasers."

Some other devices are also related such as:

Television cameras having a single cell (for instance of the type operating with a Nipkov disc).

With the third example are associated all types of searching heads whatever the wave length they utilize. Also related to it are the devices exploring a small field: for instance, a telescope for searching stars of celestial bodies.

With the fourth example (phosphorescence telescope) are associated:

Metascopes.
Image transforming tubes.
Electronic telescopes, sniperscopes.
Still and movie cameras operating in visible or infrared light.
Iconoscope television cameras.
X-ray apparatus (medical observation).

Generally speaking all devices which convey an image of distant objects without resorting to mechanical or optical scanning belong to this group.

With the fifth example are associated devices receiving very selective radiations and some spectrographic devices.

The sixth example relates to all devices involving solar energy concentration.

I claim:

1. Apparatus for the concentration of electromagnetic radiation comprising in combination a front optical concentrating system of aperture 1/N which receives a radiation flux from a spaced source and which effects a first concentration of the flux forming a convergent beam, the rays of which have a maximum angle $\theta_1$ to the optical axis of the system, sin $\theta_1$ having a value of the order of ½ N; and a plurality of serially arranged frustoconical internally reflective optical elements of successively greater refractive indices, the apical half-angles $\gamma$ of the frustocones not exceeding the order of $\frac{1}{10}$ radian, the large entrance face of the first of said frustoconical elements having a maximum diameter $d_1$ substantially that of the minimum cross section of the beam concentrated by the front optical concentrating system and positioned at said minimum cross section to effect a further concentration of said beam; the successive frustoconical optical elements having their large entrance faces coplanar with the minimum sections of the next preceding frustoconical optical element; and the small section of the last in series of said frustoconical elements associated with a radiation sensing element positioned in the plane where the beam attains its maximum concentration, having a minimum diameter $d_x$ the value of which is determined by the formula:

$$\frac{d_x}{d_1} = \frac{\sin[\beta_1 + (2p'-1)\gamma]}{\sin(\beta_1 - \gamma)}$$

wherein $p'$, the maximum number of internal reflections undergone by a ray making the maximum angle $\theta$ with the optical axis at the entry of the ray into the frustocones, is determined by the relation:

$$p' = E\left[\frac{\operatorname{Arc\,sin}\left(\frac{n_2}{n_1}\right) - \beta_1}{2\gamma} + 1\right]$$

$n_1$, being the index of refraction of the internal medium of said frustoconical element, $n_2$ being the index of the medium in optical contact with the sensing element at the small section of the frustoconical element and $\beta_1$, being the angle defined by the relation:

$$\beta_1 = \operatorname{Arc\,sin}\left[\frac{\sin\theta_1}{n1}\right] + 2\gamma$$

the quantities $n_1$, $n_2$, $\sin\theta$ and $\tan\gamma$ being also related by the formula:

$$\left[\frac{1+\sqrt{\frac{n_1^2}{n_2^2}-1}\cdot\tan\gamma}{1+\sqrt{\frac{n_1^2}{\sin^2\theta_1}-1}\cdot\tan\gamma}\right]^2 \geq \eta$$

in which $\eta$ represents the ratio of the minimum energy yield to be provided by the concentrating apparatus to the absolute maximum concentration defined by the expression:

$$\frac{n_2^2}{\sin^2\theta_1}$$

and has a value between about 0.015 and 1.

2. Apparatus as defined in claim 1 wherein at least the first of the frustoconical internally reflective optical elements is a bundle of frustoconical mirrors, the large entrance faces of which are coplanar and coincident with the minimum cross section of the beam concentrated by the front optical system.

3. Apparatus as defined in claim 1 wherein the serially arranged frustoconical internally reflective elements are bundles of frustoconical mirrors, the large entrance faces of which are coplanar.

References Cited

UNITED STATES PATENTS 3,187,627  6/1965  Kapany _____ 350—96 X
3,297,958  1/1967  Weiner.

OTHER REFERENCES

Williamson: "Cone Channel Condenser Optics," Journal of the Optical Society of America, vol. 42, No. 10, October 1952, pp. 712–715.

Kapany et al.: "Infrared Fiber Optics Investigations," U.S. Government Research Report AD 601572, dated June 1964, pp. 51, 65, 66, 69–76 relied on.

JOHN K. CORBIN, Primary Examiner

U.S. Cl. X.R.

250—227